(12) United States Patent
Lian et al.

(10) Patent No.: US 10,971,932 B2
(45) Date of Patent: Apr. 6, 2021

(54) CONTROL APPROACH FOR POWER MODULATION OF END-USE LOADS

(71) Applicant: Battelle Memorial Institute, Richland, WA (US)

(72) Inventors: Jianming Lian, Richland, WA (US); Rui Fan, Richland, WA (US); Karanjit Kalsi, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 114 days.

(21) Appl. No.: 16/294,791

(22) Filed: Mar. 6, 2019

(65) Prior Publication Data
US 2019/0296577 A1    Sep. 26, 2019

Related U.S. Application Data

(60) Provisional application No. 62/646,000, filed on Mar. 21, 2018.

(51) Int. Cl.
*H02J 3/24*       (2006.01)
*G05B 19/042*     (2006.01)
*H02J 13/00*      (2006.01)

(52) U.S. Cl.
CPC .............. *H02J 3/24* (2013.01); *G05B 19/042* (2013.01); *H02J 13/00* (2013.01); *H02J 2310/14* (2020.01)

(58) Field of Classification Search
CPC .......... H02J 3/24; H02J 2310/14; H02J 3/144; H02J 3/08; G05B 19/042; G05B 2219/2639
See application file for complete search history.

(56) References Cited

U.S. PATENT DOCUMENTS 4,010,614 A    3/1977 Arthur
5,572,438 A    11/1996 Ehlers et al.
(Continued)

OTHER PUBLICATIONS

Sadikovic, Rusejla, Petr Korba, and Goran Andersson. "Application of FACTS devices for damping of power system oscillations." 2005 IEEE Russia Power Tech. IEEE, 2005. (Year: 2005).*

(Continued)

*Primary Examiner* — Michael D Masinick
(74) *Attorney, Agent, or Firm* — Klarquist Sparkman LLP

(57) ABSTRACT

Methods, apparatus, and systems are disclosed herein for power modulation control of power grids using end-use loads. At the beginning of a coordination period typically lasting a few minutes, a population of end-use loads (water heaters, air conditioners, plug-in electric vehicles, etc.) is interrogated for their willingness to participate in power modulation by undergoing state transitions from on to off, or off to on. Distribution system flexibilities are calculated from the sums of device powers within distribution systems. Area flexibilities are calculated from the sums of device powers within areas. Thresholds for various devices to change state in response to inter-area oscillation damping or frequency regulation are derived from these flexibilities. Two power functions are monitored in real-time and compared with the device thresholds to trigger state changes which then remain locked throughout the remainder of the coordination period, then the devices are released from the lockout state.

33 Claims, 17 Drawing Sheets

(56) References Cited

U.S. PATENT DOCUMENTS

| | | | |
|---|---|---|---|
| 5,684,710 A | 11/1997 | Ehlers et al. | |
| 5,696,695 A | 12/1997 | Ehlers et al. | |
| 5,924,486 A | 7/1999 | Ehlers et al. | |
| 6,216,956 B1 | 4/2001 | Ehlers et al. | |
| 6,343,277 B1 | 1/2002 | Gaus et al. | |
| 6,633,823 B2 | 10/2003 | Bartone et al. | |
| 6,681,156 B1 | 1/2004 | Weiss | |
| 6,895,325 B1 | 5/2005 | Munson, Jr. | |
| 6,963,854 B1 | 11/2005 | Boyd et al. | |
| 7,043,380 B2 | 5/2006 | Rodenberg et al. | |
| 7,085,739 B1 | 8/2006 | Winter et al. | |
| 7,130,719 B2 | 10/2006 | Ehlers et al. | |
| 7,135,956 B2 | 11/2006 | Bartone et al. | |
| 7,141,321 B2 | 11/2006 | McArthur et al. | |
| 7,243,044 B2 | 7/2007 | McCalla | |
| 7,249,169 B2 | 7/2007 | Blouin et al. | |
| 7,343,226 B2 | 3/2008 | Ehlers et al. | |
| 7,343,360 B1 | 3/2008 | Ristanovic et al. | |
| 7,379,997 B2 | 5/2008 | Ehlers et al. | |
| 7,418,428 B2 | 8/2008 | Ehlers et al. | |
| 7,516,106 B2 | 4/2009 | Ehlers et al. | |
| 7,599,866 B2 | 10/2009 | Yan et al. | |
| 7,716,101 B2 | 5/2010 | Sandholm et al. | |
| 7,953,519 B2 | 5/2011 | Hamilton, II et al. | |
| 7,996,296 B2 | 8/2011 | Lange | |
| 8,126,794 B2 | 2/2012 | Lange et al. | |
| 8,271,345 B1 | 9/2012 | Milgrom et al. | |
| 8,355,827 B2 | 1/2013 | Egnor et al. | |
| 8,478,452 B2 | 7/2013 | Pratt et al. | |
| 8,504,463 B2 | 8/2013 | Johnson et al. | |
| 8,527,389 B2 | 9/2013 | Johnson et al. | |
| 8,577,778 B2 | 11/2013 | Lange et al. | |
| 8,639,392 B2 | 1/2014 | Chassin | |
| 8,694,409 B2 | 4/2014 | Chassin et al. | |
| 8,700,225 B2 | 4/2014 | Pratt et al. | |
| 8,706,650 B2 | 4/2014 | Ozog | |
| 8,788,415 B2 | 7/2014 | Chassin et al. | |
| 8,892,264 B2 | 11/2014 | Steve et al. | |
| 9,026,473 B2 | 5/2015 | Chassin et al. | |
| 9,087,359 B2 | 7/2015 | Chassin | |
| 9,094,385 B2 | 7/2015 | Akyol et al. | |
| 9,129,337 B2 | 9/2015 | Chassin et al. | |
| 9,240,026 B2 | 1/2016 | Chassin et al. | |
| 9,245,297 B2 | 1/2016 | Chassin et al. | |
| 9,269,108 B2 | 2/2016 | Chassin et al. | |
| 9,342,850 B2 | 5/2016 | Chassin et al. | |
| 9,425,620 B2 | 8/2016 | Chassin et al. | |
| 9,589,297 B2 | 3/2017 | Fuller et al. | |
| 9,762,060 B2 | 9/2017 | Kalsi et al. | |
| 9,787,093 B2 * | 10/2017 | Covic | H02J 3/386 |
| 9,791,877 B2 * | 10/2017 | Aisa | H02J 3/00 |
| 9,817,375 B2 | 11/2017 | Li et al. | |
| 10,210,568 B2 | 2/2019 | Lian et al. | |
| 10,270,249 B2 * | 4/2019 | Covic | H02J 3/382 |
| 10,498,141 B2 | 12/2019 | Kalsi et al. | |
| 2001/0032029 A1 | 10/2001 | Kauffman | |
| 2002/0038279 A1 | 3/2002 | Samuelson et al. | |
| 2002/0091626 A1 | 7/2002 | Johnson et al. | |
| 2002/0128747 A1 | 9/2002 | Mima | |
| 2002/0132144 A1 | 9/2002 | McArthur et al. | |
| 2002/0178047 A1 | 11/2002 | Or et al. | |
| 2003/0014379 A1 | 1/2003 | Saias et al. | |
| 2003/0023540 A2 | 1/2003 | Johnson et al. | |
| 2003/0036820 A1 | 2/2003 | Yellepeddy et al. | |
| 2003/0040844 A1 | 2/2003 | Spool et al. | |
| 2003/0040845 A1 | 2/2003 | Spool et al. | |
| 2003/0041002 A1 | 2/2003 | Hao et al. | |
| 2003/0041016 A1 | 2/2003 | Spool et al. | |
| 2003/0041017 A1 | 2/2003 | Spool et al. | |
| 2003/0055774 A1 | 3/2003 | Ginsberg | |
| 2003/0078797 A1 | 4/2003 | Kanbara et al. | |
| 2003/0093332 A1 | 5/2003 | Spool et al. | |
| 2003/0093357 A1 | 5/2003 | Guler et al. | |
| 2003/0139939 A1 | 7/2003 | Spool et al. | |
| 2003/0144864 A1 | 7/2003 | Mazzarella | |
| 2003/0149672 A1 | 8/2003 | Laskoski | |
| 2003/0216971 A1 | 11/2003 | Sick et al. | |
| 2004/0010478 A1 | 1/2004 | Peljto et al. | |
| 2004/0024483 A1 | 2/2004 | Holcombe | |
| 2004/0128266 A1 | 7/2004 | Yellepeddy et al. | |
| 2004/0133529 A1 | 7/2004 | Munster | |
| 2004/0140908 A1 | 7/2004 | Gladwin et al. | |
| 2004/0153330 A1 | 8/2004 | Miller et al. | |
| 2004/0254688 A1 | 12/2004 | Chassin et al. | |
| 2005/0015283 A1 | 1/2005 | Iino et al. | |
| 2005/0027636 A1 | 2/2005 | Gilbert et al. | |
| 2005/0065867 A1 | 3/2005 | Aisu et al. | |
| 2005/0114255 A1 | 5/2005 | Shields et al. | |
| 2005/0125243 A1 | 6/2005 | Villalobos | |
| 2005/0137959 A1 | 6/2005 | Yan et al. | |
| 2005/0197875 A1 | 9/2005 | Kauffman | |
| 2005/0228553 A1 | 10/2005 | Tryon | |
| 2006/0036357 A1 | 2/2006 | Isono et al. | |
| 2006/0241951 A1 | 10/2006 | Cynamom et al. | |
| 2006/0259199 A1 | 11/2006 | Gjerde et al. | |
| 2006/0293980 A1 | 12/2006 | Corby et al. | |
| 2007/0011080 A1 | 1/2007 | Jain et al. | |
| 2007/0061248 A1 | 3/2007 | Shavit et al. | |
| 2007/0087756 A1 | 4/2007 | Hoffberg | |
| 2007/0124026 A1 | 5/2007 | Troxell et al. | |
| 2008/0021628 A1 | 1/2008 | Tryon | |
| 2008/0027639 A1 | 1/2008 | Tryon | |
| 2008/0039980 A1 | 2/2008 | Pollack et al. | |
| 2008/0046387 A1 | 2/2008 | Gopal et al. | |
| 2008/0051977 A1 | 2/2008 | Tryon | |
| 2008/0243664 A1 | 10/2008 | Shavit et al. | |
| 2008/0243682 A1 | 10/2008 | Shavit et al. | |
| 2008/0243719 A1 | 10/2008 | Shavit et al. | |
| 2008/0297113 A1 | 12/2008 | Saeki et al. | |
| 2008/0300907 A1 | 12/2008 | Musier et al. | |
| 2008/0300935 A1 | 12/2008 | Musier et al. | |
| 2008/0306801 A1 | 12/2008 | Musier et al. | |
| 2008/0319893 A1 | 12/2008 | Mashinsky et al. | |
| 2009/0063228 A1 | 3/2009 | Forbes | |
| 2009/0132360 A1 | 5/2009 | Arfin et al. | |
| 2009/0177591 A1 | 7/2009 | Thorpe et al. | |
| 2009/0195349 A1 | 8/2009 | Frader-Thompson et al. | |
| 2009/0228151 A1 | 9/2009 | Wang et al. | |
| 2009/0307059 A1 | 12/2009 | Young et al. | |
| 2009/0313174 A1 | 12/2009 | Hafner et al. | |
| 2010/0010939 A1 | 1/2010 | Arfin et al. | |
| 2010/0049371 A1 | 2/2010 | Martin | |
| 2010/0057625 A1 | 3/2010 | Boss et al. | |
| 2010/0076835 A1 | 3/2010 | Silverman | |
| 2010/0085144 A1 * | 4/2010 | Aisa | G05B 19/0423 340/3.1 |
| 2010/0106332 A1 | 4/2010 | Chassin et al. | |
| 2010/0106641 A1 | 4/2010 | Chassin et al. | |
| 2010/0107173 A1 | 4/2010 | Chassin | |
| 2010/0114387 A1 | 5/2010 | Chassin | |
| 2010/0121700 A1 | 5/2010 | Wigder et al. | |
| 2010/0179862 A1 | 7/2010 | Pratt et al. | |
| 2010/0216545 A1 | 8/2010 | Lange et al. | |
| 2010/0217550 A1 | 8/2010 | Crabtree et al. | |
| 2010/0218108 A1 | 8/2010 | Crabtree et al. | |
| 2010/0256999 A1 | 10/2010 | Ghani et al. | |
| 2010/0332373 A1 | 12/2010 | Crabtree et al. | |
| 2011/0015801 A1 | 1/2011 | Mazzarella | |
| 2011/0016055 A1 | 1/2011 | Mazzarella | |
| 2011/0081955 A1 | 4/2011 | Lange et al. | |
| 2011/0090042 A1 * | 4/2011 | Leonard | G05B 15/02 340/5.1 |
| 2011/0301964 A1 | 12/2011 | Conwell | |
| 2012/0022995 A1 | 1/2012 | Lange | |
| 2012/0083930 A1 | 4/2012 | Ilic et al. | |
| 2012/0185108 A1 * | 7/2012 | Howe | H02J 3/14 700/295 |
| 2012/0278220 A1 | 11/2012 | Chassin et al. | |
| 2012/0278221 A1 | 11/2012 | Fuller et al. | |
| 2013/0018515 A1 * | 1/2013 | Majumder | H02J 3/24 700/286 |
| 2013/0054035 A1 * | 2/2013 | Berggren | H02J 3/24 700/286 |
| 2013/0218743 A1 | 8/2013 | Chassin et al. | |

(56) References Cited

U.S. PATENT DOCUMENTS

| | | |
|---|---|---|
| 2013/0218744 A1 | 8/2013 | Chassin et al. |
| 2013/0254090 A1 | 9/2013 | Chassin et al. |
| 2013/0268132 A1 | 10/2013 | Pratt et al. |
| 2013/0325691 A1 | 12/2013 | Chassin et al. |
| 2013/0325692 A1 | 12/2013 | Chassin et al. |
| 2014/0084682 A1* | 3/2014 | Covic ................ H02J 13/0006 307/17 |
| 2014/0172503 A1 | 6/2014 | Hammerstrom et al. |
| 2014/0188689 A1 | 7/2014 | Kalsi et al. |
| 2014/0201018 A1 | 7/2014 | Chassin |
| 2014/0316595 A1* | 10/2014 | Kayton .................... H02J 3/14 700/291 |
| 2015/0214738 A1* | 7/2015 | Covic .................... H02J 3/386 307/31 |
| 2015/0220101 A1* | 8/2015 | Aisa ........................ H02J 3/14 307/31 |
| 2015/0379542 A1 | 12/2015 | Lian et al. |
| 2016/0092978 A1 | 3/2016 | Lian et al. |
| 2016/0092986 A1 | 3/2016 | Lian et al. |
| 2018/0026443 A1* | 1/2018 | Covic .............. H02J 13/00007 307/31 |
| 2018/0026445 A1 | 1/2018 | Kalsi et al. |
| 2018/0329383 A1 | 11/2018 | Lian et al. |
| 2019/0020220 A1 | 1/2019 | Lian et al. |
| 2019/0027933 A1 | 1/2019 | Lian et al. |
| 2019/0252882 A1* | 8/2019 | Li ............................. H02J 3/14 |

OTHER PUBLICATIONS

J. A. Short, D. G. Infield and L. L. Freris, "Stabilization of Grid Frequency Through Dynamic Demand Control," in IEEE Transactions on Power Systems, vol. 22, No. 3, pp. 1284-1293, Aug. 2007, doi: 10.1109/TPWRS.2007.901489. (Year: 2007).*

Azad, Sahar Pirooz, Reza Iravani, and Joseph Euzebe Tate. "Damping inter-area oscillations based on a model predictive control (MPC) HVDC supplementary controller." IEEE Transactions on Power Systems 28.3 (2013): 3174-3183. (Year: 2013).*

Xiao-Ming, Mao, et al. "Researches on coordinated control strategy for inter-area oscillations in AC/DC hybrid grid with multi-infeed HVDC." 2005 IEEE/PES Transmission & Distribution Conference & Exposition: Asia and Pacific. IEEE, 2005. (Year: 2005).*

Abdel-Magid et al., "Robust tuning of power system stabilizer in multimachine power systems," IEEE Trans. Power Syst., vol. 15, No. 2, pp. 735-740 (May 2000).

Aboul-Ela et al., "Damping controller design for power system oscillations using global signals," IEEE Trans. Power Syst., vol. 11, No. 2, pp. 767-773 (May 1996).

AEP gridSMART Demonstration Project, Available: http://www.gridsmartohio.com/, Aug. 2013, 1 page.

AEP Ohio power company standard tariff, Available: https://www.aepohio.com/account/bills/rates/AEPOhioRatesTariffsOH.aspx, Issued: Aug. 28, 2015, 187 pages.

Allcott, "Real Time Pricing and Electricity Markets," Harvard University, Feb. 5, 2009, 77 pages.

Basar, Lecture Notes on Noncooperative Game Theory, Jul. 26, 2010, 142 pages.

Bertsch et al., "Wide-area protection and power system utilization," Proc. IEEE, vol. 93, No. 5, pp. 997-1003 (May 2005).

Bilgin et al., "Smart building real time pricing for offering load-side regulation service reserves," In 52nd IEEE Conference on Decision and Control, pp. 4341-4348, 2013.

Bishop et al., "Pattern recognition and machine learning," vol. 1, Springer, New York, 2006, 703 pages.

Borenstein et al., "Diagnosing Market Power in California's Deregulated Wholesale Electricity Market," University of California Energy Institute, Power, PWP-064, 54 pp. (Aug. 2000).

Borenstein et al., "Diagnosing Market Power in California's Deregulated Wholesale Electricity Market," University of California Energy Institute, Power, PWP-064, 52 pp. (Mar. 2000).

Borenstein et al., "Dynamic Pricing, Advanced Metering, and Demand Response in Electricity Markets," Center for the Study of Energy Markets, 2002, 103 pages.

Boukarim et al., "A comparison of classical, robust and decetnralized control design for multiple power system stabilizers," IEEE Trans. Power Syst., vol. 15, No. 4, pp. 1287-1292 (Nov. 2000).

Boyd et al., "Load Reduction, Demand Response, and Energy Efficient Technologies and Strategies," Pacific Northwest National Laboratory PNNL-18111, 44 pp. (Nov. 2008).

Brambley, "Thinking Ahead: Autonomic Buildings," ACEEE Summer Study on the Energy Efficiency in Buildings, vol. 7, pp. 73-86 (2002).

Burke et al., "Robust Control of Residential Demand Response Network with Low Bandwidth Input," In Proceedings of Dynamic Systems and Control Conference, American Society of Mechanical Engineers, pp. 413-415, Oct. 20-22, 2008.

Cai et al., "Economic Dispatch in Microgrids Using Multi-Agent System," In North American Power Grid Symposium (NAPS), Sep. 2012, 5 pages.

Callaway et al., "Achieving controllability of electric loads," Proc. IEEE, vol. 99, No. 1, pp. 184-199 (Jan. 2011).

Chandley, "How RTOs Set Spot Market Prices (And How It Helps Keep the Lights On)," PJM Interconnection, 23 pp. (Sep. 2007).

Chang et al., "Modeling and Control of Aggregated Air Conditioning Loads Under Realistic Conditions," 2013 IEEE PES Innovative Smart Grid Technologies (ISGT), Feb. 2013, 6 pages.

Chao, "Price-Responsive Demand Management for a Smart Grid World," The Electricity Journal, vol. 23, No. 1, Jan. 2010, pp. 7-20.

Chassin, "The Abstract Machine Model for Transaction-based System Control," Pacific Northwest National Laboratory PNNL-14082, 28 pp. (Nov. 2002).

Chassin et al., "Decentralized Coordination through Digital Technology, Dynamic Pricing, and Customer-Driven Control: The GridWise Testbed Demonstration Project," The Electricity Journal, vol. 21, pp. 51-59 (Oct. 2008).

Chassin et al., "Gauss-Seidel Accelerated: Implementing Flow Solvers on Field Programmable Gate Arrays," IEEE Power Engineering Society General Meeting, 5 pp. (Jun. 2006).

Chassin et al., "GridLAB-D: An Open-source Power Systems Modeling and Simulation Environment," in IEEE Transmission and Distribution Conference and Exposition, Aug. 2008, 5 pages.

Chassin, "GridLAB-D Technical Support Document: Tape Modules Version 1.0," Pacific Northwest National Laboratory PNNL-17614, 8 pp. (May 2008).

Chassin, "GridLAB-D Technical Support Document: Commercial Modules Version 1.0," Pacific Northwest National Laboratory PNNL-17615, 8 pp. (May 2008).

Chassin, "GridLAB-D Technical Support Document: Network Module Version 1.0," Pacific Northwest National Laboratory PNNL-17616, 10 pp. (May 2008).

Chassin et al., "Modeling Power Systems as Complex Adaptive Systems," Pacific Northwest National Laboratory PNNL-14987, 151 pp. (Dec. 2004).

Chassin et al., "The pacific northwest demand response market demonstration," IEEE, 6 pp. (Jul. 2008).

Chassin et al., "Project 2.6—Enhancement of the Whole-Building Diagnostician," Pacific Northwest National Laboratory PNNL-14383, 17 pp. (Aug. 2003).

Chassin, "Statistical Mechanics: A Possible Model for Market-based Electric Power Control", Proc. of the 37th Hawaii Int'l Conf. on System Sciences, 10 pp. (Jan. 2004).

Chen et al., "The Influence of Topology Changes on Inter-area Oscillation Modes and Mode Shapes," IEEE Power and Energy Society General Meeting, 7 pp. (Jul. 2011).

Chen et al., "Real-time power control of data centers for providing regulation service," In 52nd IEEE Conference on Decision and Control, Dec. 10-13, 2013, pp. 4314-4321.

Chen et al., "Two Market Models for Demand Response in Power Networks," In Proceedings of 2010 First IEEE International Conference on Smart Grid Communications (SmartGridComm), Oct. 4-6, 2010, pp. 397-402.

Clearwater et al., "Thermal Markets for Controlling Building Environments," Energy Engineering, vol. 91, No. 3, pp. 26-56 (1994).

(56) References Cited

OTHER PUBLICATIONS

Collins, "Error Analysis in Scanned Holography," Oregon State University, Ph.D. thesis, Jun. 1970, 110 pages.

Conejo et al., "Price-Taker Bidding Strategy Under Price Uncertainty," IEEE Transactions on Power Systems, vol. 17, No. 4, Nov. 2002, pp. 1081-1088.

Cong et al., "FlowMap: An Optimal Technology Mapping Algorithm for Delay Optimization in Lookup-Table Based FPGA Designs," IEEE Transactions on Computer-Aided Design of Integrated Circuits and Systems, vol. 13, No. 1, Jan. 1994, 12 pages.

De Ladurantaye et al., "Strategic Bidding for Price-Taker Hydroelectricity Producers," IEEE Transactions on Power Systems, vol. 22, No. 4, Nov. 2007.

Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).

Denton et al., "Spot Market Mechanism Design and Competitivity Issues in Electric Power," Proc. of the 31st Hawaii International Conference on System Sciences, vol. 3, pp. 48-56 (Jan. 1998).

Diao et al., "Deriving Optimal Operational Rules for Mitigating Inter-area Oscillations," IEEE/PES Power Systems Conference & Exposition, 8 pp. (Mar. 2011).

Dominguez-Garcia et al., "Resilient Networked Control of Distributed Energy Resources," IEEE Journal on Selected Areas in Communications, vol. 30, No. 6, Jul. 2012, pp. 1137-1148.

Driesen et al., "Design for Distributed Energy Resources," IEEE Power & Energy Magazine, vol. 6, No. 3, pp. 30-40, May/Jun. 2008.

El-Moursi et al., "Novel STATCOM controller for mitigating SSR and damping power system oscillations in a series compensated wind park," IEEE Trans. Power Electron., vol. 25, No. 2, pp. 40-45 (Feb. 2010).

Fahrioglu et al., "Designing Incentive Compatible Contracts for Effective Demand Management," IEEE Transactions on Power Systems, vol. 15, No. 4, Nov. 2000, pp. 1255-1260.

Fan et al., "Linear quadratic control of SSSC to increase power oscillations damping of HVDC-AC power system," in Proc. 2015 IEEE Power Energy Society General Meeting, Jul. 2015, pp. 1-5.

Fan et al., "Oscillation Damping Control Using Multiple High Voltage DC Transmission Lines: Controllability Exploration," in Proc. 2018 IEEE Power Energy Society Transmission, Distribution, pp. 1-5 (2018).

Farhangi, "The Path of the Smart Grid," IEEE Power & Energy Magazine, vol. 8, No. 1, pp. 18-28, Jan./Feb. 2010.

Farsangi et al., "Choice of FACTS device control inputs for damping interarea oscillations," IEEE Trans. Power Syst., vol. 19, No. 2, pp. 1135-1143 (May 2004).

Faruqui et al., "The impact of informational feedback on energy consumption—A survey of the experimental evidence," Energy, vol. 35, No. 4, 2010, pp. 1598-1608.

Feigenbaum et al., "Distributed Algorithmic Mechanism Design: Recent Results and Future Directions," In Proceedings of the 6th International Workshop on Discrete Algorithms and Methods for Mobile Computing and Communications, Sep. 2002, 13 pages.

Fernandez et al., "Self Correcting HVAC Controls: Algorithms for Sensors and Dampers in Air-Handling Units," Pacific Northwest Laboratory PNNL-19104, 49 pp. (Dec. 2009).

Francis et al., "Chortle-crf: Fast Technology Mapping for Lookup Table-Based Conference, Jun. 21, 1991, FPGAs," 28th ACM/IEEE Design Automation pp. 227-233.

Fuller et al., "Analysis of Residential Demand Response and Double-Auction Markets," In Power and Energy Society General Meeting, IEEE, Jul. 24-29 2011, 7 pages.

Fuller et al., "Analysis of Residential Demand Response and Double-Auction Markets," IEEE Power and Energy Society General Meeting, 7 pp. (Jul. 2011).

Fuller et al., "Evaluation of Representative Smart Grid Investment Grant Project Technologies: Demand Response," Pacific Northwest National Laboratory PNNL-20772, 349 pp. (Feb. 2012).

Fuller et al., "Modeling of GE Appliances in GridLAB-D: Peak Demand Reduction," Pacific Northwest National Laboratory PNNL-21358, 157 pp. (Apr. 2012).

Gatterbauer, "Interdependencies of Electricity Market Characteristics and Bidding Strategies of Power Producers," Master's Thesis, Massachusetts Institute of Technology, 33 pp. (May 2002).

Georgilakis, "Market Clearing Price Forecasting in Deregulated Electricity Markets Using Adaptively Trained Neural Networks," Hellenic Conference on Artificial Intelligence, vol. 3955, pp. 56-66 (2006).

Gibbard et al., "Interactions between, and effectiveness of, power system stabilizers and FACTS devices stabilizers in multimachine systems," IEEE Trans., Power Syst., vol. 15, No. 2, pp. pp. 748-755 (May 2000).

Gjerstad et al., "Price Formation in Double Auctions," Games and Economic Behavior, vol. 22, article No. GA970576, pp. 1-29 (1998). (Document marked as Received Nov. 30, 1995).

Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).

GridLAB-D residential module user's guide, Available: http://sourceforeg.net/apps/mediawiki/gridlab-d, last modified on Oct. 22, 2013, 24 pages.

Guttromson et al., "Residential energy resource models for distribution feeder simulation," IEEE, vol. 1, pp. 108-113 (Jul. 2003).

Hammerstrom et al., "Pacific Northwest GridWise™ Testbed Demonstration Projects," Part I, Olympic Peninsula Project, Pacific Northwest National Laboratory, Oct. 2007, 157 pages.

Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).

Hammerstrom et al., "Standardization of a Hierarchical Transactive Control System," Grid Interop Conf., 7 pp. (Nov. 2009).

Han et al., "Development of an Optimal Vehicle-to-Grid Aggregator for Frequency Regulation," IEEE Transactions on Smart Grid, vol. 1, No. 1, Jun. 2010, pp. 65-72.

Hao et al., "Aggregate Flexibility of Thermostatically Controlled Loads," IEEE Transactions on Power Systems, vol. 30, No. 1, Jan. 2015, pp. 189-198.

Hao et al., "Ancillary Service for the Grid via Control of Commercial Building HVAC Systems," In 2013 American Control Conference, IEEE, Jun. 17-19, 2013, pp. 467-472.

Hatley et al., "Energy Management and Control System: Desired Capabilities and Functionality," Pacific Northwest National Laboratory PNNL-15074, 46 pp. (Apr. 2005).

Hô et al., "Econophysical Dynamics of Market-Based Electric Power Distribution Systems," IEEE, pp. 1-6 (Jan. 2006).

Hsu et al., "Dispatch of Direct Load Control Using Dynamic Programming," IEEE Transactions on Power Systems, vol. 6, No. 3, Aug. 1991, pp. 1056-1061.

Huang et al., "Analytics and Transactive Control Design for the Pacific Northwest Smart Grid Demonstration Project," In 2010 First IEEE International Conference on Smart Grid Communications (SmartGridCom), IEEE, Oct. 4-6, 2010, pp. 449-454.

Huang et al., "MANGO—Modal Analysis for Grid Operation: A Method for Damping Improvement through Operating Point Adjustment," Pacific Northwest National Laboratory PNNL-19890, 92 pp. (Oct. 2010).

Huang et al., "Transforming Power Grid Operations," Scientific Computing, vol. 45, No. 5, pp. 22-27 (Apr. 2007).

Huberman et al., "A Multi-Agent System for Controlling Building Environments," In Proceedings of the First International Conference on Multiagent Systems, Jun. 12-14, 1995, pp. 171-176.

Human Solutions, "Anthroscan—System Solution for Serial Measurements" [undated], 4 pages.

Hurwicz, "The Design of Mechanisms for Resource Allocation," In the American Economic Review, Papers and Proceedings of the Eighty-fifth Annual Meeting of the American Economic Association, vol. 63, No. 2, May 1973, 31 pages.

(56) References Cited

OTHER PUBLICATIONS

Kakhbod et al., "Power Allocation and Spectrum Sharing in Wireless Networks: An Implementation Theory Approach," Mechanisms and Games for Dynamic Spectrum Allocation (Chapter 5), Feb. 2014, 42 pages.
Kamwa et al., "Wide-area measurement based stabilizing control of large power systems—A decentralized/hierarchical approach," IEEE Trans. Power Syst., vol. 16, No. 1, pp. 136-153 (Feb. 2001).
Kannberg et al., "GridWise: The Benefits of a Transformed Energy System," Pacific Northwest National Laboratory PNNL-14396, 48 pp. (Sep. 2003).
Kar et al., "Distributed Robust Economic Dispatch in Power Systems: A Concensus + Innovations Approach," In Proc. IEEE Power and Energy Society General Meeting, Jul. 2012, 8 pages.
Katipamula et al., "Evaluation of Residential HVAC Control Strategies for Demand Response Programs," ASHRAE Trans., Symp. on Demand Response Strategies for Building Systems, 12 pp (Jan. 2006).
Katipamula et al., "Transactive Controls: A Market-Based GridWise Controls for Building Systems," Pacific Northwest National Laboratory PNNL-15921, 14 pp. (Jul. 2006).
Kersting, "Radial Distribution Test Feeders," IEEE Transactions on Power Systems, vol. 6, No. 3, pp. 975-985, Aug. 1991.
Kiesling, "Retail Electricity Deregulation: Prospects and Challenges for Dynamic Pricing and Enabling Technologies," The Searle Center Annual Review of Regulation, 44 pp. (May 2007).
Kim et al., "Scheduling Power Consumption With Price Uncertainty," IEEE Transactions on Smart Grid, vol. 2, No. 3, Sep. 2011, pp. 519-527.
Kinter-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).
Klein et al., "A fundamental study of inter-area oscillations in power systems," IEEE Trans. Power Syst., vol. 6, No. 3, pp. 914-920, (1991).
Kok et al., "Agent-based Electricity Balancing with Distributed Energy Resources, A Multiperspective Case Study," Proc. Hawaii Int'l Conf. on System Sciences, 10 pp. (Jan. 2008).
Kok et al., "Dynamic Pricing by Scalable Energy Management Systems—Field Experiences and Simulation Results using PowerMatcher," In IEEE Power and Energy Society General Meeting, Jul. 2012, 8 pages.
Kok et al., "Intelligence in Electricity Networks for Embedding Renewables and Distributed Generation," In Intelligent infrastructures, Springer, 2010, pp. 179-209.
Kok et al., "PowerMatcher: Multiagent Control in the Electricity Infrastructure," AAMAS, 8 pp. (Jul. 2005).
Kundur, Power system stability and control, New York: McGraw-Hill, (1994).
Lasseter et al., "Integration of Distributed Energy Resources. The CERTS MicroGrid Concept," Lawrence Berkeley National Laboratory, Oct. 2013, 32 pages.
Lemay et al., "An Integrated Architecture for Demand Response Communications and Control," Hawaii Int'l Conf. on System Sciences, 10 pp. (Jan. 2008).
Lerch et al., "Advanced SVC control for damping power system oscillations," IEEE Trans. Power Syst., vol. 6, No. 2, pp. 524-535 (May 1991).
Li et al., "Integrated Power Management of Data Centers and Electric Vehicles for Energy and Regulation Market Participation," IEEE Transactions on Smart Grid, vol. 5, No. 5, Sep. 2014, pp. 2283-2294.
Li et al., Market-Based Coordination of Thermostatically Controlled Loads—Part I: Mechanism Design Formulation, IEEE Transactions on Power System, under review, Mar. 15, 2015, 11 pages.
Li et al., Market-Based Coordination of Thermostatically Controlled Loads—Part II: Unknown Parameters and Case Studies, IEEE Transactions on Power System, has been accepted for inclusion in a future issue, 9 pages.
Li et al., "A Market Mechanism Design Approach for Coordination of Thermostatically Controlled Loads With Unknown Parameters (Part I)," IEEE Transactions on Power System, 2014, 8 pages.
Li et al., "A Market Mechanism Design Approach for Coordination of Thermostatically Controlled Loads With Unknown Parameters (Part II)," IEEE Transactions on Power System, 2014, 8 pages.
Li et al., "A Mechanism Design Approach for Coordination of Thermostatically Controlled Loads," Available at http://arxiv.org/abs/1503.02705, last updated Jun. 15, 2015, 16 pages.
Li et al., "Optimal Demand Response Based on Utility Maximization in Power Networks," In Power and Energy Society General Meeting, IEEE, Jul. 24-29, 2011, 8 pages.
Li et al., "Wide-area robust coordination approach of HVDC and FACTS controllers for damping multiple interarea oscillations," IEEE Trans. Power Del., vol. 27, No. 3, pp. 1096-1105 (Jul. 2012).
Lian et al., "Decentralized robust control for damping inter-area oscillations in power systems," CoRR, vol. abs/1701.02036, (2017). [Online]. Available: http://arxiv.org/abs/1701. 02036.
Lian et al., "Hierarchical decentralized control strategy for demand-side primary frequency response," in 2016 IEEE Power and Energy Society General Meeting (PESGM), Jul. 2016, pp. 1-5.
Lian et al., "Wide-area Demand-side Control for Inter-area Oscillation Mitigation in Power Systems," 5 pp. (no date).
Liu et al., "Planning and Control of Electric Vehicles Using Dynamic Energy Capacity Models," In 52nd Annual Conference on Decision and Control (CDC), IEEE, Dec. 10-13, 2013, pp. 379-384.
Ljung, System Identification: Theory for the User, 255 pages (Prentice Hall 1987).
Lu et al., "Control Strategies of Thermostatically Controlled Appliances in a Competitive Electricity Market," IEEE Proc. Power Engineering Society General Meeting, pp. 202-207 (Jun. 2005).
Lu et al., "Design Considerations for Frequency Responsive Grid Friendly Appliances," IEEE PES Trans. and Distribution Conference and Exhibition, 6 pp. (May 2006).
Lu et al., "An Evaluation of the HVAC Load Potential for Providing Load Balance Service," IEEE Transactions on Smart Grid, vol. 3, No. 3, Sep. 2012, pp. 1263-1270.
Lu et al., "Grid Friendly Device Model Development and Simulation," Pacific Northwest National Laboratory PNNL-18998, 52 pp. (Nov. 2009).
Lu et al., "Modeling Uncertainties in Aggregated Thermostatically Controlled Loads Using a State Queueing Model," IEEE Trans. on Power Systems, vol. 20, No. 2, pp. 725-733 (May 2005).
Lu et al., "Reputation-Aware Transaction Mechanisms in Grid Resource Market," IEEE Sixth Int'l Conf. on Grid and Cooperative Computing, 6 pp. (Aug. 2007).
Lu et al., "Simulating Price Responsive Distributed Resources," IEEE, vol. 3, pp. 1538-1543 (Oct. 2004).
Lu et al., "A State-Queueing Model of Thermostatically Controlled Appliances," IEEE Trans. on Power Systems, vol. 19, No. 3, pp. 1666-1673 (Aug. 2004).
Marion et al., "User's Manual for TMY2s: Typical Meteorological Years: Derived from the 1961-1990 National Solar Radiation data Base," National Renewable Energy Laboratory, Jun. 1995, 55 pages.
Mas-Colell et al., "Microeconomic Theory," Oxford University Press, © 1995, 501 pages
Maskin, "Mechanism Design: How to Implement Social Goals," In Les Prix Nobel 2007, pp. 296-307 (2008).
Mathieu et al., "State Estimation and Control of Electric Loads to Manage Real-Time Energy Imbalance," IEEE Transactions on Power Systems, vol. 28, No. 1, Feb. 2013, pp. 430-440.
Moeslund, et al., "A Survey of Computer Vision-Based Human Motion Capture," Computer Vision and Image Understanding, vol. 81, No. 3, Mar. 2001, pp. 231-268.
Mohsenian-Rad et al., "Optimal Residential Load Control With Price Prediction in Real-Time Electricity Pricing Environments," IEEE Transactions on Smart Grid, vol. 1, No. 2, Sep. 2010, pp. 120-133.

(56) References Cited

OTHER PUBLICATIONS

Motalleb et al., "Providing frequency regulation reserve services using demand response scheduling," Energy Conversion and Management, vol. 124, pp. 439-452, (2016). [Online]. Available: http://www.sciencedirect.com/science/article/pii/S0196890416306276.

Nanduri et al., "A Methodology for Evaluating Auction Based Pricing Strategies in Deregulated Energy Markets," Working Paper, 12 pp. (2005).

Nanduri, et al., "A Reinforcement Learning Model to Assess Market Power Under Auction-Based Energy Pricing," IEEE Trans. on Power Systems, vol. 22, No. 1, pp. 85-95 (Feb. 2007).

Neely et al., "Damping of interarea oscillations using energy storage," in Proc. 2013 IEEE PES General Meeting, Vancouver, BC, (Jul. 2013).

Nguyen et al., "Optimal Bidding Strategy for Microgrids Considering Renewable Energy and Building Thermal Dynamics," IEEE Transactions on Smart Grid, vol. 5, No. 4, Jul. 2014, pp. 1608-1620.

Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).

Non-Final Office Action issued in U.S. Appl. No. 14/866,457, dated Mar. 13, 2018, 18 pages.

Notice of Allowance for U.S. Appl. No. 14/866,457, dated Sep. 4, 2018, 9 pages.

Ntakou et al., "Price Discovery in Dynamic Power Markets with Low-Voltage Distribution-Network Participants," In IEEE Transmission and Distribution Conference and Exposition, Apr. 14-17, 2014, 5 pages.

O'Neill et al., "Model-Based Thermal Load Estimation in Buildings," Fourth National Conference of IBPSA-USA, Aug. 2010, 9 pages.

Pal et al., "Robust damping controller design in power systems with superconducting magnetic energy storage devices," IEEE Trans. Power Syst., vol. 15, No. 1, pp. 320-325, (Feb. 2000).

Palensky et al., "Demand Side Management: Demand Response, Intelligent Energy Systems, and Smart Loads," IEEE Transactions on Industrial Informatics, vol. 7, No. 3, Aug. 2011, pp. 381-388.

Pantoja et al., "Dispatch of Distributed Generators under Local-Information Constraints," In 2014 American Control Conference (ACC), Jun. 4-6, 2014, pp. 2682-2687.

Papavasilou et. al., "Large-Scale Integration of Deferrable Demand and Renewable Energy Sources", IEEE Transactions on Power Systems, vol. 29, No. 1, pp. 489-499, Jan. 1, 2014.

Parkes, "Iterative Combinatorial Auctions: Achieving Economic and Computational Efficiency," PhD thesis, University of Pennsylvania, 2000, 115 pages.

Paschalidis et al., "Demand-Side Management for Regulation Service Provisioning Through Internal Pricing," IEEE Transactions on Power System, vol. 27, No. 3, Aug. 2012, pp. 1531-1539.

Pedrasa et al., "Coordinated Scheduling of Residential Distributed Energy Resources to Optimize Smart Home Energy Services," IEEE Transactions on Smart Grid, vol. 1, No. 2, Sep. 2010, pp. 134-143.

Philpott et. al., "Optimized Demand-Side Bids in Day-Ahead Electricity Markets", IEEE Transactions on Power Systems, vol. 21, No. 2, pp. 488-498, (May 2006).

Pierre et al., "Supervisory system for a wide area damping controller using pdci modulation and real-time pmu feedback," in 2016 IEEE Power and Energy Society General Meeting (PESGM), Jul. 2016, pp. 1-5.

PJM wholesale market energy price, available at: http://www.pjm.com/markets-and-operations/energy.aspx, uploaded Sep. 16, 2015, 3 pages.

Plott et al., "Instability of Equilibria in Experimental Markets: Upward-sloping Demands, Externalities, and Fad-like Incentives," Southern Economic Journal, vol. 65 (3), 23 pp. (Jan. 1999).

Pourebrahimi et al., "Market-based Resource Allocation in Grids," IEEE Int'l Conf. on e-Science and Grid Computing, 8 pp. (2006).

Pratt et al., "Potential Impacts of High Penetration of Plug-in Hybrid Vehicles on the U.S. Power Grid," DOE/EERE PHEV Stakeholder Workshop, 14 pp. (Jun. 2007).

Rahimi et al., "Demand Response as a Market Resource Under the Smart Grid Paradigm," IEEE Transactions on Smart Grid, vol. 1, No. 1, Jun. 2010, pp. 82-88.

Ramos et al., "A new methodology for the coordinated design of robust decentralized power system damping controllers," IEEE Trans. Power Syst., vol. 19, No. 1, pp. 444-454 (Feb. 2004).

Rao et al., "Robust pole placement stabilizer design using linear matrix inequalities," IEEE Trans. Power Syst., vol. 15, No. 1, pp. 313-319 (Feb. 2000).

Rasouli et al., "Electricity Pooling Markets with Strategic Producers Possessing Asymmetric Information I: Elastic Demand," arXiv:1401.4230, Jan. 17, 2014, 8 pages.

Reiter, "Information Incentive and Performance in the (new) Welfare Economics," reprinted from American Economic Review, vol. 67, No. 1, Feb. 1977, 27 pages.

Sage et al., Estimation Theory with Applications to Communications and Control, 540 pages (1971).

Salehfar et al., "A Production Costing Methodology for Evaluation of Direct Load Control," IEEE Transactions on Power Systems, vol. 6, No. 1, Feb. 1991, pp. 278-284.

Samadi et al., "Advanced Demand Side Management for the Future Smart Grid Using Mechanism Design," IEEE Transactions on Smart Grid, vol. 3, No. 3, Sep. 2012, pp. 1170-1180.

Satayapiwat et al., "A Utility-based Double Auction Mechanism for Efficient Grid Resource Allocation," Int'l Symp. on Parallel and Distributed Processing with Applications (ISPA '08), pp. 252-260 (Dec. 10-12, 2008).

Schneider et al., "Analysis of Distribution Level Residential Demand Response," IEEE/PES Power System Conference and Exposition, 6 pp. (Mar. 2011).

Schneider et al., "Detailed End Use Load Modeling for Distribution System Analysis," IEEE Power and Energy Society General Meeting, 7 pp. (Jul. 2010).

Schneider et al., "Distribution Power Flow for Smart Grid Technologies," IEEE/PES Power System Conference and Exhibition, 7 pp. (Mar. 2009).

Schneider et al., "Evaluation of Conservation Voltage Reduction (CVR) on a National Level," Pacific Northwest National Laboratory PNNL-19596, 114 pp. (Jul. 2010).

Schneider et al., "Modern Grid Strategy: Enhanced GridLAB-D Capabilities Final Report," Pacific Northwest National Laboratory PNNL-18864, 30 pp. (Sep. 2009).

Schneider et al., "Multi-State Load Models for Distribution System Analysis," IEEE Trans. on Power Systems, vol. 26, No. 4, pp. 2425-2433 (Nov. 2011).

Schneider et al., "A Taxonomy of North American Radial Distribution Feeders," IEEE Power & Energy Society General Meeting, 6 pp. (Jul. 2009).

Schneider et al., "Voltage Control Devices on the IEEE 8500 Node Test Feeder," IEEE PES Transmission & Distribution Conference & Exposition, 6 pp. (Apr. 2010).

Sharma et al., "Local public good provisioning in networks: A Nash implementation mechanism," IEEE Journal on Selected Areas in Communications, vol. 30, No. 11, Dec. 2012, pp. 2105-2116.

Singh et al., "Effects of Distributed Energy Resources on Conservation Voltage Reduction (CVR)," IEEE Power and Energy Society General Meeting, 7 pp. (Jul. 2011).

Sonderegger, "Diagnostic Tests Determining the Thermal Response of a House," Lawrence Berkeley Laboratory, Nov. 1977, 18 pages.

Sonderegger, "Dynamic models of house heating based on equivalent thermal parameters," Ph.D. Thesis, Princeton University, Dec. 1978, 277 pages.

Steinway, Book Review of "Estimation Theory with Applications to Communication and Control," IEEE Transactions on Systems, Man, and Cybernetics, Oct. 1971, p. 405.

Taylor et al., "GridLAB-D Technical Support Document: Residential End-Use Module Version 1.0," Pacific Northwest National Laboratory PNNL-17694, 30 pp. (Jul. 2008).

(56) References Cited

OTHER PUBLICATIONS

Trudnowski et al., "PDCI damping control analysis for the western North American Power System," in Proc. 2013 IEEE PES General Meeting, Vancouver, BC, (Jul. 2013).
Trudnowski et al., "The MinniWECC System Model," Appendix 2 of Year 1 report of BPA contract 37508 (Sep. 2008).
Vandael et al., "A Scalable Three-Step Approach for Demand Side Management of Plug-in Hybrid Vehicles," IEEE Transactions on Smart Grid, vol. 4, No. 2, Jun. 2013, pp. 720-728.
Vrettos et al., "Demand Response with Moving Horizon Estimation of Individual Thermostatic Load States from Aggregate Power Measurements," In 2014 American Control Conference (ACC), Jun. 4-6, 2014, pp. 4846-4853.
Weather History for KOSU, Aug. 2009, 5 pages.
Weather Underground: Weather History for Ohio State University, OH, downloaded from http://www.wunderground.com, 4 pages.
Wellman, "A Market-Oriented Programming Environment and its Application to Distributed Multicommodity Flow Problems," Journal of Artificial Intelligence Research, Aug. 1993, 23 pages.
Widergren et al., "Residential Real-time Price Response Simulation," IEEE Power and Energy Society General Meeting, pp. 3074-3078 (Jul. 2011).
Wilson et al., "Equivalent Thermal Parameters for an Occupied Gas-Heated House," ASHRAE Trans.; (United States), 91(CONF-850606-), 1985, pp. 1875-1885.
Wolak, "Residential Customer Response to Real-Time Pricing: The Anaheim Critical-Peak Pricing Experiment," document marked May 24, 2006, 49 pages (also published as Wolak, "Residential Customer Response to Real-Time Pricing: The Anaheim Critical-Peak Pricing Experiment," Center for the Study of Energy Markets (2007)).
Yang, "Adaptively Robust Kalman Filters with Applications in Navigation," Chapter 2 of Sciences of Geodesy-1, Jun. 2010, pp. 49-82.
Yang et al., "Consensus Based Approach for Economic Dispatch Problem in a Smart Grid," IEEE Transactions on Power Systems, vol. 28, No. 4, Nov. 2013, pp. 4416-4426.
Yang et al., "TCSC controller design for damping interarea oscillations," IEEE Trans. Power Syst., vol. 13, No. 4, pp. 1304-1310 (Nov. 1998).
Ygge et al., "Decentralized Markets versus Central Control: A Comparative Study," Journal of Artificial Intelligence Research, vol. 11, Oct. 1999, pp. 301-333.
Ygge et al., "Making a Case for Multi-Agent Systems," Research Report Apr. 1997, University of Karlskrona/Ronneby, Sweden 23 pages (also published as Ygge et al., "Making a Case for Multi-Agent Systems," In Multi-Agent Rationality, pp. 156-176, Springer Berlin Heidelberg (1997)).
Ygge, "Market-Oriented Programming and its Application to Power Load Management," Lund University, Ph.D. Thesis, 1998.
Ygge et al., "Power Load Management as a Computational Market," document not dated, 14 pages (published as Ygge et al., "Power Load Management as a Computational Marked," Proceedings of the 2nd International Conference on Multi-Agent Systems (ICMAS '96), pp. 393-400, (1996).
Yin et al., "A Novel Double Auction Mechanism for Electronic Commerce: Theory and Implementation," IEEE Proc. of the Third Int'l Conf. on Machine Learning and Cybernetics, pp. 53-58 (Aug. 2004).
Zarghami et al., "A novel approach to interarea oscillation damping by unified power flow controllers utilizing ultracapacitors," IEEE Trans. Power Syst., vol. 25, No. 1, pp. 404-412 (Feb. 2010).
Zhang et al., "A novel modal decomposition control and its application to PSS design for damping interarea oscillations in power systems," IEEE Trans. Power Syst., vol. 27, No. 4, pp. 2015-2025, (Nov. 2012).
Zhang et al., "Aggregated Modeling and Control of Air Conditioning Loads for Demand Response," IEEE Transactions on Power Systems, vol. 28, No. 4, pp. 4655-4664 (Nov. 2013).
Zhang et al., "Convergence Analysis of the Incremental Cost Consensus Algorithm Under Different Communication Network Topologies in a Smart Grid," IEEE Transactions on Power System, vol. 27, No. 4, pp. 1761-1768 (Nov. 2012).
Zhang et al., "Decentralizing the Economic Dispatch Problem using a Two-Level Incremental Cost Consensus Algorithm in a Smart Grid Environment," In 2011 North American Power Symposium (NAPS), IEEE, Aug. 4-6, 2011, 7 pages.
Zhang et al., "Design of wide-area damping controllers for interarea oscillations," IEEE Trans. Power Syst., vol. 23, No. 3, pp. 1136-1143, (Aug. 2008).

\* cited by examiner

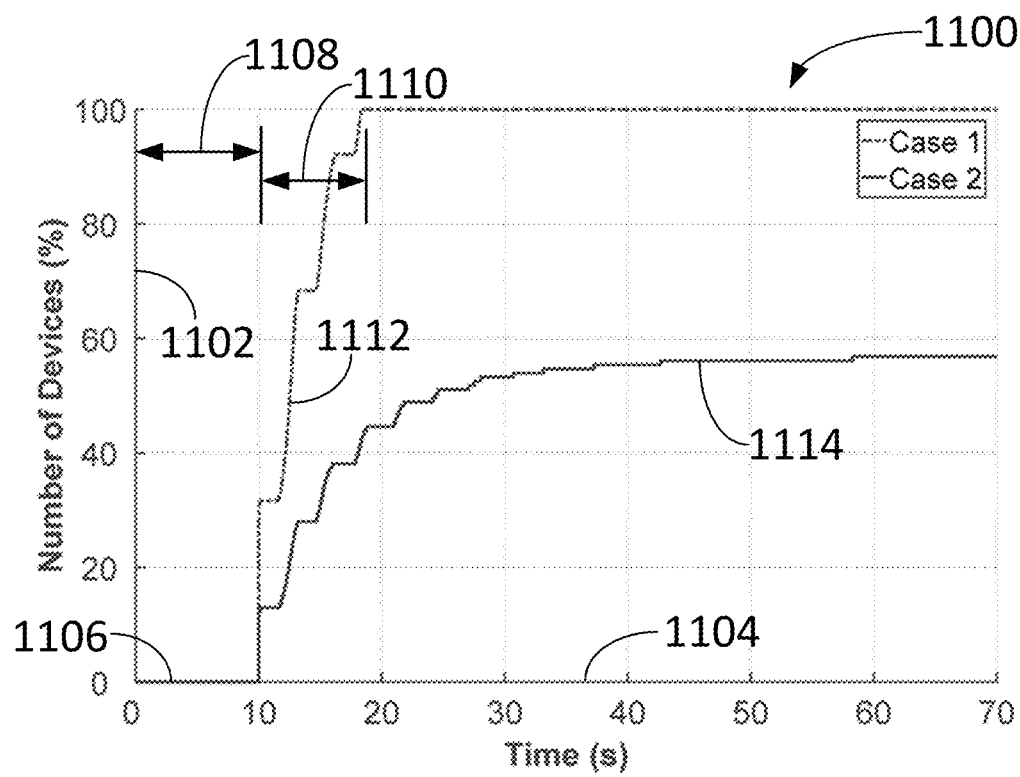
(a) ON-LCK    FIG. 11
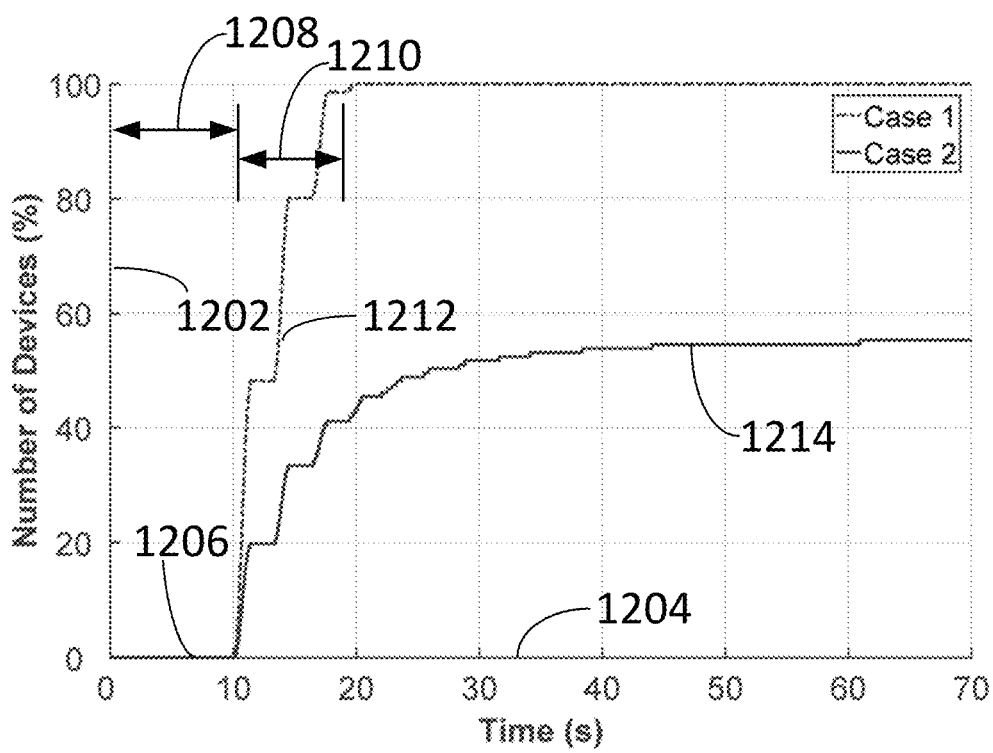
(b) OFF-LCK    FIG. 12

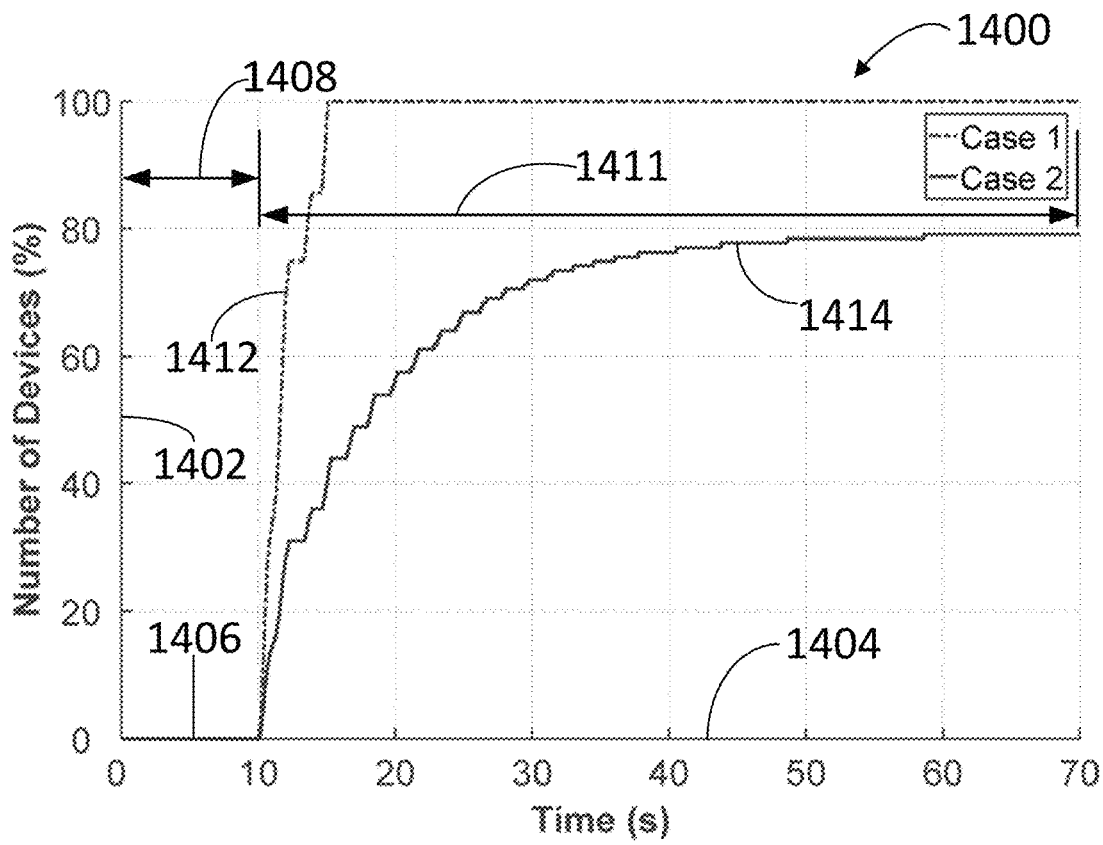
(a) ON-LCK  FIG. 14
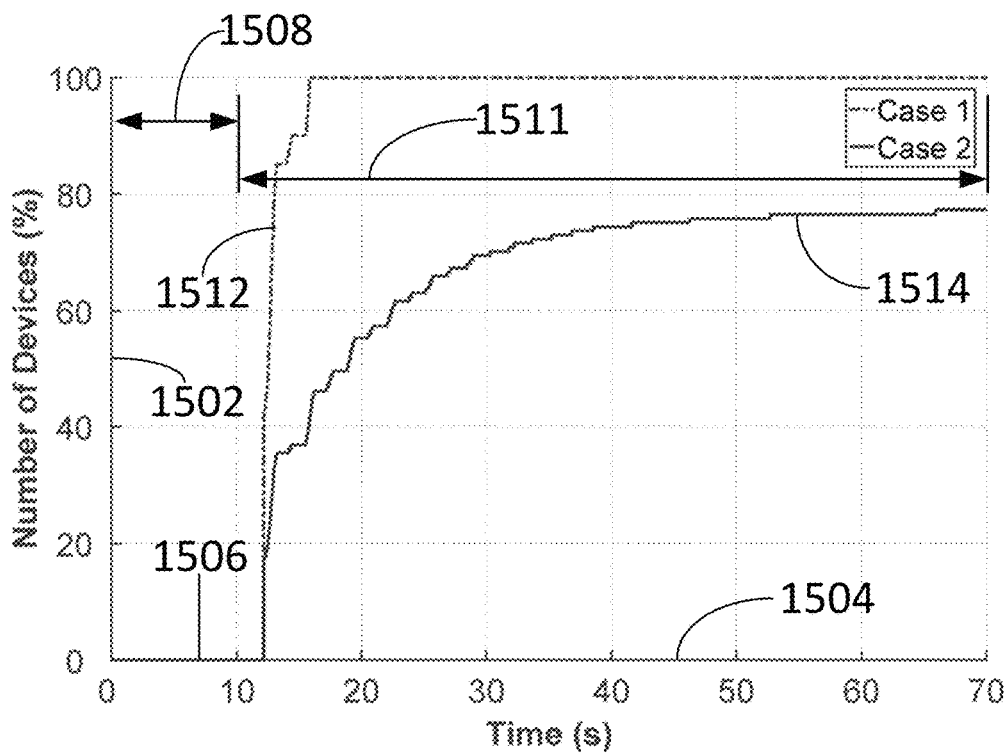
(b) OFF-LCK  FIG. 15

CONTROL APPROACH FOR POWER MODULATION OF END-USE LOADS

CROSS-REFERENCE TO RELATED APPLICATIONS

This application claims priority to and the benefit of U.S. Provisional Patent Application No. 62/646,000, filed Mar. 21, 2018, which application is incorporated herein by reference in its entirety.

ACKNOWLEDGMENT OF GOVERNMENT SUPPORT

This disclosure was made with Government support under Contract DE-AC0576RL01830 awarded by the U.S. Department of Energy. The Government has certain rights in the invention.

FIELD

This application relates generally to the field of power grid management and control.

BACKGROUND

In the management of modern power grids, inter-area oscillations are a growing problem stemming from reductions in stability margins arising as power grids are pushed ever closer to their operating limits. The degree of damping of these oscillations typically decreases as power transfers between areas grow larger, especially over weak transmission connections and longer distances. Such oscillations may lead to system breakup and even cascading blackouts. Inadequate availability of sufficient energy storage, HVDC lines, and generators with fast-acting governors remains a limitation on the practical application of direct methods for modulating real power in order to damp inter-area oscillations. Therefore, there remains ample opportunity for improvement to inter-area oscillation damping in power grids.

On the other hand, the integration of renewable energy into modern power grids has become a growing trend due to growing environmental concerns as well as economic and political requirements. However, the vast integration of intermittent renewable energy into power grids can substantially reduce the total system inertia as well as decrease contingency reserves, as conventional generation is gradually displaced by non-dispatchable renewable generation. Therefore, it becomes extremely difficult for system operators to maintain the stability and reliability of power grids. However, requiring these additional reserves to be provided by conventional generation will diminish the net carbon benefit from renewables, reduce generation efficiency, and become economically untenable. Therefore, there also remains ample opportunity to improve frequency regulation in power grids.

SUMMARY

Apparatus and methods are disclosed for power modulation of a power grid comprising a plurality of end-use loads. Examples of practical applications of the disclosed technology include apparatus and methods for implementing demand-side control to achieve direct modulation of real power demand in order to damp inter-area oscillations or provide frequency regulation. Certain disclosed apparatus and methods can be used for practical applications including active control of devices such as air conditioners, water heaters, plug-in electric vehicles, etc. In some examples, both primary frequency response (rapid) and secondary frequency regulation (slower) become practical on a large scale. Desired goals of speed, accuracy and magnitude can all be achievable through real-time modulation of this heterogeneous collection of multiple types of end-use loads. In some examples of the disclosed technology, three aspects of the power system (generation, transmission and distribution, and demand) can participate in the control of power distribution over large distances and with substantially improved robustness with respect to variations in load and topology in order to prevent or reduce the occurrences of system break up and possible resultant blackouts.

In some practical applications of an example control method according to the disclosed technology, fractions of the overall population of end-use loads such as air conditioners, water heaters, and plug-in electric vehicles within each of a multiplicity of areas may be first identified. Once identified, the availability (from minimally willing, near 0% up to very willing near 100%) of end-use loads to participate in active damping may be determined for each coordination period, typically corresponding to a few minutes. For all end-use loads which are able and willing to participate in power modulation, the status of each load (on/off) and power usage (kW) may be determined. Devices may be grouped together according to willingness to participate in power modulation, but independent of device type. Thus, groups of devices may be heterogeneous with respect to device type, but more homogeneous with respect to availability for power modulation.

In some examples of the control method, devices in one area which are initially OFF may be turned ON to reduce the levels of power transferred to the other area, which exceed the equilibrium inter-area transfer requirements due to inter-area oscillations.

In some examples of the control method, devices in one area which are initially ON may turned OFF to increase the levels of power transferred from the other area, which are below the equilibrium inter-area transfer requirements due to inter-area oscillations.

In some examples of the control method, at the end of the coordination period, the lock on the participating devices is removed at the end of the coordination period. Removing the lock makes it possible for local control logic of a device (e.g., the controller associated with the device, or a processor of the device) to take over to determine whether or not the operating state of the device should be changed again. In other examples, however, all end-use loads may be restored to their initial ON/OFF status at the end of the coordination period.

In some examples the control method may be applied to inter-area oscillation damping, wherein inter-area oscillations may be reduced in amplitude and/or increased in damping rates.

In other examples the control method may be applied to frequency regulation, wherein frequency variations may be reduced in amplitude.

In some examples of the disclosed technology, a hierarchical control architecture is employed having a supervisory level comprising, for each area, an area controller, and for each of a multiplicity of distribution systems, a distribution coordinator having a control and a data link to each of a plurality of controllers. In some examples, the control link and data link may be a common link. In some examples, the control link and the data link may be separate links.

In some examples of the disclosed technology, a hierarchical control architecture is employed having a supervisory level comprising, for each load aggregation, a controller.

In some examples of the disclosed technology, a hierarchical control structure has a device level for each distribution system, comprising a plurality of end-use loads, each connected by a control link and a data link to a controller. In some examples, the control link and data link may be a common link. In some examples, the control link and the data link may be separate links.

In some examples of the disclosed technology, one or more computer-readable storage media store computer executable instructions that when executed by a computer, cause the computer to perform any of the disclosed computer implemented methods.

This Summary is provided to introduce a selection of concepts in a simplified form that are further described below in the Detailed Description. This Summary is not intended to identify key features or essential features of the claimed subject matter, nor is it intended to be used to limit the scope or practical applications of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

FIG. 11 is a graph derived from the example of a rising signal from FIG. 10, as can be implemented in certain examples of the disclosed technology.

FIG. 12 is a graph derived from the example of a falling signal from FIG. 10, as can be implemented in certain examples of the disclosed technology.

FIG. 14 is a graph derived from the example of a rising signal from FIG. 13, as can be implemented in certain examples of the disclosed technology.

FIG. 15 is a graph derived from the example of a falling signal from FIG. 13, as can be implemented in certain examples of the disclosed technology.

DETAILED DESCRIPTION

I. General Considerations

Figure 1:
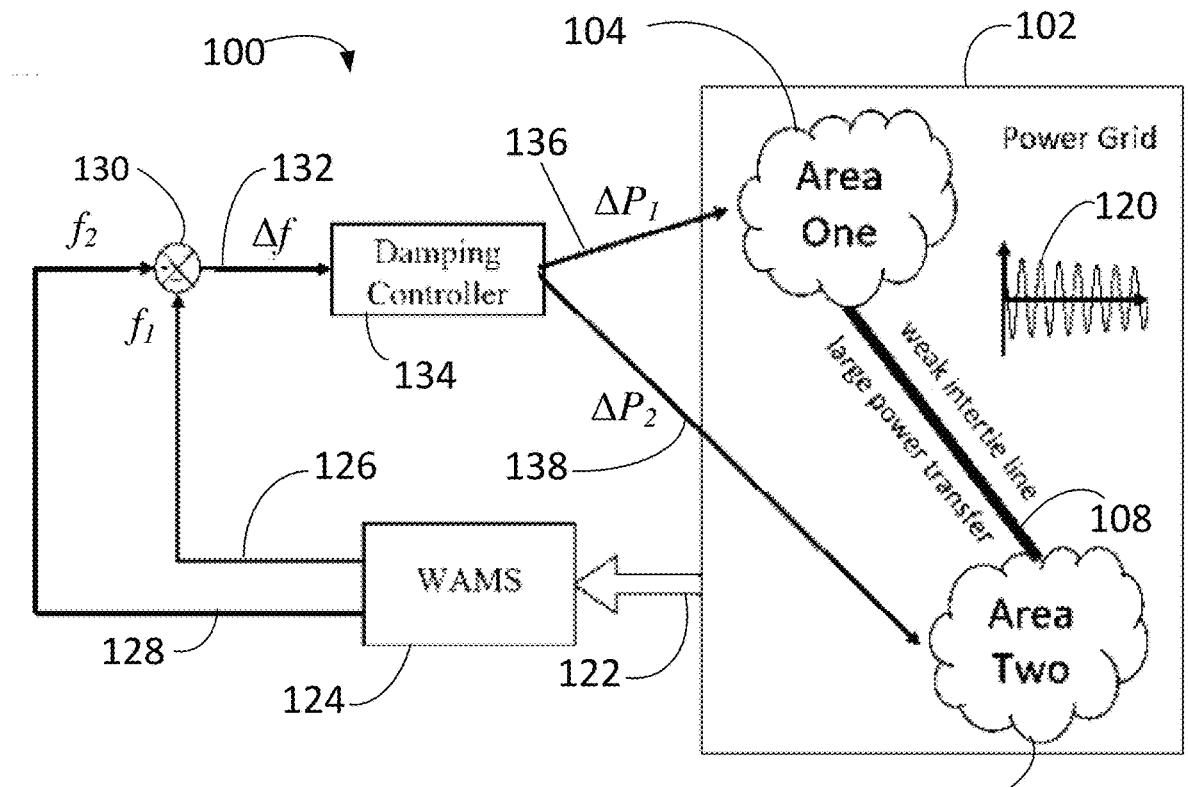
FIG. 1 is a schematic diagram of an example control strategy for inter-area oscillation damping, as can be implemented in certain examples of the disclosed technology.

This disclosure is set forth in the context of representative examples that are not intended to be limiting in anyway.

As used in this application the singular forms "a,", "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and nonobvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and sub-combinations with one another.

Although the operations of some of the disclosed methods are described in a particular sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "send," "transmit," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Certain disclosed methods can also be implemented by specialized computing hardware that is configured to perform any of the disclosed methods. For example, certain disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to an electrical device (or element) that is configured to interact with controllers and coordinators. For example, the integrated circuit can be embedded in or otherwise coupled to a generator (e.g., a wind-based generator, solar-based generator, coal-based generator, or nuclear generator), an air-conditioning unit; heating unit; heating, ventilation, and air conditioning ("HVAC") system; hot water heater; refrigerator; dish washer; washing machine; dryer; oven; microwave oven; pump; home lighting system; electrical charger, electric vehicle charger; or home electrical system.

II. Introduction to the Disclosed Technology

Methods and apparatus are disclosed for implementing a control approach for power modulation in electrical power grids using real-time ON/OFF control of end-use loads such as water heaters, air conditioners, plug-in electric vehicles, etc. This power modulation can be applied to the damping of inter-area oscillations as well as to frequency regulation.

Previous control strategies typically depended upon control of power generation, and/or control of power transmission—collectively, these may be termed the "power supply"—with little or no reliance upon control of the end-use power demand. This was a natural result arising from the inherent control by power companies of factors related to power supply, and a nearly total lack of control over end-use power demand (e.g., in hot weather, power demand often exceeds supply, leading to brownouts or even blackouts, in spite of broadcasted pleas from power system operators for voluntary minimization of power demand). However, with the growth of the smart grid and the Internet of Things (where basically all of the "things" are connected to the power grid), an opportunity for increasing application of demand-side controls presents itself to power suppliers and customers working together. Note that demand-side control, however, has some aspects not found in the earlier supply-side control. Any preferred approach to demand-side control may need to be a cooperative effort involving voluntary participation by a subset of the total end-use population. Aspects of this voluntary participation may involve human inputs, while other aspects may by supplied automatically by the end-use devices, such as water heaters, air conditioners, plug-in electric vehicles, etc.—all with initial end-use human inputs to set the participation parameters of these devices.

One example of such end-use load participation may be a water heater containing hot water at a certain temperature, a water temperature set point, and a monitor for the rate of water usage. A water heater containing hot water near the set point with low water usage might have a near 100% level of willingness to participate in end-use power modulation over a coordination period of a few minutes. In contrast, a water heater with a current high water demand (e.g., a high outflow of water right now), or whose water temperature is well below the set point, might have a near 0% willingness to participate in end-use power modulation for at least the current coordination period. At the end of each coordination period, all devices in an area may be re-interrogated for their willingness to participate in power modulation in the next coordination period. At the beginning of each coordination period, each device may determine a "willingness" value for each coordination period, where over the period of a day these values for each individual device may vary from 0% to 100%. Devices that are participating (having a willingness>0%), could then indicate their percent willingness, current device status (e.g., whether the device is on or off), and the device's maximum power requirement in the device's current state (e.g., maximum power required by the device when in an ON state). As used herein the "total on-power" of a device may refer to the maximum power required by the device when in an ON state, or alternatively, the total power currently being consumed by the device in an ON state. These control aspects performed in conjunction with the power grid may function "above" the normal local control of the water heater which is based on feedback from the water temperature to the heater.

As used herein, the term "willingness value" refers to a value or a function indicating a subject load's inclination to participate in active load control. The willingness value may be determined based at least in part by a consumer configuration of the end load. For example, if a consumer determines that a relatively larger degree of variation in device operation is an acceptable tradeoff for lower overall price, the consumer can increase a load's willingness value to indicate such an inclination. Conversely, a relatively smaller degree of variation in device operation may be desired, and so the consumer can increase a load's willingness value accordingly. The examples use herein present a normalize willingness value ranging from 0.0% to 100%, where zero (0.0%) indicates no willingness to provide damping services, and 100% indicates a maximum amount of willingness to provide damping services.

Another example of end-use load participation may be an air conditioner in a room having a temperature monitor and a desired temperature set-point determined by an end user. An air conditioner in a room which has been cooled down near the set-point might indicate a near 100% willingness to participate in end-use power modulation over the coordination period. An air conditioner in a room well above the temperature set-point might indicate a near 0% willingness to participate. Similarly to the case for the water heater, these control aspects performed in conjunction with the power grid may operate "above" the normal local control of the air conditioner which is based on feedback from the room temperature to the air conditioner.

A third example of end-use load participation may be a plug-in electric vehicle (PEV) being recharged (typically during evenings and over-night). A PEV may have a timer and a desired set time to be reach 100% charge (e.g., in time for the end user to be able to drive the PEV in the morning), and a monitor for the current battery charge level. A PEV early in the evening might have a near 100% willingness to participate in end-use load power modulation in spite of a low charge level since adequate time may remain to achieve 100% charging before the set time in the morning. Conversely, a PEV in the morning which still has a low charge level (possibly due to participating in power modulation earlier that night) might have a near 0% willingness to participate to avoid missing the set time for 100% charging.

All these types of end-use loads have discrete operating states individually, typically having either ON or OFF states, wherein the device power demand may be either high or near/at zero. A goal for embodiments is to group the participating end-use loads together (ignoring unwilling end-use loads) during each coordination period in a way that achieves a more continuous up and down variation in power demand. Groups of devices may be heterogeneous with respect to device types, but more homogeneous with respect to willingness to participate in power modulation (see FIGS. 8 and 17). Changes in device ON/OFF status may be under real-time control of the power system operator, but with voluntary participation determined before every coordination period by the devices (on an automatic basis), and with longer-term inputs from the human end users who define the participation parameters of the devices (e.g., some end users may opt-out of some, or all, of the participation of their own devices in power modulation). Power system operators may attempt to increase levels of voluntary end-use participation in power modulation by offering pricing incentives, discounts, rebates, etc.

Certain examples of methodologies described herein can also be applied to end-use loads whose power demand can be continuously adjusted. For example, a PEV can be considered as having a power demand that is either discrete (e.g., charging or not charging) or continuously adjustable (e.g., continuously adjustable charging power).

An additional constraint on the design and operation of any control strategy may be limits on how often any particular end-use load may be switched ON or OFF. For example, it may be undesirable (both for humans in a room, as well as for air conditioner mechanisms such as fan motors) to switch an air conditioner ON and OFF more than once within any coordination period (typically a few minutes). Similar considerations may apply to other end-use loads such as water heaters or PEVs. In embodiments, end-use loads may change state (see FIG. 7) only once during each coordination period, after which the state is locked until the end of the coordination period. At the end of each coordination period, if an end-use load has switched state (e.g., from ON to OFF-LCK in transition 714 or from OFF to ON-LCK in transition 704), it will be released from the lockout state (e.g., by an associated end-use load controller) to let local control be in charge. Optionally, after an end-use load is released from the lockout state, it can be restored to its initial state before beginning another coordination period. In some cases, local control of the operating state may over-ride these considerations: for example, if the water temperature in a water heater rises to the set point, that water heater may turned OFF under local control, independently of any ON/OFF signal sent from the controller (see FIG. 6 or 16) as part of power modulation—these effects may be negligible for power modulation, since a single water heater consumes power in the kW range, compared to typically MW for the group of water heaters.

In some examples of the disclosed technology, disclosed methods and apparatus can be applicable to both damping of inter-area power oscillations as well as to frequency modulation. In some examples of the disclosed technology, disclosed methods and apparatus can be applicable to damping of inter-area power oscillations. In some examples of the disclosed technology, disclosed methods and apparatus can be applicable to frequency modulation. In some examples of the disclosed technology, disclosed methods and apparatus can be switched in order to apply alternatively to inter-area oscillation damping or frequency modulation, wherein some embodiments may have different control parameters for each of these functions.

Figure 6:
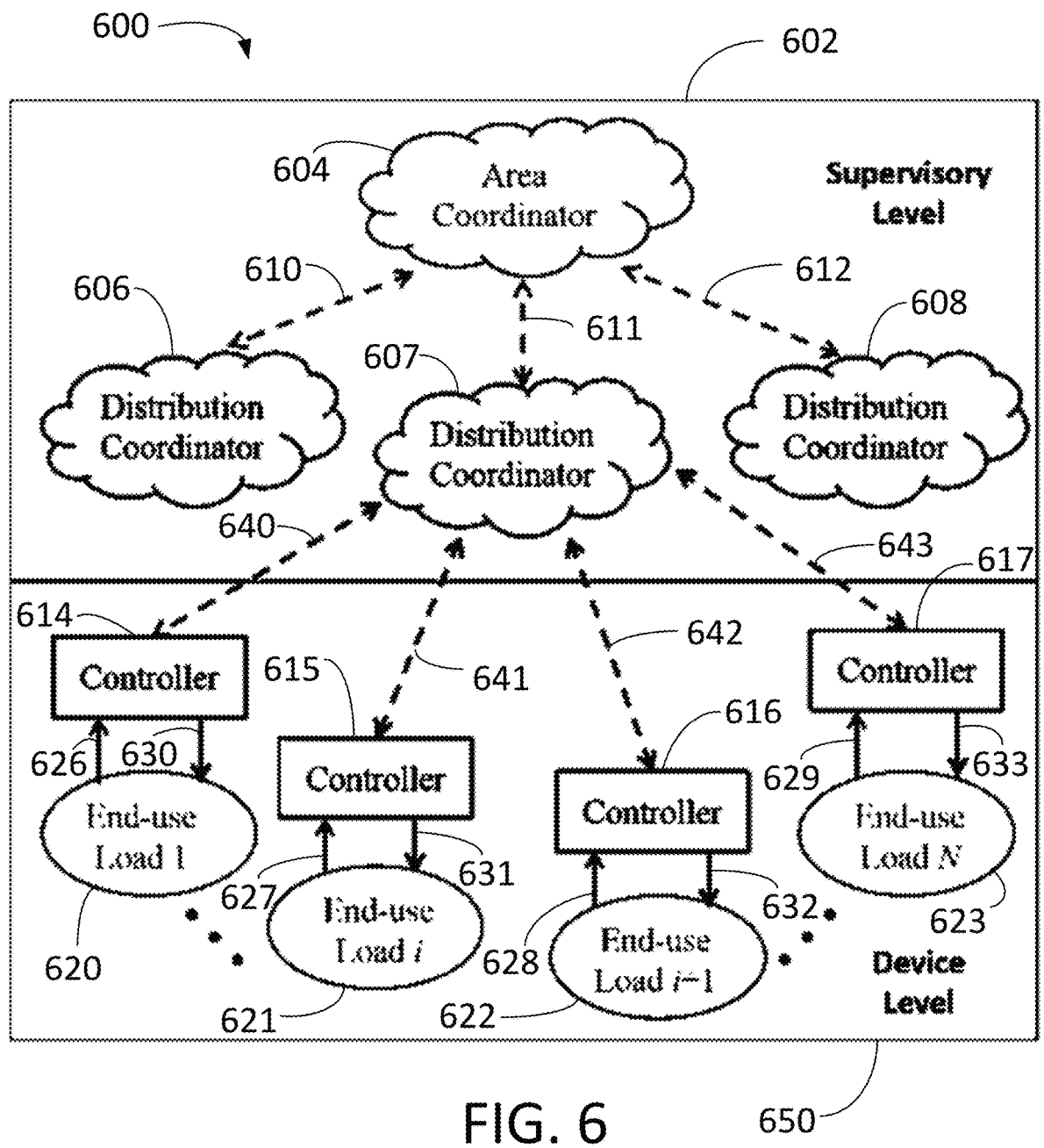
FIG. 6 is a schematic diagram of an example demand-side control strategy for an example of inter-area oscillation damping, as can be implemented in certain examples of the disclosed technology.
Figure 16:
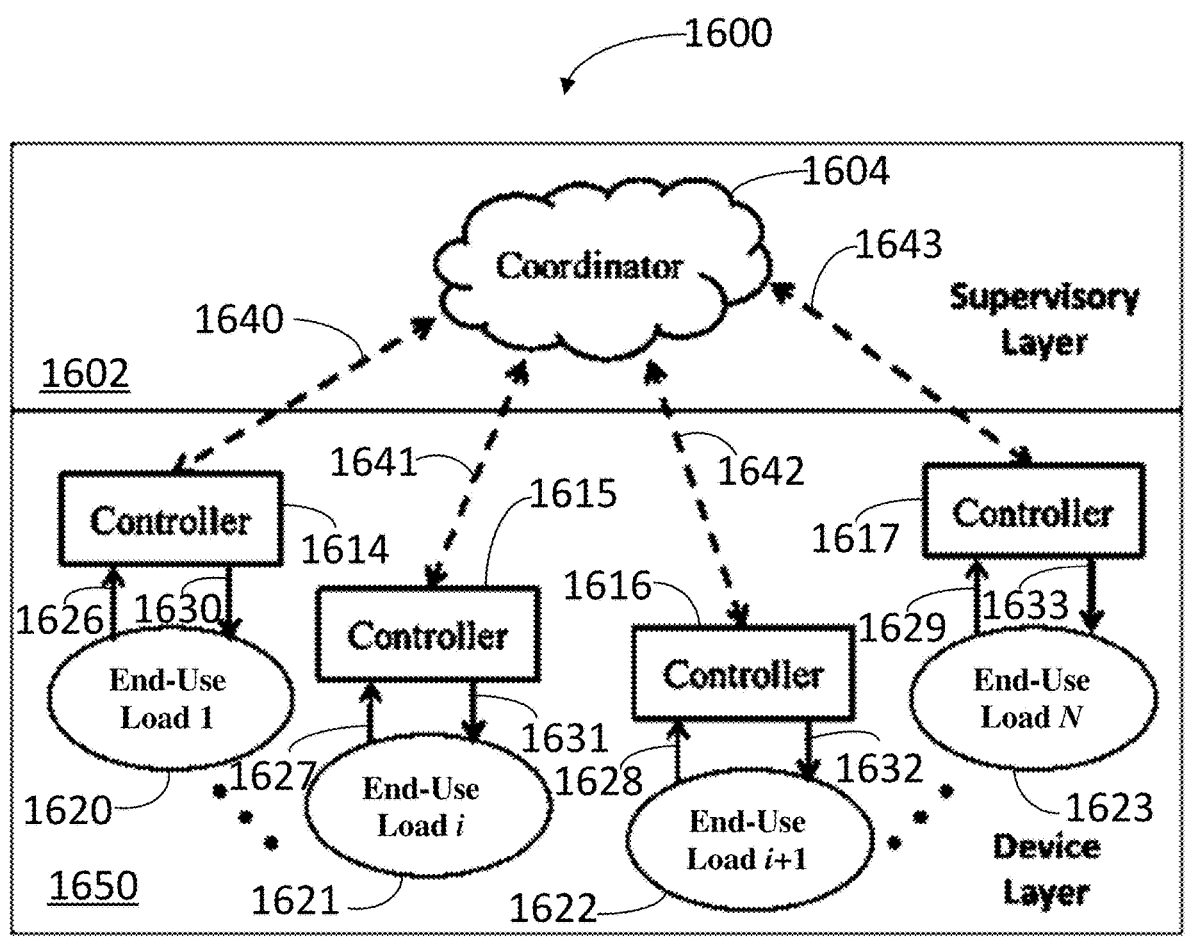
FIG. 16 is a schematic diagram of an example of demand-side control strategy for frequency regulation, as can be implemented in certain examples of the disclosed technology.

Demand-side control strategies implement hierarchical decision making through a supervisory layer and a device layer working in tandem (see FIGS. 6 and 16). Fast time-scale (e.g., in seconds) control of end-use loads is performed by the device layer, while slow (e.g., over minutes or longer) time-scale coordination is the function of the supervisory layer. For inter-area oscillation damping (FIG. 6), control may be applied for each distribution system within an area of a power grid by an area coordinator directing individual distribution coordinators. For frequency regulation (FIG. 16), control may be applied by a broadcast authority (coordinator) to an entire area of a power grid.

Next, the assumed modeling parameters are presented as used in simulations of power modulation using end-use loads on the MiniWECC model. Performance modeling parameters include aspects of the power grid such as the oscillatory behavior (e.g., frequencies and damping factors for various oscillation modes) of the grid, two assumed grid failure modes, three cases of end-use loads participating for power modulation, and the coordination period over which power modulation is effected (followed by a reset, and restart).

For inter-area oscillation damping, detailed performance modeling is characterized with respect to improved damping of inter-area oscillations using two cases of end-use load availability (cases #1 and #2, compared with a baseline case #0) for two grid failure contingencies. This modeling shows that modulation of end-use loads is a potentially highly effective tool for control of power grids, in addition to existing methods which focus on control of power generation and/or transmission, but do not employ control over end-use power loads.

III. Example of Damping Control Strategy for Inter-Area Oscillation Damping

FIG. 1 is a block diagram 100 outlining an example system that can be used for inter-area oscillation damping, as well as to other aspects of the control of power systems, according to a damping control strategy. Often, inter-area oscillations are most often seen when large amounts of power transfer are required over weak (e.g., tie-lines having a low maximum power transfer capacity) tie-lines (often relatively long-distance). These oscillations may range from 0.1 to 1.0 Hz and can be initiated by a small disturbance anywhere in the power system. When remote measurements (typically from phasor measurement units (PMUs)) are available through a wide-area measurement system (WAMS), the power modulation strategy shown in FIG. 1 may be implemented for damping of inter-area oscillations. Within a power grid 102, power may flow in either direction between an area #1 (e.g., a northern part of the WECC system) 104 and an area #2 (e.g., a southern part of the WECC system) 106. Area #1 104 is connected to area #2 by a weak intertie line 108. A typical power modulation signal 120 with oscillations having a low degree of damping is shown in the inset graph. A WAMS 124 may collect PMU data 122 from the power grid 102—in this example, frequency $f_1$ (transmitted on a WAMS output line 126) from any bus within area #1 104 and frequency $f_2$ (transmitted on a WAMS output line 128) from any bus within area #2 106. The choices of buses within areas #1 and #2 may be buses interconnected by the tie line 108 between areas #1 and #2. A time-varying difference between $f_1$ and $f_2$ is calculated in a difference circuit 130 and input through a line 132 to a damping controller 134. Damping controller 134 may process signal Δf to generate a first control signal $\Delta P_1$ which is relayed to area #1 104 through a line 136 and a second control signal $\Delta P_2$ which is relayed to area #2 106 through a line 138.

In a non-oscillatory situation, the condition $f_1=f_2$ may typically apply—in this situation, whatever power transfer is occurring between areas #1 and #2 is very slow-changing with time, corresponding to a nearly constant mismatch between power generation in the two areas which is being compensated by the power transfer along the tie-line, but wherein this power transfer does not exceed the tie-line limits and is not oscillating. When an oscillation between areas #1 and #2 is occurring, a condition $f_1 \neq f_2$ may apply, corresponding to fluctuations in the power transfer rate along the tie-line which are varying above and below the equilibrium value that would hold in the preferred $f_1=f_2$ non-oscillatory situation. During these oscillations, alternating conditions of $f_1>f_2$, then $f_1<f_2$, then $f_1>f_2$, etc., may occur, typically with gradually-decreasing amplitude due to damping. These oscillations may represent a group of generators in area #1 oscillating against another group of generators in area #2—a situation unnecessary for supplying the equilibrium power transfer. Although the equilibrium situation ($f_1=f_2$) may require a nearly constant power transfer along the tie-line from one area to another, when the amplitude of this oscillation is added to this "correct" nearly constant power transfer level, a maximum power transfer level for the tie-line may be exceeded, potentially leading to tie-line overheating, and failures of the tie-line (due to sagging, etc.) or failures/dropouts of power generators.

If $f_1>f_2$, an excessive power flow is occurring along intertie line 108 from area #1 104 to area #2 106. If $f_1<f_2$, an insufficient power flow is occurring along intertie line 108 from area #1 104 to area #2 106 (e.g., area #1 did not send enough power to area #2). The difference $\Delta f = f_1 - f_2$ between the frequencies $f_1$ and $f_2$ may serve as an excellent indicating signal for negative feedback in the area #1 and area #2 controllers for generating the two load control signals $\Delta P_1$ and $\Delta P_2$:

$$\Delta P_1 = K_1(f_1 - f_2); \text{ and}$$

$$\Delta P_2 = K_2(f_2 - f_1);$$

Where $K_1>0$ is the area #1 controller gain, and $K_2>0$ is the area #2 controller gain, and where for each area (in this example, areas #1 and #2, however a real power grid may have a multiplicity of areas and tie-lines/buses), the frequency difference is expressed as the frequency of that area (e.g., area #1 or area #2) relative to the frequency of the other area at the opposite end of the tie-line (e.g., area #2 or area #1 in this example). For power grids having more than two areas, similar equations may apply for the two ends of each tie-line or bus connecting between different areas. For this example, where $f_1>f_2$, reduce the difference between $f_1$ and $f_2$, various actions may be taken, either individually, or in combination:

1) Increase the power demand $P_1$ in area #1 (e.g., set $\Delta P_1>0$)—this may require turning ON some or all devices within area #1 which are willing to participate in demand modulation for the current coordination period—this essentially absorbs more of the power being generated in area #1 to reduce (down towards the equilibrium value) the power available for transfer along the tie-line from area #1 to area #2;

2) Decrease the power demand $P_2$ in area #2 (e.g., set $\Delta P_2 < 0$)—this may require turning OFF some or all devices within area #2 which are willing to participate in demand modulation for the current coordination period—this essentially consumes less of the power being used in area #2 to reduce (down towards the equilibrium value) the power being transferred along the tie-line from area #1 to area #2; and/or 3) Directly inject power flows into intertie line 108 (e.g., send power from area #2 to area #1)—these power flows may be comparable in amplitude to the amplitude of the oscillatory energy flows but in the opposite directions—these power flows do not need to compensate for the equilibrium steady-state power flows which will remain after the oscillations are damped out.

The illustrated method can be implemented using various resources in the power system, such as energy storage, HVDC lines, and, in embodiments, modulation of one or more end-use loads.

Figure 2:
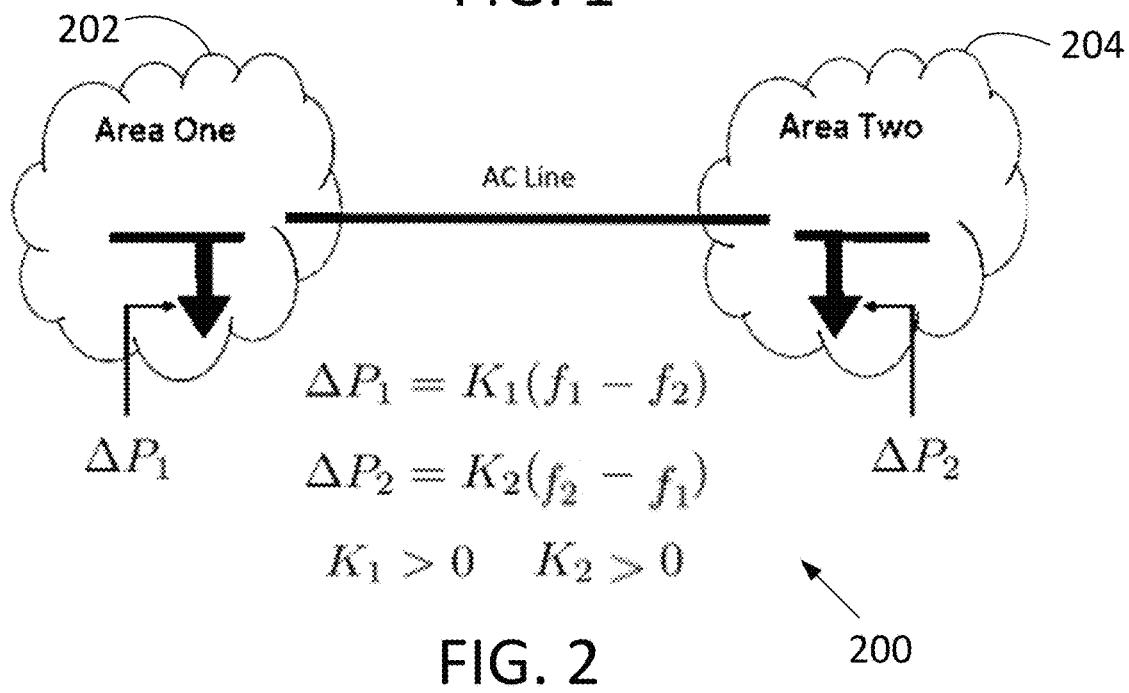
FIG. 2 is a schematic diagram of an example of inter-area oscillation damping, as can be implemented in certain examples of the disclosed technology.

FIG. 2 is a diagram 200 depicting an example of inter-area oscillation damping as can be performed in certain examples of the disclosed technology. In the illustrated examples, if $f_1 > f_2$, then $\Delta P_1 > 0$ and $\Delta P_2 < 0$. For the opposite situation, where $f_1 < f_2$, similar but opposite polarity actions may be taken to damp oscillations: decrease $P_1$, increase $P_2$, and/or directly inject power from area #1 202 towards area #2 204. During a typical inter-area oscillation, these situations will alternate over time-frames of a few seconds.

IV. Example of Power Modulation Signals for Inter-Area Oscillation Damping

Figure 3:
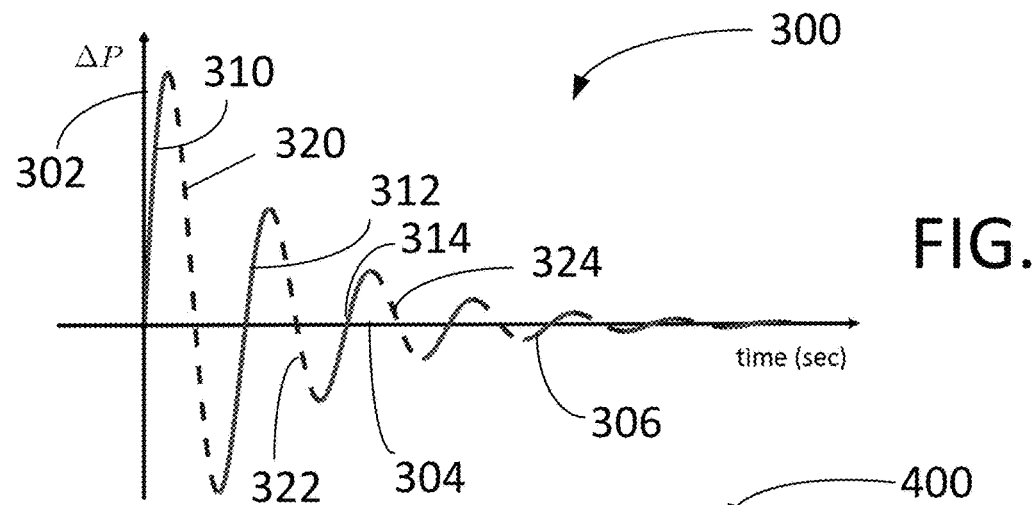
FIG. 3 is a graph of an example power modulation signal observed in an example of the disclosed technology.

FIG. 3 is a graph illustrating an example of a power modulation signal $\Delta P$ 306 in a graph 300 of power 302 within an area as a function of time 304, as can be performed in certain examples of the disclosed technology. When inter-area oscillations are effectively damped, the power modulation signal $\Delta P$ 306 will exhibit well-damped oscillations as shown in FIG. 3. There are two types of regions in power modulation signal $\Delta P$ 306: rising portions $\Delta P^+$ and falling portions $\Delta P^-$. The total power demand in each area of a power grid equals the total power generated within that area plus any power flows into that area minus any power flows out of that area (neglecting losses). In later examples, this area may represent area #1 or area #2. The power modulation signal $\Delta P$ may be expressed at the sum of two components, the rising signal $\Delta P^+$, and the falling signal $\Delta P^-$:

$$\Delta P = \Delta P^+ + \Delta P^-.$$

In some examples of the disclosed technology, the power modulation signal $\Delta P$ is defined such that when the power modulation signal $\Delta P$ is positive, this implies that the total power supply within that area should increase; this was applicable to either area #1 ($\Delta P_1$) or to area #2 ($\Delta P_2$). In such examples, the power modulation signal $\Delta P$ being negative implies that the total power supply from that area should decrease. In the disclosure herein, the power modulation signal has a definition which is reversed in polarity: the power modulation signal $\Delta P$ now characterizes the power demand for area #1 ($\Delta P_1$) or for area #2 ($\Delta P_2$), for example, the power demand instead of the power supply. A positive value for the power modulation signal $\Delta P$ (for either area #1 or area #2) can indicate a need to increase the power demand within the area in order to reduce the rate of increase of $\Delta f$ (by reducing the power available for transfer to another area after the power demand within the area has been met) and then to decrease the value of $\Delta f$ towards zero. Similarly, a negative value for the power modulation signal $\Delta P$ can indicate a need to decrease the power usage within the area in order to reduce the rate of decrease of $\Delta f$ (by increasing the power available for transfer to another area after the power demand within the area has been met) and then to increase the value of $\Delta f$ towards zero. It will be appreciated that when $\Delta P$ is rising, it could imply that power demand has to increase (when $\Delta P > 0$), but it could alternatively imply that power demand has to decrease (when $\Delta P < 0$). That is, rising occurs in both ranges of $\Delta P$.

Figure 4:
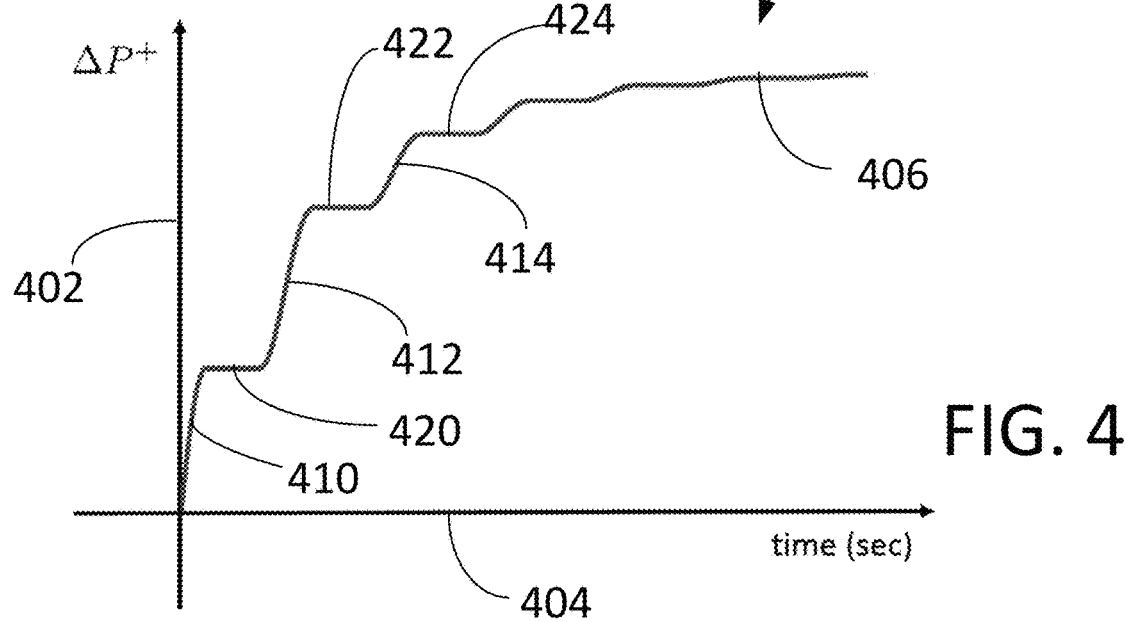
FIG. 4 is a graph of an example rising signal derived from FIG. 3.

FIG. 4 shows an example of a rising signal $\Delta P^+$ 406 in a graph 400 of power demand 402 as a function of time 404, derived from FIG. 3, as can be performed in certain examples of the disclosed technology. Increasing segment 410 of rising signal $\Delta P^+$ 406 corresponds to rising segment 310 of power modulation signal $\Delta P$ 306. Similarly, increasing segments 412 and 414 correspond to rising segments 312 and 314, respectively, in FIG. 3. Constant segments 420, 422, and 424 of rising signal $\Delta P^+$ 406 correspond to falling segments 320, 322, and 324, respectively, in FIG. 3. Thus, rising signal $\Delta P^+$ 406 increases in synchrony with each increase in the power modulation signal $\Delta P$ 306, but remains unchanged during intervals in which the power modulation signal $\Delta P$ 306 is decreasing. Assuming that end-use loads in area #1 (and not in area #2) are used to deliver the power modulation signal $\Delta P$ 306, then some or all of those end-use loads that are currently OFF (and which have been designated as being willing to effect power modulation in area #1) can be turned ON to provide any increases in $\Delta P$ (such as segments 310, 312 and 314).

Figure 5:
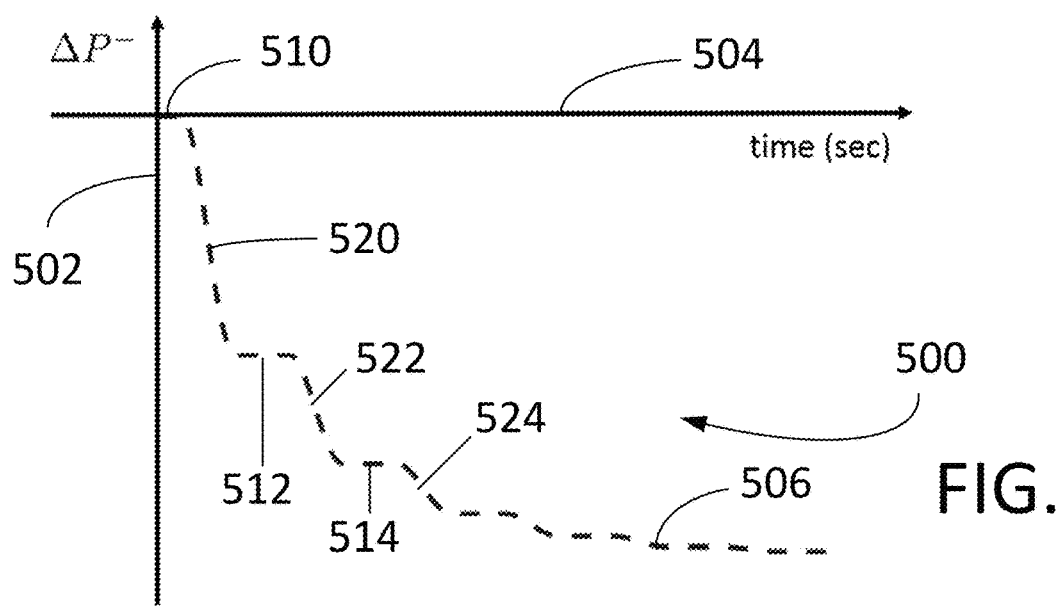
FIG. 5 is a graph of an example falling signal derived from FIG. 3.

FIG. 5 shows an example of a falling signal $\Delta P^-$ 506 in a graph 500 of power demand 502 as a function of time 504, derived from FIG. 3, as can be performed in certain examples of the disclosed technology. Decreasing segment 520 of falling signal $\Delta P^-$ 506 corresponds to falling segment 320 of power modulation signal $\Delta P$ 306. Similarly, decreasing segments 522 and 524 correspond to falling segments 322 and 324, respectively, in FIG. 3. Constant segments 510, 512, and 514 of falling signal $\Delta P^-$ 506 correspond to rising segments 310, 312, and 314, respectively, in FIG. 3. Thus, falling signal $\Delta P^-$ 506 decreases in synchrony with each decrease in the power modulation signal $\Delta P$ 306, but remains unchanged during intervals in which the power modulation signal $\Delta P$ 306 is increasing. Assuming that end-use loads in area #1 (and not in area #2) are used to deliver the power modulation signal $\Delta P$ 306, then some or all of those end-use loads that are currently ON (and which have been designated as being willing to participate in power modulation in area #1) can be turned OFF to provide any decreases in $\Delta P$ (such as segments 320, 322 and 324).

Since end-use loads typically have a large population size and a fast aggregated ramping rate, proper coordination of the ON/OFF states of the end-use loads can satisfy the multiple requirements of speed, accuracy, and magnitude.

V. Example of Demand-Side Control Strategy for Inter-Area Oscillation Damping FIG. 6 shows a schematic diagram of an example of a demand-side control strategy 600 with hierarchical decision making as applied to a single area within a power grid (e.g., each of area #1 104 and area #2 106 in FIG. 1), as can be performed in certain examples of the disclosed technology. One may implement this demand-side control strategy 600, and in general for a power grid with multiple areas, 1 to j, each area j could implement this control strategy in parallel based on the inter-area connections of the various tie-lines and buses, and on the frequency differences between each area j and the respective other areas k (where j k) at the opposite ends of these tie-lines and buses. A supervisory layer 602 comprises an area coordinator 604 and a multiplicity of distribution coordinators 606-608 (three shown). Data/control links 610-612 connect the area coordinator 604 to each of the distribution coordinators 606-608, respectively. Data/control links 640-643 connect exemplary distribution coordinator 607 to a multiplicity of controllers 614-617 (four shown), respectively, in a device layer 650. Device layer 650 comprises control links 630-633 connecting controllers 614-617 to end-use loads #1 to #N 620-623 (four shown), respectively. Data links 626-629 connect end-use loads #1 to #N 620-623 to controllers 614-617, respectively. The hierarchical control decision making comprises the following aspects:

A. Example Device Layer

Figure 7:
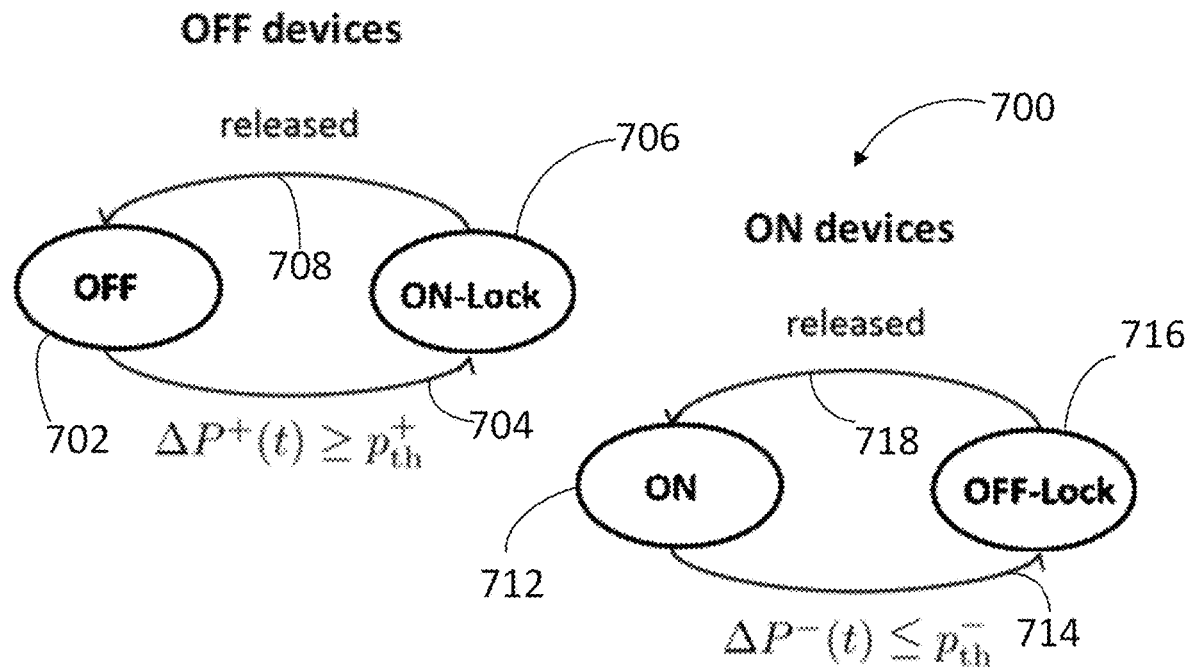
FIG. 7 is a state diagram of an example of threshold-based control logic, as can be implemented in certain examples of the disclosed technology.

Controllers 614-617 in device layer 650, which are alternatively referred to herein as "end-use load controllers," execute fast time-scale control of the ON/OFF states of end-use loads #1 to #N 620-623 by means of control links 630-633, respectively. FIG. 7 shows a state diagram of threshold-based control logic 700 as employed in each of controllers 614-617. In some embodiments, this control scheme may operate in addition to pre-existing local controllers. In some embodiments, the threshold-based controllers 614-617 may remain inactive (e.g., each end-use load remains solely under local feedback control) until individual end-use loads, such as one or more of loads 620-623, become active in providing damping of the power system. In some embodiments, when a controller becomes active, it may override the local control logic and force individual end-use loads to stay with their committed operation states (ON or OFF) until these states are forced to switch as part of the modulation strategy for oscillation damping, after which these states are locked until the end of the coordination period. In some embodiments, when a controller becomes active, the local control logic may still override the controller signal (e.g., to avoid overheating of a water heater, or to avoid cooling a room below an end-user-selected set temperature). This circumstance may have a minimal effect on the end-use load modulation strategy if the number of overrides is small, since individual loads may be in the kW range.

In the state diagram of FIG. 7, an example of an end-use load (e.g., one of end-use loads 620-623) which is initially in an OFF state 702, remains in this OFF state as long as the rising signal $\Delta P_1^+(t) < p_{th}^+$, where thresholds $p_{th}^+ > 0$ are determined by the supervisory layer and relayed to controllers 614-617 through bi-directional data links 640-643, respectively. Multiple thresholds $p_{th}^+$ may be set for various types of end-use loads, as discussed below with respect to FIG. 8. If the rising signal $\Delta P_1^+(t)$ increases until $\Delta P_1^+(t) \geq p_{th}^+$, the state of the end-use load undergoes a transition 704 to an ON-Lock state 706. The end-use load remains in ON-Lock state 706 until the end of the coordination period. Optionally, at the end of the coordination period, all the locked ON end-use loads can be released from the lockout to become free. The states of initially OFF end-use loads which are not participating in power modulation, as well as initially OFF end-use loads which are participating in power modulation but which did not transition to an ON-Lock state 706, are not affected by this process and will remain OFF.

Similarly, an end-use load which is initially in an ON state 712, remains in this ON state 712 as long as the falling signal $\Delta P_1^-(t) > p_{th}^-$, where thresholds $p_{th}^- < 0$ are determined by the supervisory layer and relayed to controllers 614-617 through the bi-directional data links 640-643, respectively. Multiple thresholds $p_{th}^-$ may be set for various types of end-use loads, as discussed below in FIG. 8. If the falling signal $\Delta P_1^-(t)$ decreases until $\Delta P_1^-(t) \leq p_{th}^-$, the state of the end-use load undergoes a transition 714 to an OFF-Lock state 716. The end-use load remains in OFF-Lock state 716 until the end of the coordination period, at which time, all the locked OFF end-use loads are released from lockout to become free. The states of initially ON end-use loads which are not participating in power modulation, as well as initially ON end-use loads which are participating in power modulation but which did not undergo a transition 714 to an OFF-Lock state 716, are not affected by this process and will remain ON.

If a large population of end-use loads is willing to participate in power modulation for a given coordination period, then in embodiments not all of the end-use load population may undergo either transition 704 or 714—the control breadth will not be exceeded (see case #2 in FIGS. 10-11 and 13-14). If the population of end-use loads is smaller, in some cases the entire end-use load population may change state before the end of the coordination period, after which no further power modulation is possible within that coordination period (see case #1 in FIGS. 10-11 and 13-14). Whether the population of end-use loads is sufficiently large to damp-out oscillations also depends on the amplitude of the oscillations and the total ON power for the population.

B. Summary of Notation

An overall power grid may have multiple areas j. For example, FIGS. 1 and 2 illustrate two areas, and FIG. 6 illustrates a single area. Within an area, there may be a plurality of distribution systems, each with a distribution coordinator. Each distribution coordinator may have multiple end-use loads, I=1 to N. During each coordination period, the total population of end-use loads under control of a particular distribution coordinator may be considered to comprise three groups:

Group #1—those end-use loads which are willing to participate in power modulation and which are ON at the beginning of a coordination period. These loads may only be subject to the part of state diagram 700 comprising states 712 and 716, and transitions 714 and 718. This population=$N_1$.

Group #2—those end-use loads which are willing to participate in power modulation and which are OFF at the beginning of a coordination period. These loads may only be subject to the part of state diagram 700 comprising states 702 and 706, and transitions 704 and 708. This population=$N_2$.

Group #3—those end-use loads which are unwilling to participate in power modulation for this coordination period—these end-use loads are still connected to a controller (which is connected to a distribution coordinator) and may only be temporarily unwilling for a particular coordination period, but may join either group #1 or #2 for a later coordination period. This population=$N_3$.

There may be no reason to expect that in general $N_1 \sim N_2$: e.g., on a hot day, a large proportion of the air conditioner population may be ON at any one time, making $N_1 \gg N_2$ and it may also be likely that $N_1, N_2 \ll N_3$ (e.g., people want their air conditioners to stay ON)—this may be partially compensated by the water heater population having an inverse situation where $N_1 < N_2$.

In the disclosure herein, the number, N, of end-use loads may represent either $N_1$ or $N_2$. Then:

(Total number of end-use loads within an area)=$N_1$+ $N_2$+$N_3$+(end-use loads not connected to controllers).

The values of $N_1$, $N_2$, and $N_3$, may be expected to fluctuate from one coordination period to the next, however it is expected that the following may apply (ignoring gradual changes to the total end-use load populations in each area): (Total number of end-use loads available for participation in power modulation in some, but not necessarily all, coordination periods)=

$N_1+N_2+N_3=N_{control}$-nearly constant day-by-day

Where $N_{control}$ may be expected to increase slowly as more end users volunteer to participate in power modulation by being connected to a controller. These connections to controllers may be hard-wired, internet-based, etc., wherein being "connected" may constitute activation through software of a pre-existing hardware link, etc.

C. Supervisory Layer

Supervisory layer 602 performs slow time-scale coordination of the control of end-use loads #1 to #N 620-623 through distribution coordinator 607, in addition to control of other end-use loads (not shown) controlled by other distribution coordinators, such as distribution coordinators 606 and 608. Area coordinator 604 works in conjunction with distribution coordinator 607 to broadcast the rising signal $\Delta P_1^+(t)$ and the falling signal $\Delta P_1^-(t)$ to controllers 614-617 (the "1" subscript indicates that control is being effected by controllers within area #1 104). Each distribution coordinator 606-608 manages end-use loads within their individual distribution systems (e.g., end-use loads #1 to #N 620-623 are all managed by the exemplary distribution coordinator 607 through controllers 614-617, respectively)—in embodiments, an area may have a plurality of distribution coordinators, each managing a multiplicity of end-use loads. A power grid may typically comprise a multiplicity of areas, each having an area coordinator. For each coordination period, distribution coordinators 606-608 generate a multiplicity of $p_{th}^+$ and $p_{th}^-$ thresholds, with each controller 614-617 receiving one $p_{th}^+$ threshold or one $p_{th}^-$ threshold for use in the demand-side control strategy 600. Whether a controller receives the $p_{th}^+$ threshold or the $p_{th}^-$ threshold may depend on the which group (ON or OFF) the controller belongs to. For example, each controller in ON group may receive the $p_{th}^-$ threshold, whereas each controller in OFF group may receive the $p_{th}^+$ threshold.

At the beginning of each coordination period, individual end-use loads may be interrogated for their availability (e.g., percent willingness, 0 to 100%) to provide the service of active damping of the power grid. In some embodiments, these availabilities may change for any particular end-use load between successive coordination periods (e.g., if a water temperature in a water heater is excessively low, or if a room temperature is excessively high, thus requiring constant operation of the water heater or the air conditioner, respectively, thereby making these end-use loads temporarily unable to participate in power modulation). For various reasons, in some cases an adequately large population of end-use loads may be participating in power modulation, as illustrated for case #2 in FIGS. 11-15, while in other cases, the population of end-use loads participating in power modulation may be inadequate as illustrated for case #1 in FIGS. 11-15, resulting in "limiting" as shown for case #1 in FIGS. 12-13 and 15-16. This determination of "inadequacy" or "adequacy" may depend also upon the magnitude of the inter-area oscillations. Also, since there may be an imbalance between the numbers of participating devices which are initially ON or OFF, there may be "adequate" numbers of devices to address either positive or negative deviations from equilibrium, but at the same time, "inadequate" numbers of devices to address the opposite deviations (e.g., either negative or positive). For each end-use load indicating a willingness to participate in power modulation, the initial ON/OFF state as well as power level (kW) may be provided to the corresponding controller for the respective end-use loads. Out of the set of end-use loads controlled by each distribution coordinator, some may have an initial ON state 702, and others may have an initial OFF state 712—the numbers of end-use loads with initial ON or OFF states may be the same in some embodiments, or different in other embodiments, and the total numbers and distributions of ON/OFF end-use loads may vary from one coordination period to the next and may differ for each distribution coordinator.

1) For each distribution coordinator within an area j, the total ON power $\Delta P_{max,i}^+$=sum of the power levels of participating end-use loads i=1 to N controlled by the distribution coordinator which are initially in an ON state 712 at the beginning of the coordination period (number of end-use loads=$N_1$). The value of $\Delta P_{max,i}^+$ corresponds to the "flexibility" of each distribution coordinator to assist area coordinator 604 in damping the positive-going segments of inter-area oscillations in $\Delta P_j$ for area j.

2) For each distribution coordinator within area j, the total OFF power $\Delta P_{max,i}^-$=sum of the power levels of participating end-use loads i=1 to N controlled by the distribution coordinator which are initially in an OFF state 702 at the beginning of the coordination period (number of end-use loads=$N_2$)—these power levels correspond to the ON state power for each of these end-use loads if they were switched ON. The value of $\Delta P_{max,i}^-$ corresponds to the "flexibility" of each distribution controller to assist area coordinator 604 in damping the negative-going segments of inter-area oscillations in $\Delta P_j$ for area j.

3) Once the calculation in step 1) is complete for each distribution coordinator within area j, then area coordinator 604 determines the total ON power $\Delta P_{j,max}^+$ by summing the $\Delta P_{max,j}^+$ values for all the distribution coordinators in area j. Each area coordinator 604 then broadcasts the total ON power $\Delta P_{j,max}^+$ to all distribution coordinators within area j. The value of $\Delta P_{j,max}^+$ corresponds to the "flexibility" of the area coordinator to damp the positive-going segments of inter-area oscillations in $\Delta P_j$—the larger the value of $\Delta P_{j,max}^+$, then the larger the positive-going segments of inter-area oscillations that can be damped 4) Once the calculation in step 2) is complete for each distribution coordinator within area j, then area coordinator 604 determines the total OFF power $\Delta P_{j,max}^-$ by summing the $\Delta P_{max,i}^-$ values for all the distribution coordinators in area j. Each area coordinator 604 then broadcasts the total OFF power $\Delta P_{j,max}^-$ to all distribution coordinators within area j. The value of $\Delta P_{j,max}^-$ corresponds to the "flexibility" of the area coordinator to damp the negative-going segments of inter-area oscillations in $\Delta P_j$; for example, the larger the value of $\Delta P_{j,max}$, the larger the negative-going segments of inter-area oscillations that can be damped.

Figure 8:
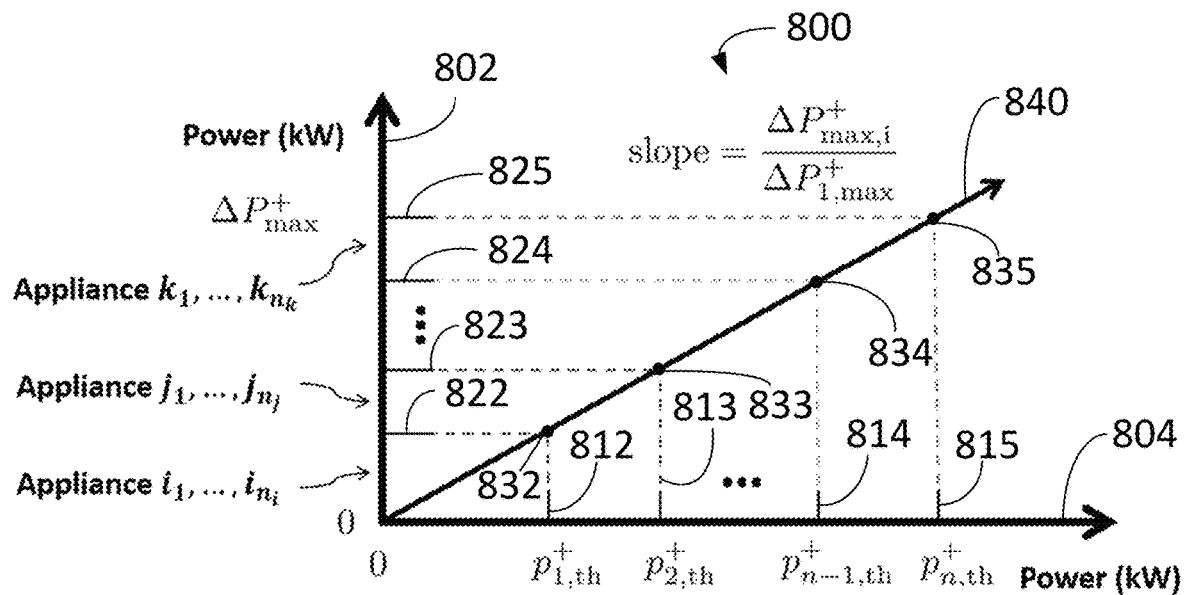
FIG. 8 is a graph of an example of supervised threshold determination for an example of inter-area oscillation damping, as can be implemented in certain examples of the disclosed technology.

FIG. 8 shows a graph 800 of an example of an appliance (device, end-use load) power 802 as a function of threshold power 804 for use by each distribution coordinator in determining the thresholds $p_{th}^+$ for various groups of appliances within each particular distribution system. After the above calculations have been completed, the area coordinator supplies all the distribution coordinators with the two total flexibilities for the area: $\Delta P_{j,max}^+$ and $\Delta P_{j,max}^-$. Two calculations are then made, one for the positive-going flexibility using $\Delta P_{j,max}^+$, and a second calculation for the negative-going flexibility using $\Delta P_{j,max}^-$; here we consider only one calculation, since they are equivalent. Each distribution coordinator already has calculated (in steps 1 and 2, above) its own two flexibilities $\Delta P_{max,i}^+$ and $\Delta P_{max,i}^-$. The slope of curve 840 may then be calculated as $\Delta P_{max,i}^+/\Delta P_{j,max}^+$, which ensures that the summation of the graphs for all the distribution coordinators within the area j will correspond to the total power $\Delta P_{j,max}^+$ for the area j. The vertical axis 802 of graph 800 is a stack of all OFF appliances (devices) controlled by the distribution coordinator; for other distribution coordinators within the area, similar graphs may apply. At the bottom of appliance power axis 802 are appliances $i_1, \ldots, i_{ni}$ having the highest willingness (largest percentage) to participate in power modulation for control of inter-area oscillations for this coordination period. Thus, these lower appliances preferably should be turned ON (following the transition 704 from OFF state 702 to ON-Lock state 706) earlier than other appliances having a lower willingness to participate. For power modulation, it is preferred that each group of appliances comprise a large enough population such that the power requirement for any one appliance within that group is small enough such that the discontinuity of power demand (e.g., either fully OFF or fully ON) is negligible relative to the total power demand of the group. In addition, it is preferred that the total number of appliances controlled by each distribution coordinator be substantially larger than the number of appliances within any single group, thus also reducing granularity of control. The slope of line 840 is $\Delta P_{max,i}^+/\Delta P_{j,max}^+$; this ensures that the summation of all the graphs for the distribution coordinators will correspond to the total power $\Delta P_{j,max}^+$ for the area j.

The first threshold $p_{1,th}^+$ (line 812) is determined by the intersection 832 of line 840 with horizontal line 822 having a power level corresponding to the sum of all the powers of appliance group $i_1, \ldots, i_{ni}$. The second threshold $p_{2,th}^+$ (line 813) is determined by the intersection 833 of line 840 with horizontal line 823 having a power level corresponding to the sum of all the powers of appliance group $j_1, \ldots, j_{nj}$ added to the sum of all the powers of appliance group $i_1, \ldots, i_{ni}$ (e.g., the two groups are "stacked" along axis 802). The second group of appliances $j_1, \ldots, j_{nj}$ may have lower willingness percentages for participation in power modulation than the bottom group $i_1, \ldots, i_{ni}$, thus it is reasonable to change the state appliances in this second group only after all the more willing appliances in the first group have already changed state. Similar considerations apply to group $k_1, \ldots, k_{nk}$, which may have the lowest willingness percentages. The n–1st threshold $p_{n-1,th}^+$ (line 814) is determined by the intersection 834 of line 840 with horizontal line 824. The sum of all the powers of the appliances controlled by the distribution coordinator is $\Delta P_{max,i}^+$ (line 825). The intersection 835 of line 840 with line 825 determines the $n^{th}$ threshold, $p_{n,th}^+=\Delta P_{j,max}^+$ (line 815). With a stacking of appliances along axis 802 which prioritizes higher willingness appliances nearer the bottom of axis 802 and lower willingness appliances nearer the top of axis 802, methods of embodiments will change the OFF state 702 through transition 704 to ON-Lock state 706 for those appliances where this transition is less disadvantageous, while reserving the transitions of other (lower willingness) devices) only for situations needing a higher degree of oscillation damping. This method of defining the thresholds along axis 804 ensures that all the end-use loads in the area participate synchronously in power modulation, since the thresholds are compared against the broadcasted $\Delta P_j^+(t)$ and $\Delta P_j^-(t)$ signals for area j.

Therefore, in accordance with the inter-area power oscillation damping control strategy described herein, the respective distribution coordinators can be operable to receive, from the area coordinator, the total on-power for the willing end-use loads that are currently OFF in the area and the total on-power for the willing end-use loads that are currently ON in the area. Further, the respective distribution coordinators can calculate a plurality of power thresholds based on the total on-powers received from the area coordinator and the willingness values for the end-use loads in the associated distribution system, including: a first positive power threshold for the willing end-use loads that are currently OFF in the associated distribution system; a first negative power threshold for the willing end-use loads that are currently OFF in the associated distribution system; a second positive power threshold for the willing end-use loads that are currently ON in the associated distribution system; and a second negative power threshold for the willing end-use loads that are currently ON in the associated distribution system. The respective distribution coordinators can then relay the first positive and negative power thresholds to the end-use load controllers of the willing end-use loads that are currently OFF in the associated distribution system, and relay the second positive and negative power thresholds to the end-use load controllers of the willing end-use loads that are currently ON in the associated distribution system.

VI. An Example of the MiniWECC Model

Figure 9:
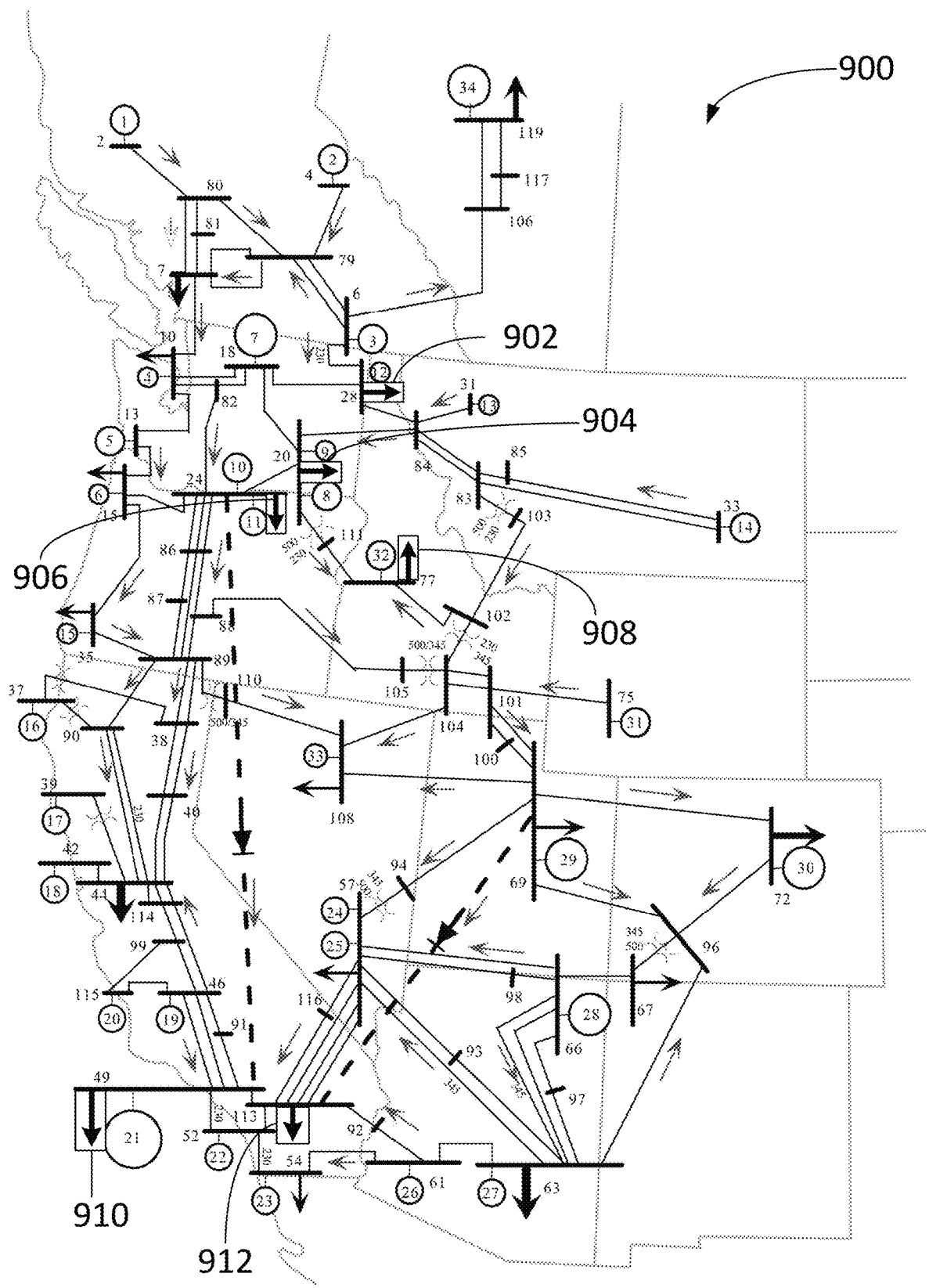
FIG. 9 is a diagram of an example of a MiniWECC test system.

FIG. 9 shows a diagram of an example of the MiniWECC test system 900 which is a reduced-order dynamic model of the Western Electricity Coordination Council (WECC) power grid spanning a large portion of western North America. This simplified model retains the overall inter-area modal properties (e.g., inter-area oscillation modes) of the complete WECC system and thus may be used to test inter-area oscillation mitigation strategies more simply that a simulation of the full WECC system might allow. The MiniWECC model comprises 34 generators, 120 buses, 115 lines and high voltage transformers, 54 generator and load transformers, 19 load buses and two HVDC transmission lines. The load buses include load buses 902, 904, 906, 908, 910, and 912, each representing a distribution system in which a controllable end-use load (in this example, a water heater) is located.

There are several inter-area oscillation modes in the MiniWECC system, whose frequencies and damping ratios depend on the operating condition (local loading, topology, etc.) of the system. In FIGS. 10-15, the operating condition is selected such at the Alberta mode of 0.324 Hz has only 0.5% damping. In this example, the damped natural frequency for a damping ratio $\xi=0.5\%$ and $f=0.324$ Hz is calculated as $f_d=$ square root $(1-\xi^2)*f=0.324$ Hz. Then, for the oscillation to enter 2% steady-state error bound, it takes a total time of $T_{total}=393$ seconds (approximately 128 cycles). Thus, it would be highly desirable to add additional active damping to substantially reduce this risk period.

VII. Performance Modeling Parameters

In the particular modeling example of FIGS. 10-15, several types of parameters are specified:
Oscillatory Behavior of the Power Grid:
Real power grids typically exhibit multiple oscillatory modes, all of which are functions of system loading and topology (which may be affected by drop-outs or restorations of tie-lines or buses to the grid). For simplicity, the modeling in FIGS. 10-15 assumes only one mode to be lightly damped, thus this mode will dominate over more strongly damped additional modes.

Predominant Oscillatory Mode:

The Alberta mode at 0.324 Hz with 0.5% damping.

Contingencies:

These parameters are assumed fault conditions applied to the system in the MiniWECC model:

Contingency #1: A sudden loss of generator #4 (1275 MW) on bus #9.

Contingency #2: A three-phase fault on the 500 kV line connecting bus #89 and bus #90 resulting in the line tripping after three cycles.

Cases Specifying the End-Use Loads Participating in Power Modulation:

These parameters are the numbers and types of end-use loads (e.g., water heaters, air conditioners, plug-in electric vehicles, etc.) and their power levels which are participating in power modulation. Water heaters located on the six load buses 902-912 are assumed, with 2 GigaWatt (GW) per area in case #1 and 5 GW per area in case #2.

Case #0: No demand-side control is assumed—this is the base-line for comparison with cases #1 and #2.

Case #1: Demand-side control is implemented with a low penetration of a population of water heaters in each area (e.g., a relatively small fraction giving a total of 2 GW per area). With low penetration, the potential damping effectiveness is expected to be lower. Whether this lower effectiveness is still adequate to modulate power depends on the magnitude of the oscillations in the power grid.

Case #2: A higher penetration of water heaters in each area (a total of 5 GW per area). The damping effectiveness of case #2 is thus expected to be higher, as illustrated in FIGS. 11-12 and 14-15.

Coordination Period:

This is the length of time over which power modulation is effected, after which all end-use loads participating in power modulation are released from the lockout state, and then a new interval of power modulation is started. End-use loads not participating in power modulation for this coordination period are not affected by this procedure.

Locations of End-Use Loads in MiniWECC System:

In the MiniWECC system, groups of water heaters are assumed at the six load buses 902-912. Each area of water heaters has a total power of 2 GW for case #1 and 5 GW for case #1.

VIII. Performance Modeling for Contingency #1

Figure 10:
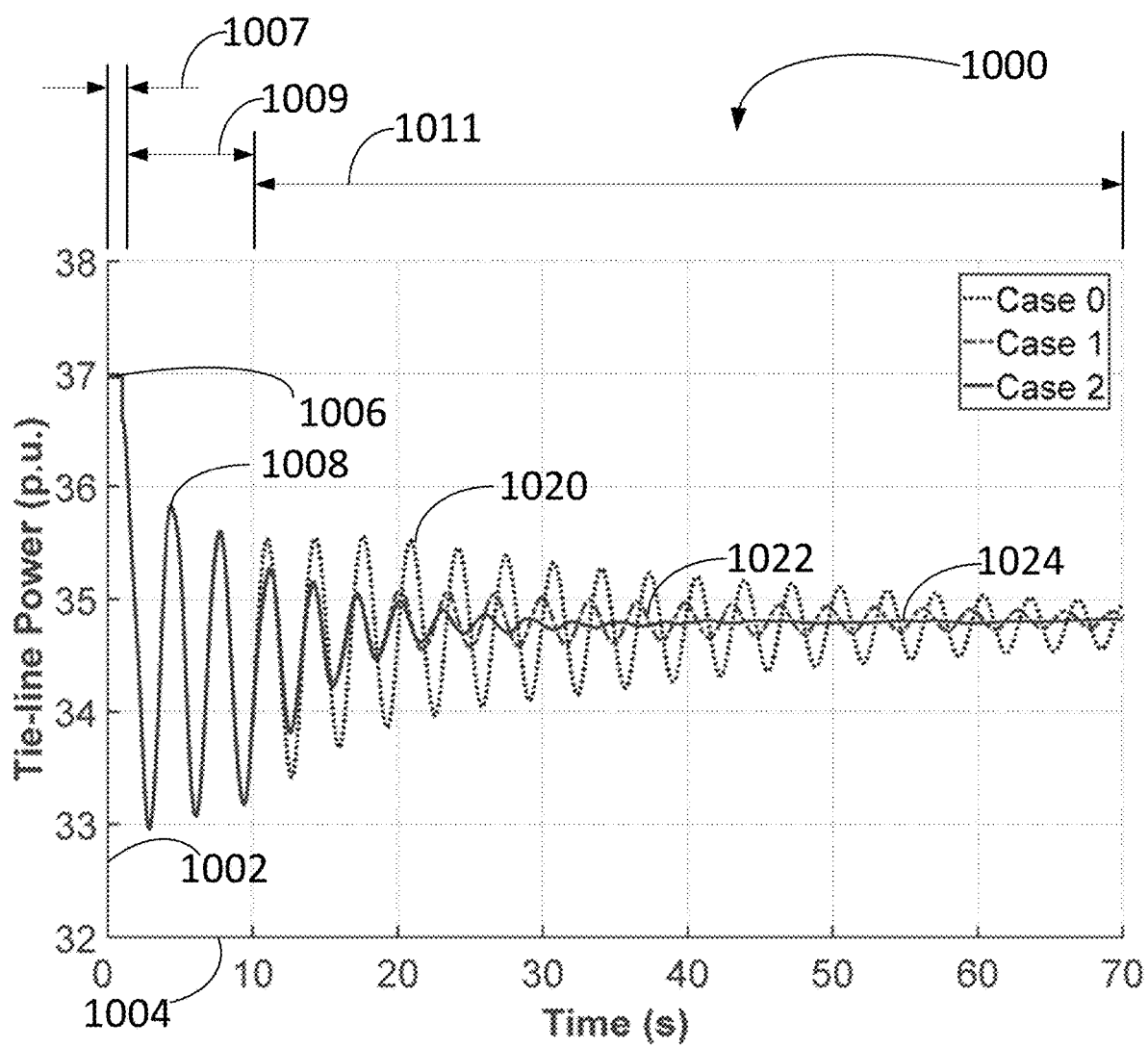
FIG. 10 is a graph of an example of tie-line power flows for an example of inter-area oscillation damping in contingency 1, as can be implemented in certain examples of the disclosed technology.

FIG. 10 shows a graph 1000 of tie-line power flows with tie-line power (expressed in p.u., normalized power units) 1002 plotted as a function of time (in seconds) 1004 for contingency event #1, a sudden loss of generator #4 (1275 MW) on bus #9. Cases #0, #1 and #2 are modeled. Contingency event #1 occurs after 1 second (at the end of interval 1007), and then after a 9-second-long interval 1009 of no active response, demand-side control is enabled at 10 seconds, entering an interval 1011 extending to 70 seconds. Prior to the contingency event (during interval 1007), the tie-line power is 37 p.u. (at curve 1006). The asymptotic value (at 70 seconds) of the tie-line power following contingency event #1 is ~34.8 p.u., and thus the effect of contingency event #1 is a net reduction of the equilibrium (after oscillations have decayed away) tie-line power of ~2.2 p.u. The loss of generator #4 is essentially an impulse shock to the power grid, inducing the Alberta mode 0.324 Hz lightly-damped oscillation 1008 over the interval 1009 (without demand-side control).

Cases #0-#2:

From 0 seconds to 1 seconds (interval 1007), the tie-line power is 37 p.u., followed by a sharp drop and then a slowly-decaying oscillation 1008 from 1 seconds to 10 seconds (interval 1009). Over the interval 1009, all three cases follow the same curve 1008 since power modulation has not yet been activated.

Case #0:

The initial oscillation 1008 is seen to continue as a baseline curve 1020, which after ~21 cycles at 70 seconds still has a substantial amplitude. This is not unexpected since with only 0.5% damping, curve 1020 would be expected to reach the asymptotic value of ~34.8 p.u. only after a long time.

Case #1:

An immediate increase in damping is seen at the transition from curve 1008 to a curve 1022. At 70 seconds the amplitude of curve 1022 is less than half that of baseline curve 1020. However, comparison of curve 1022 to baseline curve 1020 shows that this improvement has largely occurred between 10 seconds and ~18 seconds when there were still water heaters which had not yet undergone transitions 704 or 714 in FIG. 7 (see FIGS. 11 and 12). After ~18 seconds all water heaters participating in power modulation have already undergone one or the other of transitions 704 or 714 (e.g., all water heaters are in either state 706 or state 716, with basically none remaining in either of their initial states 702 or 712), and thus no further reduction of the ratio of curve 1022 to curve 1020 is possible after ~18 seconds.

Case #2:

Between 10 seconds and ~18 seconds curves 1024 and 1022 should be essentially identical, since over this interval the same water heater resources may be employed for power modulation in both case #1 and case #2. After ~18 seconds however, case #1 has limited out, while curve 1024 continues to damp out more rapidly, since for this case, a larger population of water heaters are participating in power modulation at each area (5 GW instead of the 2 GW in case #1). Case #2 never reaches a point at which 100% of the water heaters have been switched to a locked state (either state 706 or state 716). Thus, over the period from 10 seconds to 70 seconds the ratio of curve 1024 to curve 1020 steadily decreases as more and more water heaters undergo either transition 704 or 714. Over the period from ~18 seconds to 70 seconds the ratio of curve 1024 to curve 1022 also steadily decreases, since in this interval for case #1, power modulation has essentially quit working due to a lack of available water heater resources.

FIG. 11 shows a graph 1100 derived from the rising signal from FIG. 10. The number of devices 1102 (in % of the total number of devices) which have undergone transition 704 in load bus 902 is shown as a function of time 1104. No power modulation occurs during an interval 1108 from 0 seconds to 10 seconds (corresponding to a combination of intervals 1007 and 1009 in FIG. 10), and thus a curve segment 1106 (for both case #1 and case #2) remains at 0%. Once end-use load power modulation begins at 10 seconds curves 1112 and 1114 increase as more and more water heaters undergo transition 704 over the interval 1110 (the interval from 10 seconds to ~18 seconds). After ~18 seconds however, curve 1112 for case #1 has limited at 100%, meaning that all water heaters participating in power modulation which were initially OFF have undergone transition 704, and no participating water heaters which were initially OFF remain in OFF state 702. This limiting at 100% essentially signifies a loss of power modulation due to an exhaustion of water heater resources which will continue until the end of the coordination period, at which time those water heaters are released from the lockout state. In contrast with curve 1112, curve 1114 for case #2 shows no limiting behavior, and instead continues to increase to an asymptotic level of ~58% at 70 s. Given the assumption of 5 GW of water heater power, 58% corresponds to ~2.9 GW. At ~18 seconds curve 1114 is at ~45%, corresponding to ~2.25 GW, which exceeds the maximum control range for case #1 (2.0 GW). Thus, curve 1112 reaches 100% around at this time, since the entire 2.0 GW control range has been used up. Over the interval 1110 from 10 seconds to ~18 seconds curve 1112 is basically scaled by a ratio of (5 GW)/(2 GW)=2.5 times higher relative to curve 1114, with rising portions of curves 1112 and 1114 corresponding to rising segments of curves 1022 and 1024, respectively, and constant portions of curves 1112 and 1114 corresponding to falling segments of curves 1022 and 1024, respectively.

FIG. 12 shows a graph 1200 derived from the falling signal from FIG. 10. The number of devices 1202 (in % of the total number of devices) which have undergone transition 714 in load bus 902 is shown as a function of time 1204. No power modulation occurs during an interval 1208 from 0 seconds to 10 seconds (corresponding to interval 1108 in FIG. 11, and to a combination of intervals 1007 and 1009 in FIG. 10), and thus curve segment 1206 (for both case #1 and case #2) remains at 0%. Once end-use load power modulation begins at 10 seconds curves 1212 and 1214 increase as more and more water heaters undergo transition 714 over the interval 1210 (the interval from 10 seconds to ~18 seconds. After ~18 seconds however, curve 1212 for case #1 has limited at 100%, meaning that all water heaters participating in power modulation have undergone transition 714, and no allocated water heaters which were initially ON remain in ON state 712. This limiting at 100% essentially signifies a loss of power modulation (as in FIG. 11) due to an exhaustion of water heater resources which will continue until the end of the coordination period, at which time those water heaters are released from the lockout state. In contrast with curve 1212, curve 1214 for case #2 shows no limiting behavior, continuing to increase to an asymptotic level of ~56% at 70 s. Given the assumption of a 5 GW water heater power, 56% corresponds to ~2.8 GW. At ~18 seconds curve 1214 is at ~45%, corresponding to ~2.25 GW, which exceeds the maximum control range for case #1 (2.0 GW). Thus, curve 1212 reaches 100% around at this time, since the entire 2.0 GW control range has been used up as in FIG. 12. Over the interval from 10 seconds to ~18 seconds curve 1212 is basically scaled by a ratio of (5 GW)/(2 GW)=2.5 times higher relative to curve 1214, with rising portions of curves 1212 and 1214 corresponding to falling segments of curves 1022 and 1024, respectively, and constant portions of curves 1212 and 1214 corresponding to rising segments of curves 1022 and 1024, respectively.

IX. Performance Modeling for Contingency #2

Figure 13:
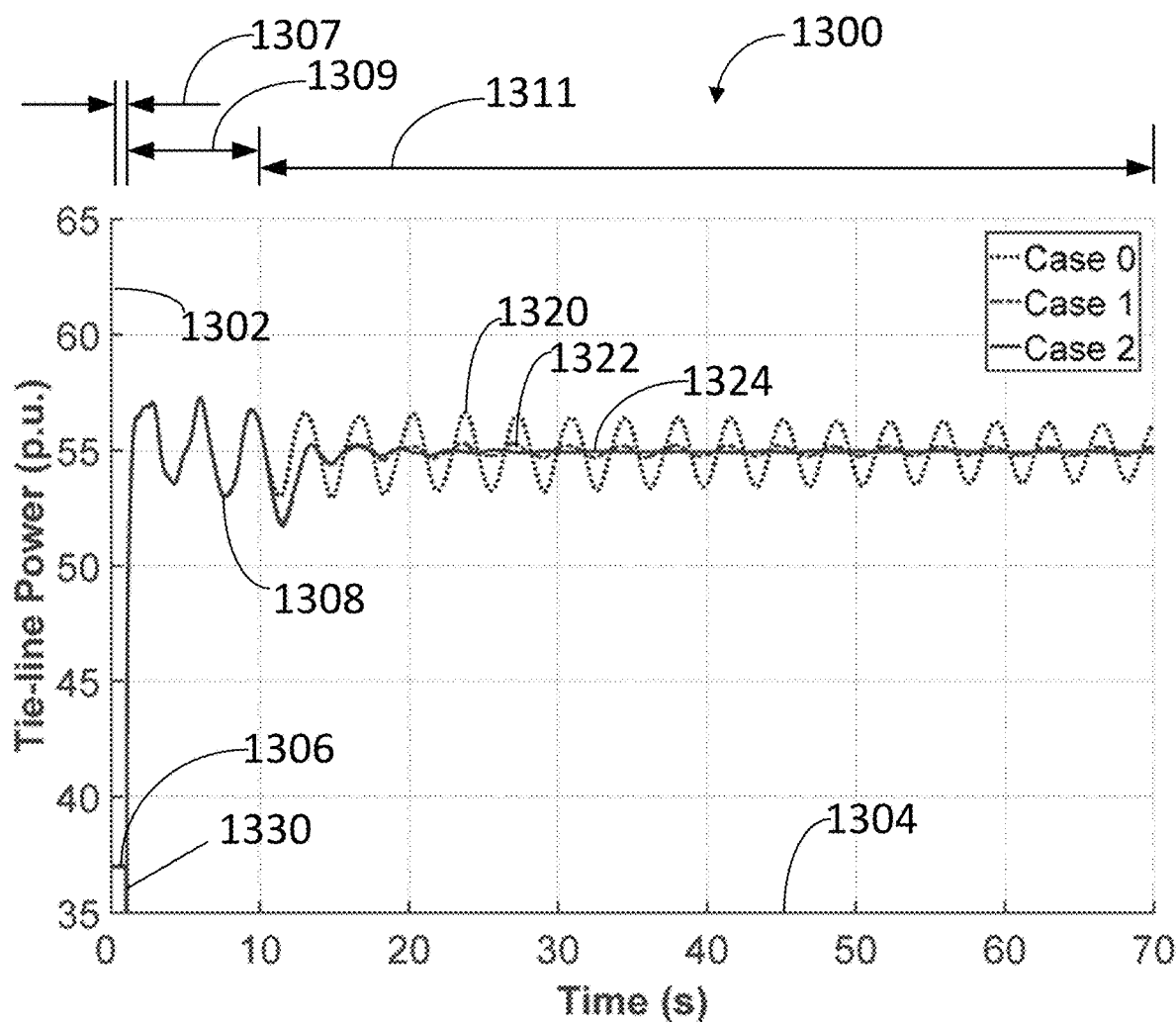
FIG. 13 is a graph of examples of tie-line power flows for examples of inter-area oscillation damping in contingency 2, as can be implemented in certain examples of the disclosed technology.

FIG. 13 shows a graph 1300 of tie-line power flows with tie-line power (in p.u.) 1302 plotted as a function of time 1304 for contingency #2, a three-phase fault on the 500 kV line connecting bus #89 and bus #90 resulting in the line tripping after three cycles. Cases #0, #1 and #2 are modeled as for contingency #1 in FIGS. 10-12. Contingency event #2 occurs after 1 seconds (at the end of interval 1307), and then after a 9 seconds long period 1309 of no active response, demand-side control is enabled at 10 seconds leading to an interval 1311 extending to 70 s. Prior to contingency #2 (during interval 1307), the tie-line power is 37 p.u. (as indicated at 1306)—this is the same as for FIG. 10, since during this interval the system is in the same (unperturbed) state. The asymptotic value at 70 seconds is seen to be ~55 p.u., thus the effect of contingency #2 is a net increase of the equilibrium (after oscillations have decayed away) tie-line power of ~18 p.u. The three-phase fault on the line connecting bus #89 and bus #90 is essentially an impulse shock to the power grid, inducing the Alberta mode 0.324 Hz lightly-damped oscillation 1308 over the interval 1309 (without demand-side control).

Cases #0-#2—from 0 seconds to 1 second (interval 1307), the tie-line power is 37 p.u., followed by a sharp negative-going spike 1330, then an abrupt rise to ~55 p.u. (approximately the asymptotic power at 70 seconds. Over the interval 1309, the oscillations of all three cases are dominated by the oscillatory Alberta mode since power modulation has not yet been activated.

Case #0—the initial oscillation 1308 is seen to continue as a baseline curve 1320, which after ~20 cycles at 70 seconds still has only a small degree of decay.

Case #1—an immediate increase in damping is seen at the transition from curve 1308 to a curve 1322. At 70 seconds the amplitude of curve 1322 is a small fraction of the amplitude of baseline curve 1320.

Case #2—between 10 seconds and ~13.5 seconds curves 1324 and 1322 should be essentially identical, since over this interval the same water heater resources may be employed for power modulation in both case #1 and case #2. After ~13.5 seconds however, case #1 has limited out, while curve 1324 continues to damp out more rapidly since for this case, a larger population of water heaters are available at each area (5 GW instead of the 2 GW in case #1). Case #2 never reaches a point at which 100% of the water heaters have been switched to a locked state (either ON state 706 or OFF state 716). Thus, over the period from 10 seconds to 70 seconds, the ratio of curve 1324 to curve 1320 steadily decreases as more and more water heaters undergo either transition 704 or 714. Over the period from ~13.5 seconds to 70 seconds the ratio of curve 1324 to curve 1322 also steadily decreases, since in this interval for case #1, power modulation has essentially quit working due to a lack of available water heater resources.

FIG. 14 shows a graph 1400 derived from the rising signal from FIG. 13. The number of devices 1402 (in % of the total number of devices) which have undergone transition 704 in load bus 902 is shown as a function of time 1404. No power modulation occurs during an interval 1408 from 0 seconds to 10 seconds (corresponding to a combination of intervals 1307 and 1309 in FIG. 13), thus a curve 1406 (for both case #1 and case #2) remains at 0%. Once end-use load power modulation begins at 10 seconds curves 1412 and 1414 increase as more and more water heaters undergo transition 704 over the interval 1411 extending to 70 s. After ~13.5 seconds however, curve 1412 for case #1 has limited at 100%, meaning that all available water heaters which were initially OFF have undergone transition 704, and no participating water heaters which were initially OFF remain in OFF state 702. This limiting at 100% essentially signifies a loss of power modulation due to an exhaustion of water heater resources which will continue until the end of the coordination period, at which time those water heaters are released from the lockout state. In contrast with curve 1412, curve 1414 for case #2 shows no limiting behavior, continuing to increase to an asymptotic level of ~80% at 70 s.

Given the assumption of 5 GW water heater power, 80% corresponds to ~4.0 GW. At ~13.5 seconds curve 1414 is at ~45%, corresponding to ~2.25 GW, which exceeds the maximum control range for case #1 (2.0 GW). Thus, curve 1412 reaches 100% around at this time, since the entire 2.0 GW control range has been used up. Over the interval from 10 seconds to ~13.5 seconds curve 1412 is basically scaled by a ratio of (5 GW)/(2 GW)=2.5 times relative to curve 1414, with rising portions of curves 1412 and 1414 corresponding to rising portions of curves 1322 and 1324, respectively, and constant portions of curves 1412 and 1414 corresponding to falling segments of curves 1322 and 1324, respectively.

FIG. 15 shows a graph 1500 derived from the falling signal from FIG. 13. The number of devices 1502 (in % of the total number of devices) which have undergone transition 714 in load bus 902 is shown as a function of time 1504. No power modulation occurs during interval 1508 from 0 seconds to 10 seconds (corresponding to interval 1408 in FIG. 14, and to a combination of intervals 1307 and 1309 in FIG. 13), thus curve 1506 (for both case #1 and case #2) remains at 0%. Once end-use load power modulation begins at 10 seconds curves 1512 and 1514 increase as more and more water heaters undergo transition 714 over the interval 1511 extending to 70 s. After ~13.5 seconds however, curve 1512 for case #1 has limited at 100%, meaning that all available water heaters have undergone transition 714, and no allocated water heaters which were initially ON remain in ON state 712. This limiting at 100% essentially signifies a loss of power modulation (as in FIG. 14) due to an exhaustion of water heater resources which will continue until the end of the coordination period, at which time those water heaters are released from the lockout state. In contrast with curve 1512, curve 1514 for case #2 shows no limiting behavior, continuing to increase to an asymptotic level of ~78% at 70 s. Given the assumption of 5 GW water heater power, 78% corresponds to ~3.9 GW. At ~13.5 seconds curve 1514 is at ~45%, corresponding to ~2.25 GW, which exceeds the maximum control range for case #1 (2.0 GW). Thus, curve 1512 reaches 100% around at this time, since the entire 2.0 GW control range has been used up as in FIG. 15. Over the interval from 10 seconds to ~13.5 seconds curve 1512 is basically scaled by a ratio of (5 GW)/(2 GW)=2.5 times higher relative to curve 1514, with rising portions of curves 1512 and 1514 corresponding to falling segments of curves 1322 and 1324, respectively, and constant segments of curves 1512 and 1514 corresponding to rising segments of curves 1322 and 1324, respectively.

X. Demand-Side Control Strategy for Frequency Regulation

For frequency regulation in a power grid, a similar approach as that described above for damping of inter-area oscillations may be employed. FIG. 16 shows a schematic diagram of a demand-side control strategy 1600 with hierarchical decision making as applied to a single area within a power grid. Each of areas #1 104 and #2 106 in FIG. 1 may implement this demand-side control strategy 1600, and, in general, for a power grid with multiple areas 1 to j, each area j could implement this control strategy in parallel. A supervisory layer 1602 comprises a single coordinator 1604. Data/control links 1640-1643 connect coordinator 1604 to a multiplicity of controllers 1614-1617 (four shown), respectively, in a device layer 1650. Device layer 1650 comprises control links 1630-1633 connecting controllers 1614-1617 to end-use loads #1 to #N 1620-1623 (four shown), respectively. Data links 1626-1629 connect end-use loads #1 to #N 1620-1623 to controllers 1614-1617, respectively. The hierarchical control decision making comprises the following aspects:

A. Device Layer

Controllers 1614-1617 in device layer 1650, which are alternatively referred to herein as "end-use load controllers," execute fast time-scale control of the ON/OFF states of end-use loads #1 to #N 1620-1623 by means of control links 1630-1633, respectively. FIG. 7 shows a schematic diagram of threshold-based control logic 700 as employed in each of controllers 1614-1617; this is the same control logic used in FIG. 6 for inter-area oscillation damping. In some embodiments, this control scheme may operate in addition to pre-existing local controllers. Further, in some embodiments, the threshold-based controllers 1614-1617 may remain inactive (e.g., each end-use load remains solely under local feedback control) until individual end-use loads, such as one or more of loads 1620-1623, become active in frequency regulation. In some embodiments, when a controller becomes active, it may override the local control logic and force individual end-use loads to stay with their committed operation states (ON or OFF) until these states are forced to switch as part of the frequency modulation strategy for system instabilities, after which these states are locked until the end of the coordination period. In some embodiments, when a controller becomes active, the local control logic may still override the controller signal (e.g., to avoid overheating of a water heater, or to avoid cooling a room below an end-user-selected set temperature). The effect of this circumstance on the end-use load modulation strategy depends on how many loads experience overrides. In the worst case scenario in which all of the loads experience an override, the effect will be large.

Figure 17:
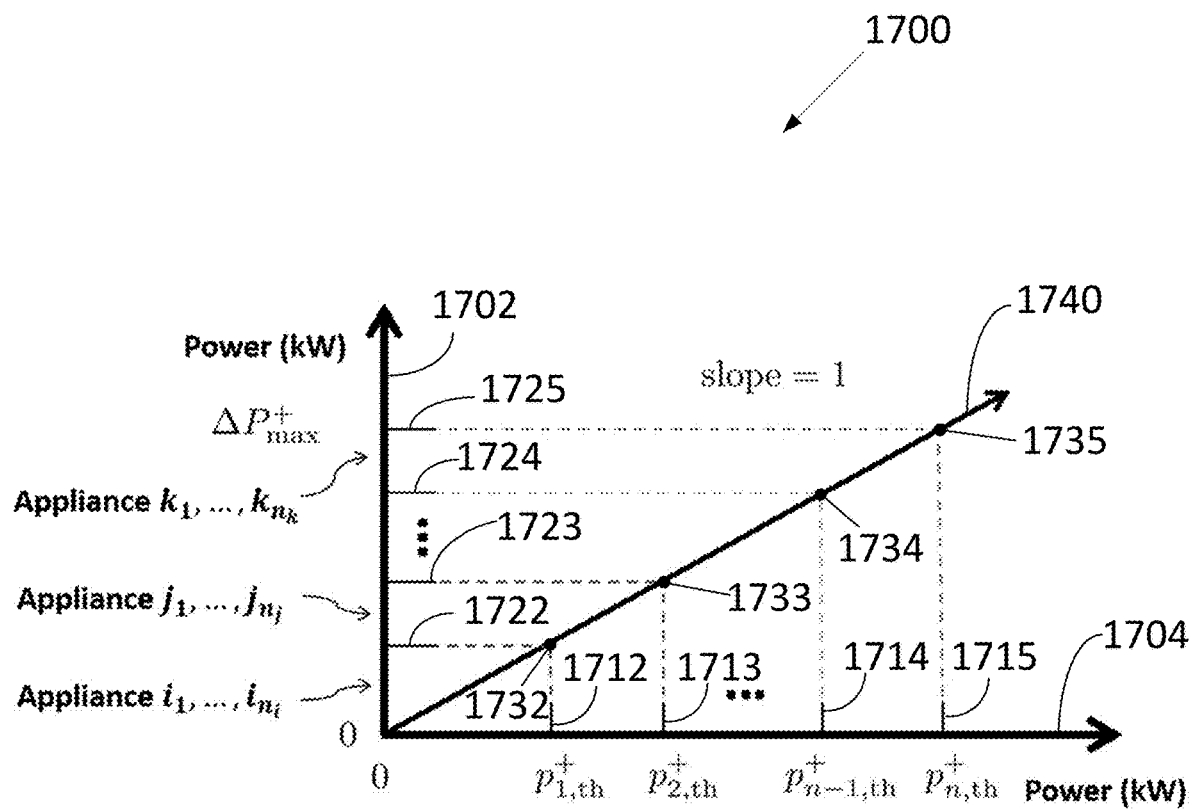
FIG. 17 is a graph of an example of supervised threshold determination for frequency regulation, as can be implemented in certain examples of the disclosed technology.

FIG. 17 shows a graph 1700 of appliance power 1702 as a function of threshold power 1704 for use by each area coordinator 1604 in determining the thresholds $p_{th}^+$. Graph 1700 for frequency regulation is similar to graph 800 for inter-area oscillation damping, except that graph 1700 applies to all the controllers within an area (since coordinator 1604 directly controls controllers 1614-1617 as shown in FIG. 16). Thus, the intermediate layer of distribution coordinators shown in FIG. 6 is not applicable for frequency regulation. The total power flexibility $\Delta P_{max}^+$ for all participating end-use loads which are initially OFF in the area is calculated similarly to FIG. 8, except here all end-use loads for the area are added together, not just the end-use loads for each distribution coordinator as in FIG. 8. Similarly, the total power flexibility $\Delta P_{max}^-$ for all participating end-use loads which are initially ON in the area is also calculated.

The slope of curve 1740 is set to 1; this is because graph 1700 applies to the entire area, unlike graph 800 which applies to each distribution system (with its own distribution coordinator) within an area. The vertical axis 1702 of graph 1700 is a stack of all appliances (devices) controlled by the coordinator 1604. At the bottom of appliance power axis 1702 are appliances $i_1, \ldots, i_{ni}$ having the highest willingness (largest percentage) to participate in power modulation for frequency regulation for this coordination period. Thus, these lower appliances preferably should be turned ON (following the transition 704 from OFF state 702 to ON-Lock state 706) earlier than other appliances having a lower willingness to participate. For power modulation, it is preferred that each group of appliances comprise a large enough population such that the power requirement for any one appliance within that group is small enough such that the discontinuity of power demand (e.g., either fully OFF or fully ON) is negligible relative to the total power demand of the group. In addition, it is preferred that the total number of appliances controlled by the coordinator be substantially larger than the number of appliances within any single group, thus also reducing granularity of control.

The first threshold $p_{1,th}^+$ (line 1712) is determined by the intersection 1732 of line 1740 with horizontal line 1722 having a power level corresponding to the sum of all the powers of appliance group $i_1, \ldots, i_{ni}$. The second threshold $p_{2,th}^+$ (line 1713) is determined by the intersection 1733 of line 1740 with horizontal line 1723 having a power level corresponding to the sum of all the powers of appliance group $j_1, \ldots, j_{nj}$ added to the sum of all the powers of appliance group $i_1, \ldots, i_{ni}$ (e.g., the two groups are "stacked" along axis 1702). The second group of appliances $j_1, \ldots, j_{nj}$ may have lower willingness percentages for participation in power modulation than the bottom group $i_1, \ldots, i_{ni}$, thus it is reasonable to change the state of these appliances only after all the more willing appliances in the lower group have already changed state. Similar considerations apply to group $k_1, \ldots, k_{nk}$, which may have the lowest willingness percentages. The n−1st threshold is $p_{n-1,th}^+$ (line 1714), determined by the intersection 1734 of line 1740 with horizontal line 1724. The sum of all the powers of the appliances controlled by coordinator 1604 is $\Delta P_{max}^+$ (line 1725). The intersection 1735 of line 1740 with line 1725 determines the $n^{th}$ threshold, $p_{n,th}^+ = \Delta P_{max}^+$ (line 1715). With a stacking of appliances along axis 1702 which prioritizes higher willingness appliances nearer the bottom of axis 1702 and lower willingness appliances nearer the top of axis 1702, methods of embodiments will change the OFF state 702 through transition 704 to ON-Lock state 706 for those appliances where this transition is less disadvantageous, while reserving the transitions of other (lower willingness) devices only for situations needing a higher degree of frequency regulation. This method of defining the thresholds along axis 1704 ensures that all the end-use loads in the area participate synchronously in power modulation, since the thresholds are compared against the broadcasted $\Delta P_j^+(t)$ and $\Delta P_j^-(t)$ signals for the area.

XI. Performance Modeling for Frequency Regulation

Figure 18:
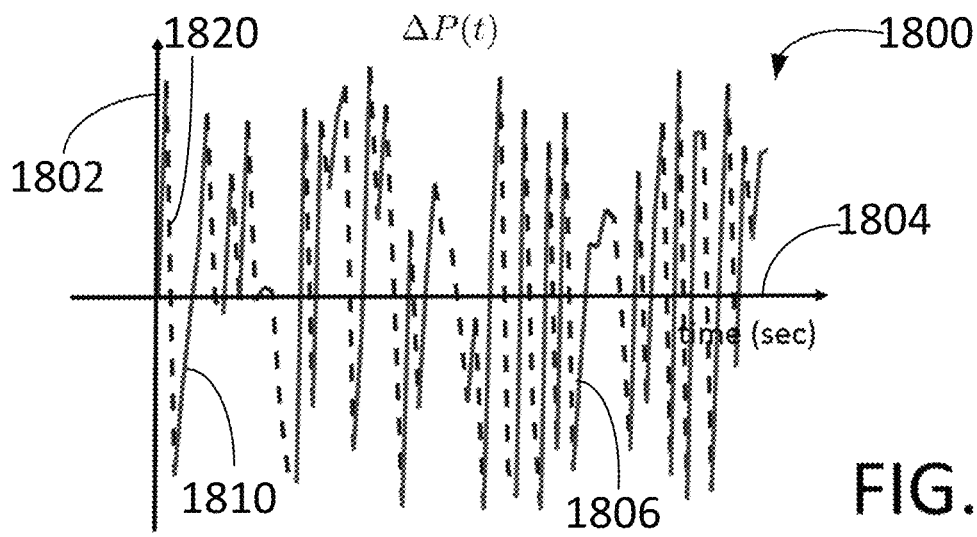
FIG. 18 is a graph of an example of regulation signals for frequency regulation, as can be implemented in certain examples of the disclosed technology.
Figure 19:
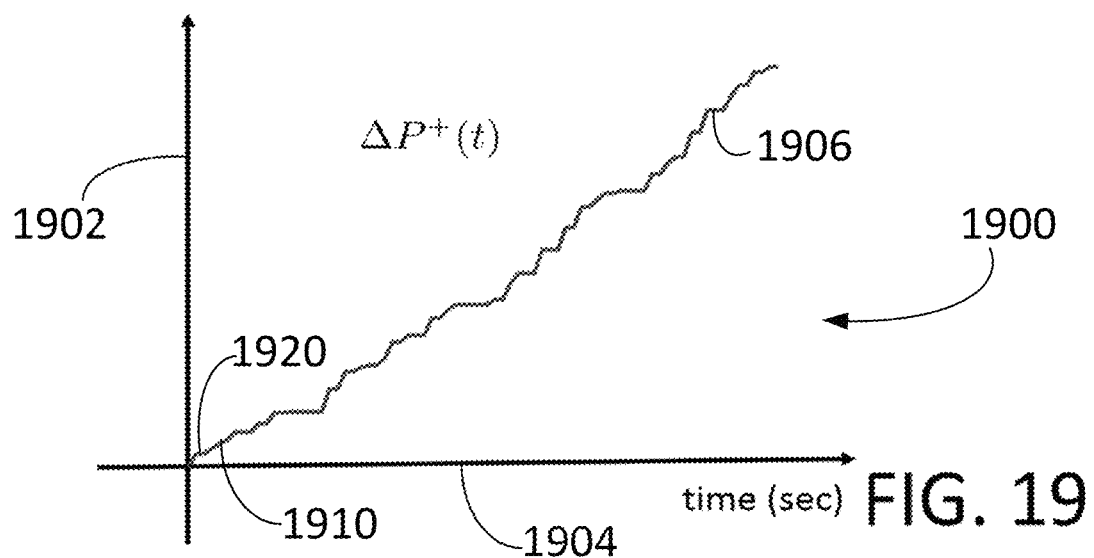
FIG. 19 is a graph of an example of a rising signal derived from FIG. 18, as can be implemented in certain examples of the disclosed technology.
Figure 20:
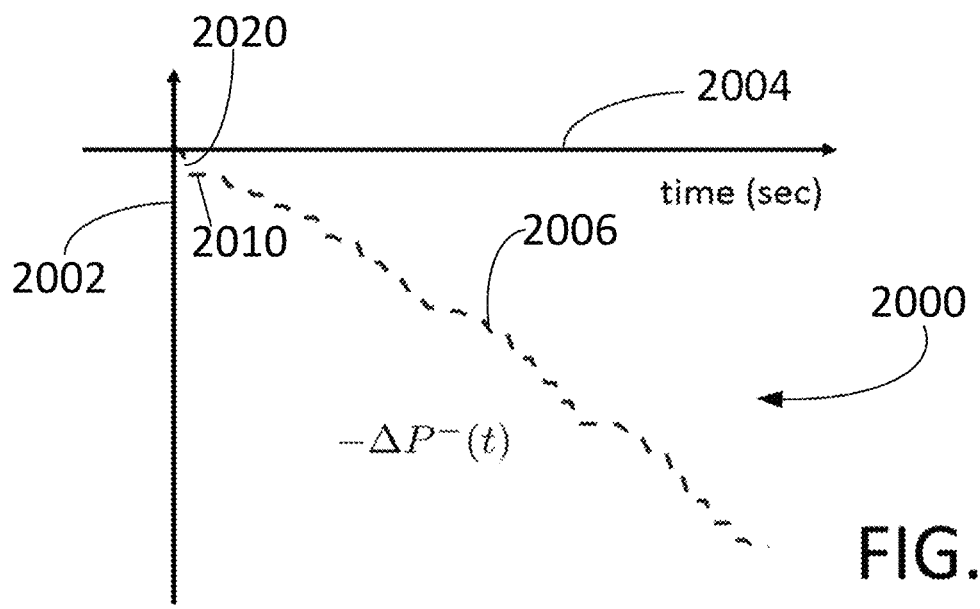
FIG. 20 is a graph of an example of a falling signal derived from FIG. 18, as can be implemented in certain examples of the disclosed technology.

FIGS. 18-20 for frequency regulation are similar to FIGS. 3-5 for inter-area oscillation damping. Some differences between frequency regulation and inter-area oscillation damping may be seen in FIG. 18, which illustrates the more random up/down behavior observed in frequency fluctuations compared the smoother damped oscillation seen with FIG. 3.

FIG. 18 shows a typical power modulation signal $\Delta P$ 1806 in a graph 1800 of power 1802 within an area as a function of time 1804. Fluctuations in power modulation signal $\Delta P$ 1806 (corresponding to frequency variations) are seen to be more irregular than for the two examples of inter-area oscillation damping in FIGS. 10 and 13. There are two types of regions in power modulation signal $\Delta P$ 1806: rising portions $\Delta P^+$ wherein the total power demand in the area is increasing, and falling portions $\Delta P^-$ wherein the total power demand in the area is decreasing. As for inter-area oscillation damping, the power modulation signal $\Delta P$ may be expressed at the sum of two components, a rising signal $\Delta P^+$, and a falling signal $\Delta P^-$:

$$\Delta P = \Delta P^+ + \Delta P^-.$$

FIG. 19 shows a rising signal $\Delta P^+$ 1906 in a graph 1900 of power demand 1902 as a function of time 1904, derived from FIG. 18. Increasing segment 1910 of rising signal $\Delta P^+$ 1906 corresponds to rising segment 1810 of power modulation signal $\Delta P$ 1806. Constant segment 1920 of rising signal $\Delta P^+$ 1906 corresponds to falling segment 1820 in FIG. 18. Thus, rising signal $\Delta P^+$ 1906 increases in synchrony with each increase in the power modulation signal $\Delta P$ 1806, but remains unchanged during intervals in which the power modulation signal $\Delta P$ 1806 is decreasing. Some or all of those end-use loads that are currently OFF (and which are participating in power modulation) can be turned ON to provide increases in $\Delta P$.

FIG. 20 shows a falling signal $\Delta P^-$ 2006 in a graph 2000 of power demand 2002 as a function of time 2004, derived from FIG. 18. Decreasing segment 2020 of falling signal $\Delta P^-$ 2006 corresponds to falling segment 1820 of power modulation signal $\Delta P$ 1806. Constant segment 2010 of falling signal $\Delta P^-$ 2006 corresponds to rising segment 1810 in FIG. 18. Thus, falling signal $\Delta P^-$ 2006 decreases in synchrony with each decrease in the power modulation signal $\Delta P$ 1806, but remains unchanged during intervals in which the power modulation signal $\Delta P$ 1806 is increasing. Some or all of those end-use loads that are currently ON (and which are participating in power modulation) can be turned OFF to provide decreases in $\Delta P$.

Since end-use loads typically have a large population size and a fast aggregated ramping rate, proper coordination of the ON/OFF states of the end-use loads can satisfy the multiple requirements of speed, accuracy, and magnitude.

Figure 21:
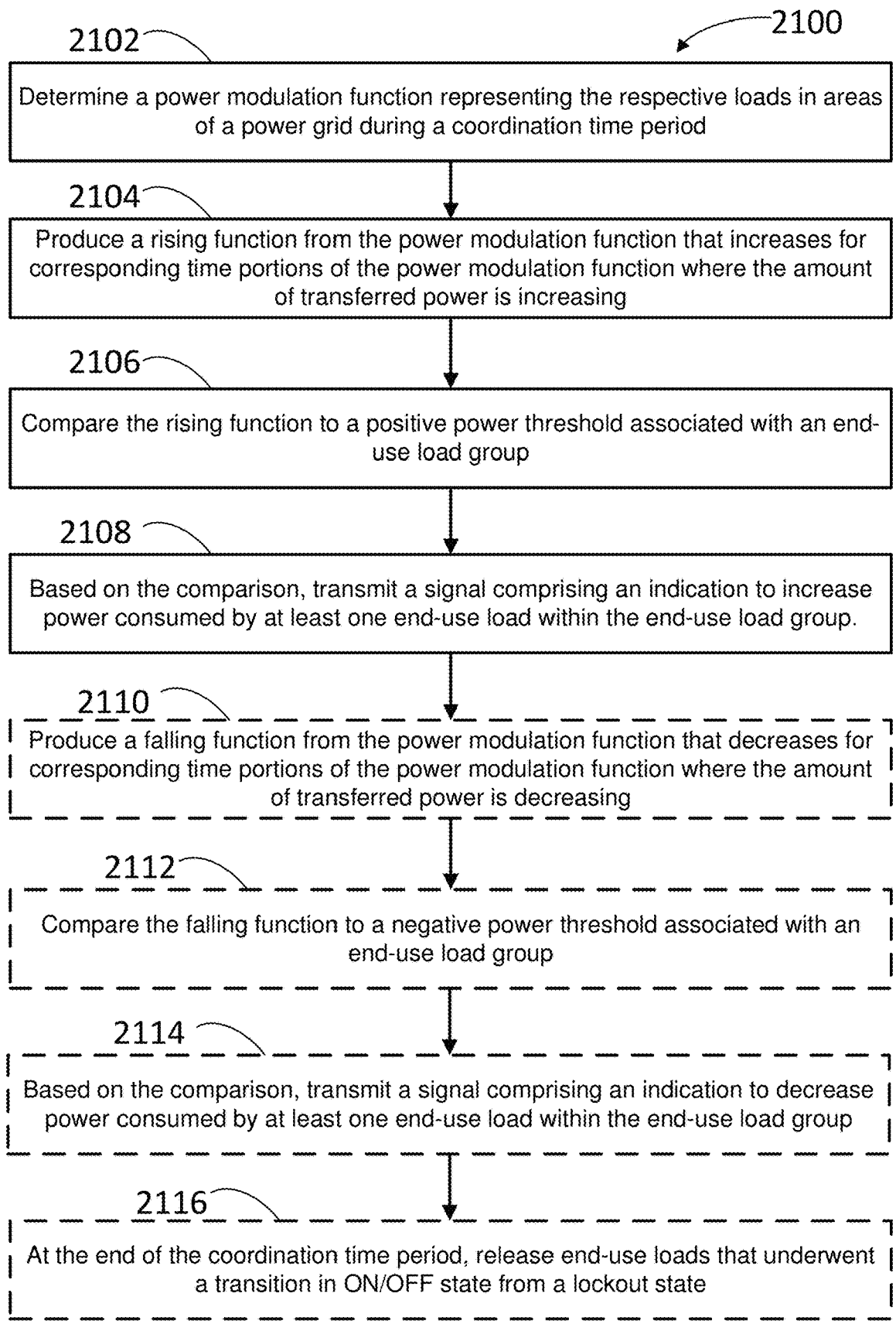
FIG. 21 is a flowchart for operation of an example inter-area oscillation damping control strategy, as can be implemented in certain examples of the disclosed technology.

XII. Inter-Area Oscillation Damping Method Using Power Modulation with End-Use Loads FIG. 21 is a flowchart 2100 for operation of an example method for inter-area oscillation damping control, as can be performed in certain examples of the disclosed technology.

At process block 2102, a power modulation function is determined representing the respective loads in areas of a power grid during a coordination time period. In one example, the power modulation function can be determined by an area coordinator. In another example, the power modulation function can be determined by a distribution coordinator.

At process block 2104, a rising function is produced from the power modulation function generated in block 2102. Examples of rising functions are illustrated in FIGS. 4, 11, 14, and 19. The rising function can optionally be produced by an area coordinator or a distribution coordinator.

At process block 2106, the rising function is compared to a positive power threshold associated with an end-use load group (e.g., a group of end-use loads that are currently OFF). An example of this comparison is transition 704 in FIG. 7. In one non-limiting example, the comparison can be performed by respective controllers associated with the end-use loads that are currently OFF.

At process block 2108, based on the comparison in block 2106, a signal is transmitted comprising an indication to increase power consumed by at least one end-use load within the end-use load group. For example, responsive to the comparison in block 2106 indicating that the rising function exceeds the positive power threshold, a signal comprising an indication to turn ON the at least one end-use load can be transmitted (e.g., from a controller associated with the end-use load to a processor of the end-use load, the processor operably coupled to an electrical load of the end-use load).

In some examples, the method ends at process block 2108. In other examples, the method further includes optional process blocks 2110-2116.

At process block 2110, a falling function is produced from the power modulation function generated in block 2102. Examples of falling functions are illustrated in FIGS. 5, 12, 15, and 20. The falling function can optionally be produced by an area coordinator or a distribution coordinator.

At process block 2112, the falling function is compared to a negative power threshold associated with an end-use load group. An example of this comparison is transition 714 in FIG. 7. In one non-limiting example, the comparison can be performed by respective controllers associated with the end-use loads that are currently ON.

At process block 2114, based on the comparison in block 2112, a signal is transmitted comprising an indication to decrease power consumed by at least one end-use load within the end-use load group. For example, responsive to the comparison in block 2112 indicating that the falling function is lower than the negative power threshold, a signal comprising an indication to turn OFF the at least one end-use load can be transmitted (e.g., from a controller associated with the end-use load to a processor of the end-use load, the processor operably coupled to an electrical load of the end-use load).

At process block 2116, at the end of the coordination time period, all end-use loads that underwent a transition from OFF to ON or from ON to OFF can be released from a lockout state. For example, the transitioning of a given end-use load from OFF to ON or from ON to OFF may cause it to enter a "locked" state for the remainder of the coordination period, in which it is prevented from transitioning between the ON and OFF states. Upon completion of the coordination time period, the controller associated with the end-use load can optionally transmit a signal to a processor of the end-use load that causes the processor to release the end-use load from the lockout state, thereby enabling the end-use load to transition between the ON and OFF states.

XIII. Frequency Regulation Method Using Power Modulation with End-Use Loads

Figure 22:
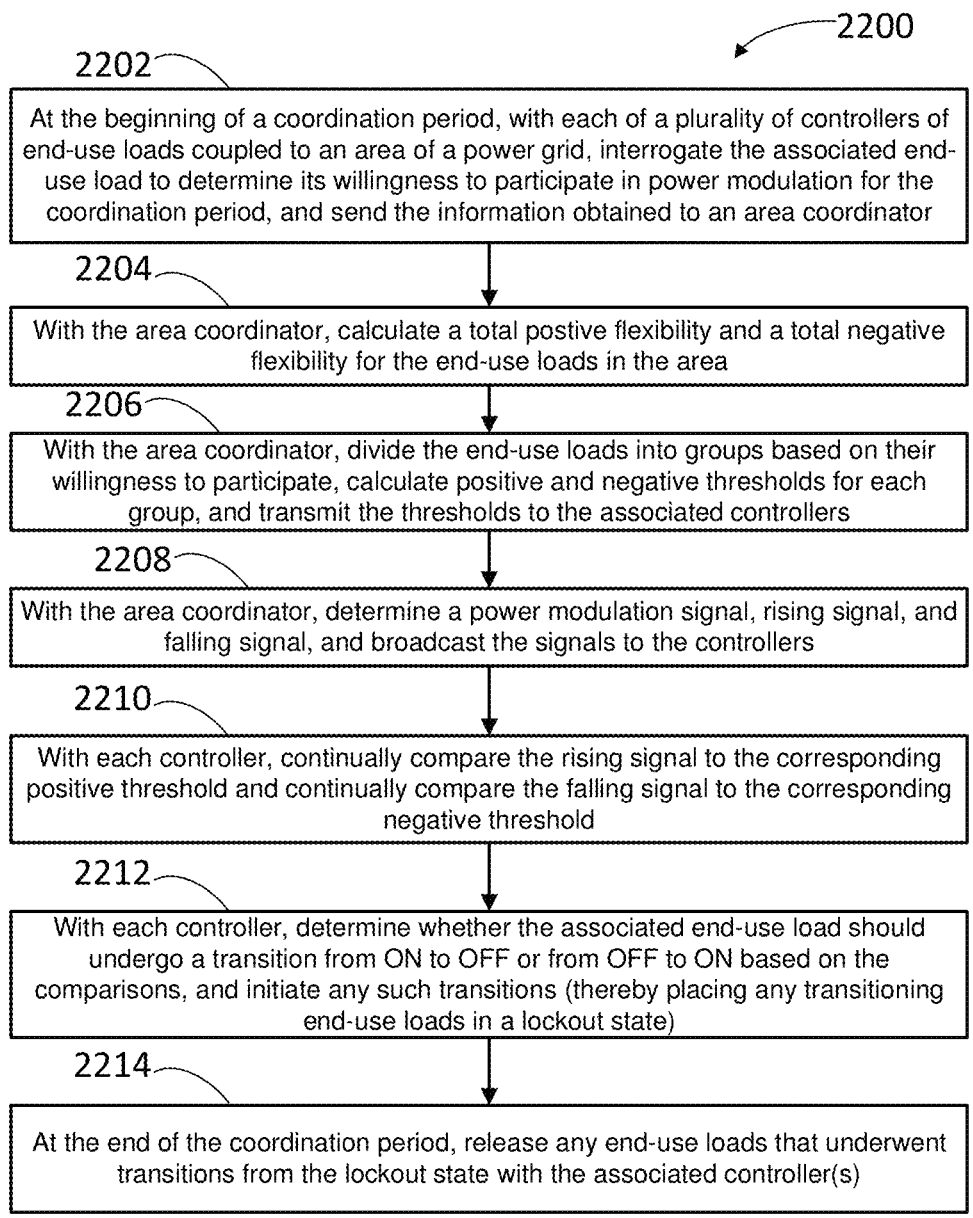
FIG. 22 is a flowchart for operation of an example frequency regulation control strategy, as can be implemented in certain examples of the disclosed technology.

FIG. 22 is a flowchart for an example frequency regulation control strategy for a power grid, as can be implemented in certain examples of the disclosed technology. For example, the control strategy can be implemented by a coordinator of a power grid (e.g., an area coordinator), along with controllers associated with respective end-use loads in the area.

At process block 2202, at or just before the beginning of a coordination period, each controller interrogates its associated end-use load to determine whether that load is available (willing) to participate in power modulation for frequency regulation in the power grid for the coordination period. The "willingness" to participate may be scaled from 0% (e.g., completely unavailable for this coordination period) up to 100% (e.g., fully available and able to be part of the lowest group $(i_1, \ldots, i_{n1})$ of appliances along axis 1702 in FIG. 17). If a load (e.g., an appliance) has a willingness>0%, then it may participate in power modulation, although if the willingness is near 0%, the appliance may be allocated to the top-most group $(k_1, \ldots, k_{nk})$ of appliances along axis 1702 in FIG. 17. The maximum power use by the load (e.g., the total on-power of the load) is also determined. This information is then relayed by the controller to the coordinator.

At process block 2204, after the coordinator has received the end-use load availability information from the controllers, it calculates the total positive and negative "flexibilities" for the end-use loads in the area (e.g., in the manner discussed above with reference to FIG. 17).

At process block 2206, the coordinator divides the end-use loads into groups based on their willingness to participate (e.g., groups $(i_1, \ldots, i_{ni})$; $(j_1, \ldots, j_{nj})$; and $(k_1, \ldots, k_{nk})$ shown in FIG. 17), calculates respective positive and negative thresholds for the groups (e.g., in the manner discussed above with reference to FIG. 17), and transmits the thresholds to the associated controllers. For example, the controllers associated with the loads in a first end-use load group may all receive a first positive threshold and a first negative threshold which apply to all the loads in the first end-use load group, whereas the controllers associated with the loads in a second, different end-use load group may all receive a second, different positive threshold and a second, different negative threshold which apply to all the loads in the second end-use load group. These thresholds will then apply for the duration of a coordination period.

The following process blocks 2208-2214 can be performed in parallel and continuously for the entire area over the duration of the coordination period (typically a few minutes).

At process block 2208, the coordinator determines the power modulation signal $\Delta P(t)$, the rising signal $\Delta P^+(t)$, and the falling signal $\Delta P^-(t)$ for the area, and broadcasts these signals to the controllers of the end-use loads in the area.

Process blocks 2210 and 2212 within each control loop (e.g., the control loop comprising controller 1614, end-use load 1620, control link 1630, and data link 1626) can execute continually for the duration of the coordination period.

At process block 2210, each controller continually monitors the rising signal $\Delta P^+(t)$ and compares it the $p_{th}^+$ threshold for the group including the associated end-use load. Further, each controller continually monitors the falling signal $\Delta P^-(t)$ and compares it to the $p_{th}^-$ threshold for the group including the associated end-use load.

At process block 2212, each controller determines, based on the comparisons made in block 2212, whether the associated end-use load should undergo a transition from ON to OFF or from OFF to ON (e.g., one of the transitions 704 or 714 in FIG. 7), and then initiates any such transitions. For example, responsive to determining that $\Delta P^+(t)$ has exceeded its threshold or $\Delta P^-$ (t) has fallen below its threshold based on the comparisons, a controller may send a signal to the associated end-use load to initiate a transition in its ON/OFF state. Upon transitioning, the end-use load can enter a lockout state until the completion of the coordination period. At the completion of the coordination period, the method proceeds to process block 2214.

At process block 2214, at the end of the coordination period (or just after the end of the coordination period), all end-use loads which have been switched (e.g., transitioned from OFF to ON or ON to OFF) in block 2212 are released from the lockout state (e.g., in the manner discussed above with reference to FIG. 21).

Figure 23A:
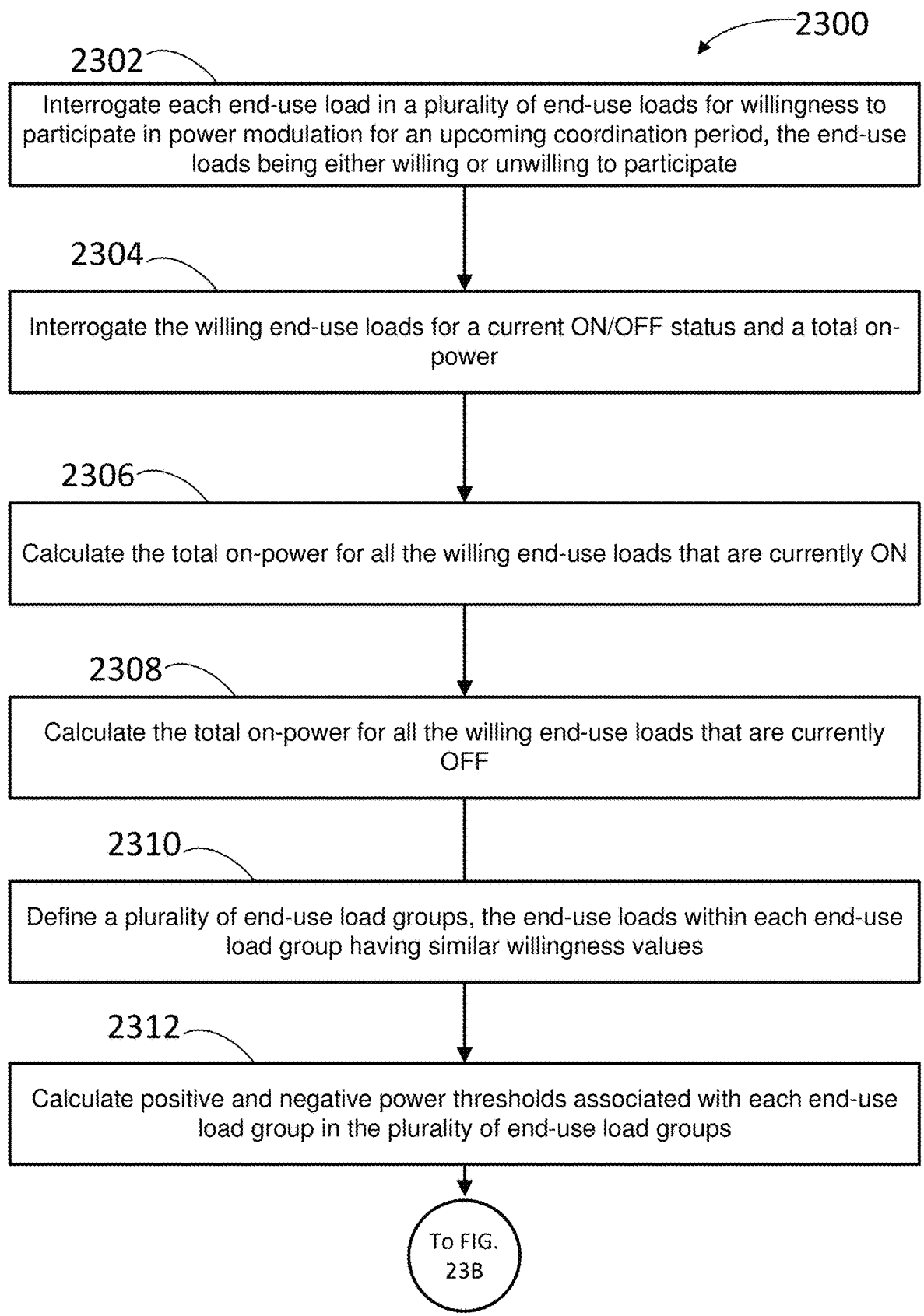
FIGS. 23A and 23B are flowcharts for operation of an example method for damping inter-area oscillations or regulating frequency in a power grid, as can be implemented in certain examples of the disclosed technology.
Figure 23B:
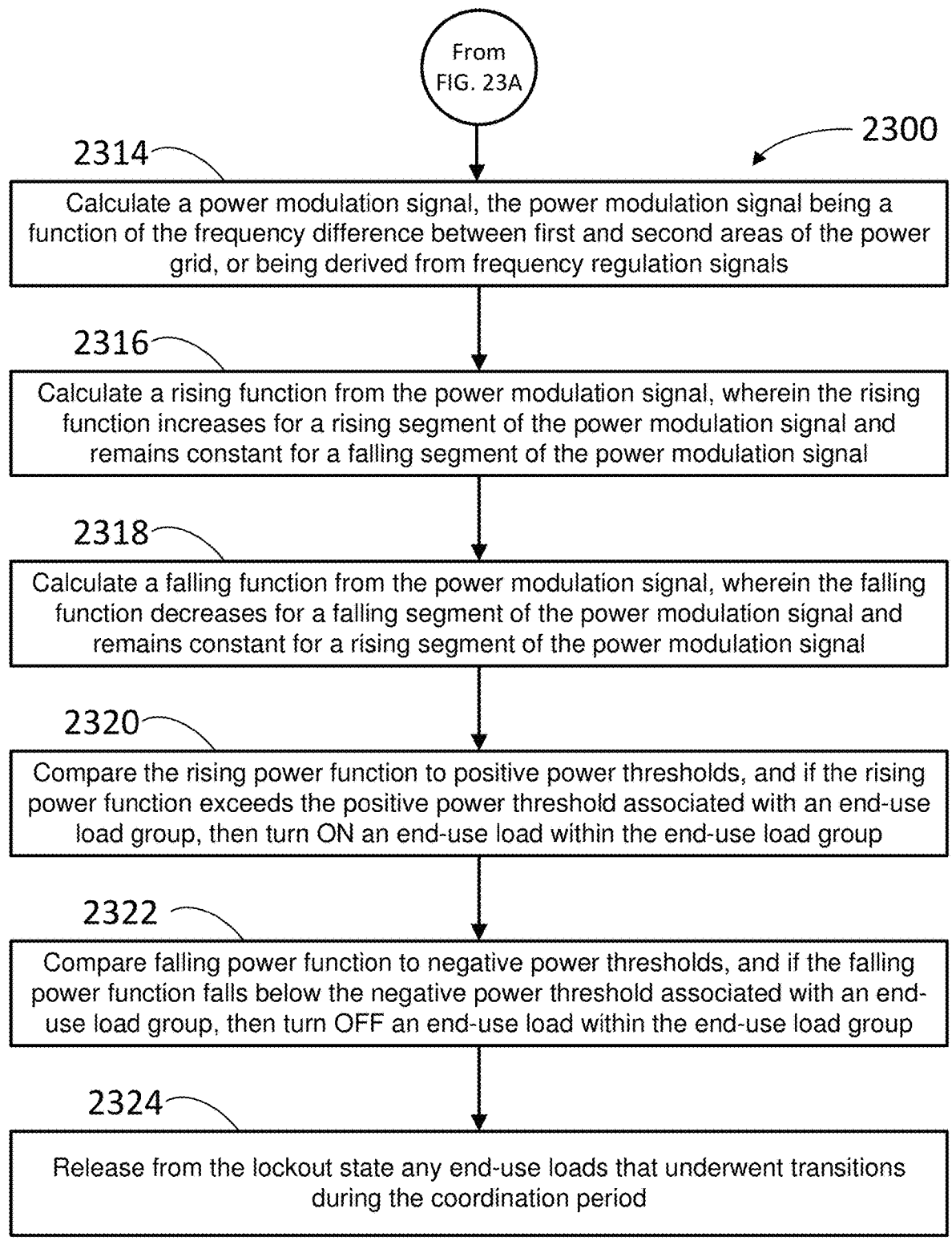

XIV. Method of Damping Inter-Area Oscillations and Regulating Frequency in a Power Grid FIG. 23 is a flowchart for operation of an example method for damping inter-area oscillations or regulating frequency in a power grid, as can be implemented in certain examples of the disclosed technology.

At process block 2302, each end-use load in a plurality of end-use loads is interrogated for willingness to participate in power modulation for an upcoming coordination period, the end-use loads being either willing or unwilling to participate.

At process block 2304, the willing end-use loads are interrogated (e.g., via associated end-use load controllers) for a current ON/OFF status and a total (e.g., maximum) on-power.

At process block 2306, the total on-power for all the willing end-use loads that are currently ON is calculated.

At process block 2308, the total on-power for all the willing end-use loads that are currently OFF is calculated.

At process block 2310, a plurality of end-use load groups are defined, the end-use loads within each end-use load group having similar willingness values.

At process block 2312, positive and negative power thresholds associated with each end-use load group in the plurality of end-use load groups are calculated.

At process block 2314, a power modulation signal is determined (e.g., calculated), the power modulation signal being a function of the frequency difference between a first area and a second area, or being derived from frequency regulation signals.

At process block 2316, a rising function is calculated from the power modulation signal. The rising function increases for a rising segment of the power modulation signal and remains constant for a falling segment of the power modulation signal.

At process block 2318, a falling function is calculated from the power modulation signal. The falling function decreases for a falling segment of the power modulation signal and remains constant for a rising segment of the power modulation signal.

At process block 2320, the rising power function is compared to the positive power thresholds. If the rising power function exceeds the positive power threshold associated with an end-use load group, then an end-use load within the end-use load group is turned ON.

At process block 2322, the falling power function is compared to the negative power thresholds. If the falling power function falls below the negative power threshold associated with an end-use load group, then an end-use load within the end-use load group is turned OFF.

At process block 2324, at the end of the coordination period, the end-use loads are released from the lockout state (e.g., in the manner discussed above with reference to FIG. 21).

XV. Computing Environment

Figure 24:
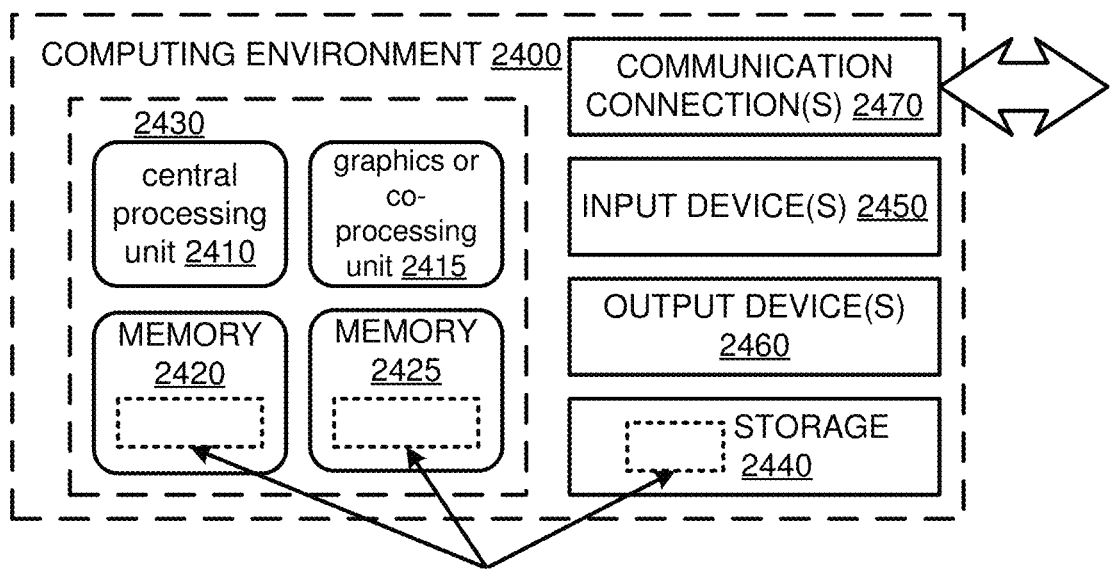
FIG. 24 is a generalized example of a suitable computing environment in which the described innovations may be implemented.

FIG. 24 depicts a generalized example of a suitable computing environment 2400 in which the described innovations may be implemented. The computing environment 2400 is not intended to suggest any limitation as to scope of use or functionality, as the innovations may be implemented in diverse general-purpose or special-purpose computing systems. For example, the computing environment 2400 can be any of a variety of computing devices (e.g., desktop computer, laptop computer, server computer, tablet computer, etc.)

With reference to FIG. 24, the computing environment 2400 includes one or more processing units 2410, 2415 and memory 2420, 2425. In FIG. 24, this basic configuration 2430 is included within a dashed line. The processing units 2410, 2415 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 24 shows a central processing unit 2410 as well as a graphics processing unit or co-processing unit 2415. The tangible memory 2420, 2425 may be volatile memory (e.g., registers, cache, RAM), non-volatile memory (e.g., ROM, EEPROM, flash memory, etc.), or some combination of the two, accessible by the processing unit(s). The memory 2420, 2425 stores software 2480 implementing one or more innovations described herein, in the form of computer-executable instructions suitable for execution by the processing unit(s).

A computing system may have additional features. For example, the computing environment 2400 includes storage 2440, one or more input devices 2450, one or more output devices 2460, and one or more communication connections 2470. An interconnection mechanism (not shown) such as a bus, controller, or network interconnects the components of the computing environment 2400. Typically, operating system software (not shown) provides an operating environment for other software executing in the computing environment 2400, and coordinates activities of the components of the computing environment 2400.

The tangible storage 2440 may be removable or non-removable, and includes magnetic disks, magnetic tapes or cassettes, CD-ROMs, DVDs, or any other medium which can be used to store information in a non-transitory way and which can be accessed within the computing environment 2400. The storage 2440 stores instructions for the software 2480 implementing one or more innovations described herein.

The input device(s) 2450 may be a touch input device such as a keyboard, mouse, pen, or trackball, a voice input device, a scanning device, or another device that provides input to the computing environment 2400. The output device (s) 2460 may be a display, printer, speaker, CD-writer, or another device that provides output from the computing environment 2400.

The communication connection(s) 2470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosed subject matter may be applied, it should be recognized that the illustrated embodiments are only preferred examples and should not be taken as limiting the scope of the claimed subject matter. Rather, the scope of the claimed subject matter is defined by the following claims. We therefore claim as our invention all that comes within the scope of these claims.

What is claimed is:

1. A computer-implemented method for power modulation of a power grid comprising a plurality of end-use loads within an end-use load group, the method comprising:
   determining a power modulation function representing an amount of power being transferred from a first area of a power grid to a second area of the power grid over a coordination time period;
   producing a rising function from the power modulation function, wherein the rising function increases for corresponding time portions of the power modulation function where the amount of transferred power is increasing and remains constant for corresponding time portions of the power modulation function where the amount of transferred power is decreasing;
   selecting a first signal based on comparing the rising function to a positive power threshold associated with the end-use load group; and
   transmitting the first signal, the first signal comprising an indication to increase power consumed by at least one end-use load within the end-use load group.

2. The method of claim 1, wherein the first signal is selected to dampen inter-area power oscillations in the power grid.

3. The method of claim 1, wherein the first signal is selected to regulate frequency in the power grid.

4. The method of claim 1, further comprising:
   producing a falling function from the power modulation function that decreases for corresponding time portions of the power modulation function where the amount of transferred power is decreasing;
   selecting a second signal based on comparing the falling function to a negative power threshold associated with the end-use load group; and
   transmitting the selected second signal, the second signal comprising an indication to decrease power consumed by at least one end-use load within the end-use load group.

5. The method of claim 4, wherein the indication to decrease power is selected to cause the respective end-use load to turn OFF.

6. The method of claim 1, wherein the indication to increase power is selected to cause the respective end-use load to turn ON.

7. The method of claim 1, further comprising interrogating an end-use load within the end-use load group to determine its willingness to participate in power modulation.

8. The method of claim 7, wherein a degree of the willingness of the end-use load to participate in power modulation is characterized by a willingness value.

9. The method of claim 1, wherein the at least one end-use load within the end-use load group comprises at least one of the following: an air-conditioning unit; a heating unit; a heating, ventilation, and air conditioning system; a hot water heater; a refrigerator; a dishwasher; a washing machine; a dryer; an oven; a microwave oven; a pump; a home lighting system; an electrical charger; an electric vehicle charger; or a home electrical system.

10. An area coordinator configured to perform the method of claim 1.

11. An end-use load configured to increase the power it consumes responsive to receiving the first signal transmitted by performing the method of claim 1.

12. An end-use load configured to decrease the power it consumes responsive to receiving the second signal transmitted by performing the method of claim 2.

13. One or more computer-readable storage media storing instructions that, when executed by a computer, cause the computer to perform the method of claim 1.

14. A controller coupled to a power grid, the controller comprising:
   at least one processor;
   a network interface configured to transmit control signals; and
   memory coupled to the at least one processor, the memory storing computer-readable instructions that, when executed by the at least one processor, cause the at least one processor to perform a method, the instructions comprising:

instructions that cause the at least one processor to produce a power modulation function representing a power transfer level along a tie-line or bus coupling a first area of the power grid and a second area of the power grid;

instructions that cause the at least one processor to produce rising and falling functions derived from the power modulation function, wherein the rising function increases for a rising segment of the power modulation function and remains constant for a falling segment of the power modulation function;

instructions that cause the at least one processor to generate a comparison of at least one of the rising or falling functions to a respective power threshold associated with an end-use load group; and instructions that cause the processor to, based on the generated comparison, transmit a power modulation signal using the network interface, the signal comprising an indication of whether the end-use load group should increase or decrease power consumption from the power grid.

15. A system comprising:
the controller of claim 14;
an area coordinator for an area of the power grid, the area coordinator comprising the controller;
a plurality of distribution systems comprising respective distribution coordinators, each distribution coordinator coupled to one or more of the end-use loads;
the controller being configured to transmit the power modulation signal to the distribution coordinators; and
the distribution coordinators being configured to increase or decrease the power consumption of the associated one or more end-use loads responsive to receiving the power modulation signal.

16. The system of claim 14, wherein the falling function decreases for a falling segment of the power modulation function and remains constant for a rising segment of the power modulation function.

17. The system of claim 15, wherein the distribution systems comprise respective end-use load controllers coupled with the end-use loads, each end-use load controller being configured to interrogate the associated end-use load to determine whether the end-use load is willing to participate in power modulation.

18. The system of claim 17, wherein the determination of whether the end-use load is willing to participate in power modulation includes a determination of a degree of willingness of the end-use load to participate in power modulation, the degree of willingness characterized by a willingness value.

19. The system of claim 18, wherein the end-use load controllers are each operable to interrogate the associated end-use load to determine a current ON/OFF status of the end-use load and a total on-power for the end-use load, and to transmit the current ON/OFF status and total on-power to the associated distribution coordinator.

20. The system of claim 19, wherein the respective distribution coordinators are operable to, based on the ON/OFF statuses and total on-powers received from the end-use load controllers:
calculate a total on-power for all willing end-use loads in the associated distribution system that are currently OFF;
calculate a total on-power for all willing end-use loads in the associated distribution system that are currently ON; and
transmit the total on-powers to the area coordinator.

21. The system of claim 20, wherein the area coordinator is operable to calculate, based on the total on-powers received from the distribution coordinators, a total on-power for willing end-use loads that are currently OFF in the area and a total on-power for willing end-use loads that are currently ON in the area.

22. The system of claim 21, wherein the respective distribution coordinators are operable to:
receive, from the area coordinator, the total on-power for the willing end-use loads that are currently OFF in the area and the total on-power for the willing end-use loads that are currently ON in the area;
calculate a plurality of power thresholds based on the total on-powers received from the area coordinator and the willingness values for the end-use loads in the associated distribution system, including:
a first positive power threshold for the willing end-use loads that are currently OFF in the associated distribution system;
a first negative power threshold for the willing end-use loads that are currently OFF in the associated distribution system;
a second positive power threshold for the willing end-use loads that are currently ON in the associated distribution system; and
a second negative power threshold for the willing end-use loads that are currently ON in the associated distribution system;
relay the first positive and negative power thresholds to the end-use load controllers of the willing end-use loads that are currently OFF in the associated distribution system; and
relay the second positive and negative power thresholds to the end-use load controllers of the willing end-use loads that are currently ON in the associated distribution system.

23. The system of claim 22, wherein the area coordinator is operable to broadcast the power modulation signal and the rising and falling functions to the distribution coordinators, and wherein the distribution coordinators are operable to broadcast the power modulation signal and the rising and falling functions to the end-use load controllers of the associated distribution system.

24. The system of claim 23, wherein the end-use load controllers are operable to continually compare the rising function to one of the positive power thresholds received from the associated distribution coordinator, and relay a control signal to turn ON the associated end-use load in response to the rising function being higher than the positive power threshold.

25. The system of claim 24, wherein the control signal to turn ON the associated end-use load also places the end-use load in a lockout state, and wherein the end-use load controller of the end-use load is operable to release it from the lockout state at the end of a coordination period.

26. The system of claim 23, wherein the respective end-use load controllers are operable to continually compare the falling function to one of the negative power thresholds received from the associated distribution coordinator, and relay a control signal to turn OFF the associated end-use load in response to the falling function being lower than the negative power threshold.

27. The system of claim 26, wherein the control signal to turn OFF the associated end-use load also places the end-use load in a lockout state, and wherein the end-use load controller of the end-use load is operable to release it from the lockout state at the end of a coordination period.

28. An end-use load, comprising:
an electrical load;
memory;
a network interface; and
a processor configured to, responsive to executing computer-executable instructions stored in the memory, receive a power indication via the network interface and, based on the power indication, increase or decrease power consumed by the end-use load, wherein:
the power indication is based on comparison of a rising function or falling function to a power threshold,
the rising function is derived from a power modulation function representing a power transfer level between areas of an electrical grid including the end-use load,
the rising function increases for rising portions of the power modulation function and remains constant for falling portions of the power modulation function, and
the falling function decreases for the falling portions of the power modulation function and remains constant for the rising portions of the power modulation function.

29. The end-use load of claim 28, wherein the electrical load comprises at least one of the following: an air-conditioning unit; a heating unit; a heating, ventilation, and air conditioning system; a hot water heater; a refrigerator; a dishwasher; a washing machine; a dryer; an oven; a microwave oven; a pump; a home lighting system; an electrical charger; an electric vehicle charger; or a home electrical system.

30. The end-use load of claim 28, wherein the processor is further configured to turn OFF the electrical load when the power indication is to decrease power and to turn ON the electrical load when the power indication is to increase power.

31. A method, comprising:
generating a power modulation function representing an amount of power being transferred from a first area of a power grid to a second area of the power grid over a coordination time period;
producing a rising function from the power modulation function that increases for corresponding time portions of the power modulation function where the amount of transferred power is increasing and remains constant for corresponding time portions of the power modulation function where the amount of transferred power is decreasing;
producing a falling function from the power modulation function that decreases for corresponding time portions of the power modulation function where the amount of transferred power is decreasing;
when the rising function exceeds a positive power threshold, turning ON one or more end-use loads of the power grid; and
when the falling function falls below a negative power threshold, turning OFF one or more end-use loads of the power grid.

32. The method of claim 31, wherein the power modulation function is generated by an area coordinator.

33. The method of claim 31, wherein the rising function and the falling function are produced by either an area coordinator or a distribution coordinator, the area coordinator or distribution coordinator operable to send commands to one or more end-use loads of the power grid to turn the one or more end-use loads ON or OFF.

* * * * *

UNITED STATES PATENT AND TRADEMARK OFFICE
CERTIFICATE OF CORRECTION

PATENT NO. : 10,971,932 B2
APPLICATION NO. : 16/294791
DATED : April 6, 2021
INVENTOR(S) : Lian et al.

Page 1 of 1

It is certified that error appears in the above-identified patent and that said Letters Patent is hereby corrected as shown below:

In the Specification

At Column 2, Line 39, "may turned" should read --may be turned--.

At Column 11, Line 46, "expressed at the sum" should read --expressed as the sum--.

At Column 13, Line 3, "(where j k)" should read --(where $j \neq k$)--.

At Column 18, Line 39, "more simply that" should read --more simply than--.

At Column 18, Line 52, "selected such at" should read --selected such that--.

At Column 25, Line 64, "expressed at the sum" should read --expressed as the sum--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*